US010957227B2

(12) United States Patent
DeLorean

(10) Patent No.: US 10,957,227 B2
(45) Date of Patent: Mar. 23, 2021

(54) VEHICLE-MOUNTED, LOCATION-CONTROLLED SIGN

(71) Applicant: DeLorean, LLC, Bloomfield, MI (US)

(72) Inventor: Jack Z. DeLorean, Bloomfield, MI (US)

(73) Assignee: DeLorean, LLC, Bloomfield, MI (US)

( * ) Notice: Subject to any disclaimer, the term of this patent is extended or adjusted under 35 U.S.C. 154(b) by 0 days.

(21) Appl. No.: 16/693,695

(22) Filed: Nov. 25, 2019

(65) Prior Publication Data

US 2020/0090562 A1 Mar. 19, 2020

Related U.S. Application Data

(63) Continuation-in-part of application No. 16/582,891, filed on Sep. 25, 2019, which is a continuation-in-part
(Continued)

(51) Int. Cl.
G08G 1/0955 (2006.01)
G09F 27/00 (2006.01)
G08G 1/052 (2006.01)
G09F 21/04 (2006.01)
G08G 1/096 (2006.01)
(Continued)

(52) U.S. Cl.
CPC ....... G09F 27/005 (2013.01); G06Q 30/0241 (2013.01); G08G 1/052 (2013.01); G08G 1/095 (2013.01); G08G 1/096 (2013.01); G09F 21/04 (2013.01)

(58) Field of Classification Search
USPC .......................................... 340/917
See application file for complete search history.

(56) References Cited

U.S. PATENT DOCUMENTS 3,322,032 A  5/1967 Leach
3,715,821 A  2/1973 Hawes
(Continued)

FOREIGN PATENT DOCUMENTS

EP      0059953 A1   9/1982
JP   2000047621 A   2/2000
(Continued)

OTHER PUBLICATIONS

Blue Line Media, "Mobile Billboards in 100 Cities—Truck Side Advertising Company," retrieved on Nov. 21, 2019 at <<https://www.bluelinemedia.com/mobile-billboard-advertising>> 19 pages.
(Continued)

*Primary Examiner* — Brent Swarthout
(74) *Attorney, Agent, or Firm* — Lee & Hayes, P.C.

(57) ABSTRACT

A display system is configured to be mounted to a vehicle, the system including a display and one or more sensors. The display system may be configured to determine, based at least in part on data from the one or more sensors, a speed of a vehicle to which a sign is coupled. Based at least in part on the speed of the vehicle, the display system may position the sign in a first position based at least in part on the speed of the vehicle being less than a threshold speed, or a second position based at least in part on the speed of the vehicle being greater than or equal to the threshold speed.

20 Claims, 31 Drawing Sheets

Related U.S. Application Data of application No. 16/373,283, filed on Apr. 2, 2019, which is a continuation-in-part of application No. 15/950,445, filed on Apr. 11, 2018, now Pat. No. 10,304,360, which is a continuation of application No. 15/363,540, filed on Nov. 29, 2016, now Pat. No. 9,972,230, which is a continuation-in-part of application No. 14/657,570, filed on Mar. 13, 2015, now Pat. No. 9,607,510, which is a continuation-in-part of application No. 14/022,141, filed on Sep. 9, 2013, now abandoned.

(60) Provisional application No. 61/699,992, filed on Sep. 12, 2012.

(51) Int. Cl.
*G08G 1/095* (2006.01)
*G06Q 30/02* (2012.01)

(56) References Cited

U.S. PATENT DOCUMENTS

| | | | |
|---|---|---|---|
| 4,152,854 A | 5/1979 | Berry, Jr. et al. | |
| 4,663,871 A | 5/1987 | Young | |
| 4,827,646 A * | 5/1989 | Miller | B60Q 1/50 116/40 |
| 5,150,116 A * | 9/1992 | West | G08G 1/095 340/905 |
| 9,007,193 B2 | 4/2015 | Boston et al. | |
| 9,183,572 B2 | 11/2015 | Brubaker | |
| 9,607,510 B1 | 3/2017 | DeLorean | |
| 9,972,230 B1 | 5/2018 | DeLorean | |
| 2002/0098001 A1 | 7/2002 | Dahl | |
| 2005/0012598 A1 | 1/2005 | Berquist | |
| 2006/0143956 A1 | 7/2006 | Star et al. | |
| 2006/0229939 A1 | 10/2006 | Bhakta et al. | |
| 2007/0146560 A1 | 6/2007 | Plavetich et al. | |
| 2007/0205963 A1 | 9/2007 | Piccionelli et al. | |
| 2010/0002079 A1 | 1/2010 | Krijn et al. | |
| 2010/0063885 A1 | 3/2010 | Merkin et al. | |
| 2010/0109287 A1 | 5/2010 | MacDougall | |
| 2010/0207961 A1 | 8/2010 | Zomet | |
| 2011/0018738 A1 | 1/2011 | Feroldi | |
| 2011/0106595 A1 | 5/2011 | Vande Velde | |
| 2012/0092623 A1 * | 4/2012 | Huebner | G03B 21/2013 352/81 |
| 2016/0370984 A1 | 12/2016 | Kuhn et al. | |
| 2018/0144628 A1 * | 5/2018 | Nicholson | E01F 9/65 |
| 2018/0261088 A1 * | 9/2018 | Roy | G09F 27/005 |
| 2019/0330811 A1 | 10/2019 | Roy et al. | |

FOREIGN PATENT DOCUMENTS

| | | |
|---|---|---|
| JP | 6422846 B2 | 5/2017 |
| JP | 2017089295 A | 5/2017 |
| KR | 200196923 Y1 | 9/2000 |
| KR | 101552711 B1 | 9/2015 |
| KR | 101719099 B1 | 3/2017 |
| KR | 20170126276 A | 11/2017 |

OTHER PUBLICATIONS

Office action for U.S. Appl. No. 15/363,540, dated Oct. 30, 2017, DeLorean, "Traffic Display With Viewing Distance Control", 13 pages.

Office action for U.S. Appl. No. 15/950,445, dated Nov. 21, 2018, DeLorean, "Traffic Display With Viewing Distance Control", 7 pages.

Office action for U.S. Appl. No. 16/373,283, dated May 6, 2019, DeLorean, "Vehicle-Mounted, Motion-Controlled Sign", 7 pages.

Office action for U.S. Appl. No. 15/950,445, dated Jul. 17, 2018, DeLorean, "Traffic Display With Viewing Distance Control", 8 pages.

Office Action for U.S. Appl. No. 16/373,283, dated Aug. 1, 2019, DeLorean, "Vehicle-Mounted, Motion-Controlled Sign", 6 pages.

Non Final Office Action dated Dec. 20, 2019 for U.S. Appl. No. 16/582,891 "Vehicle-Mounted, Motion-Controlled Sign" DeLorean, 6 pages.

* cited by examiner

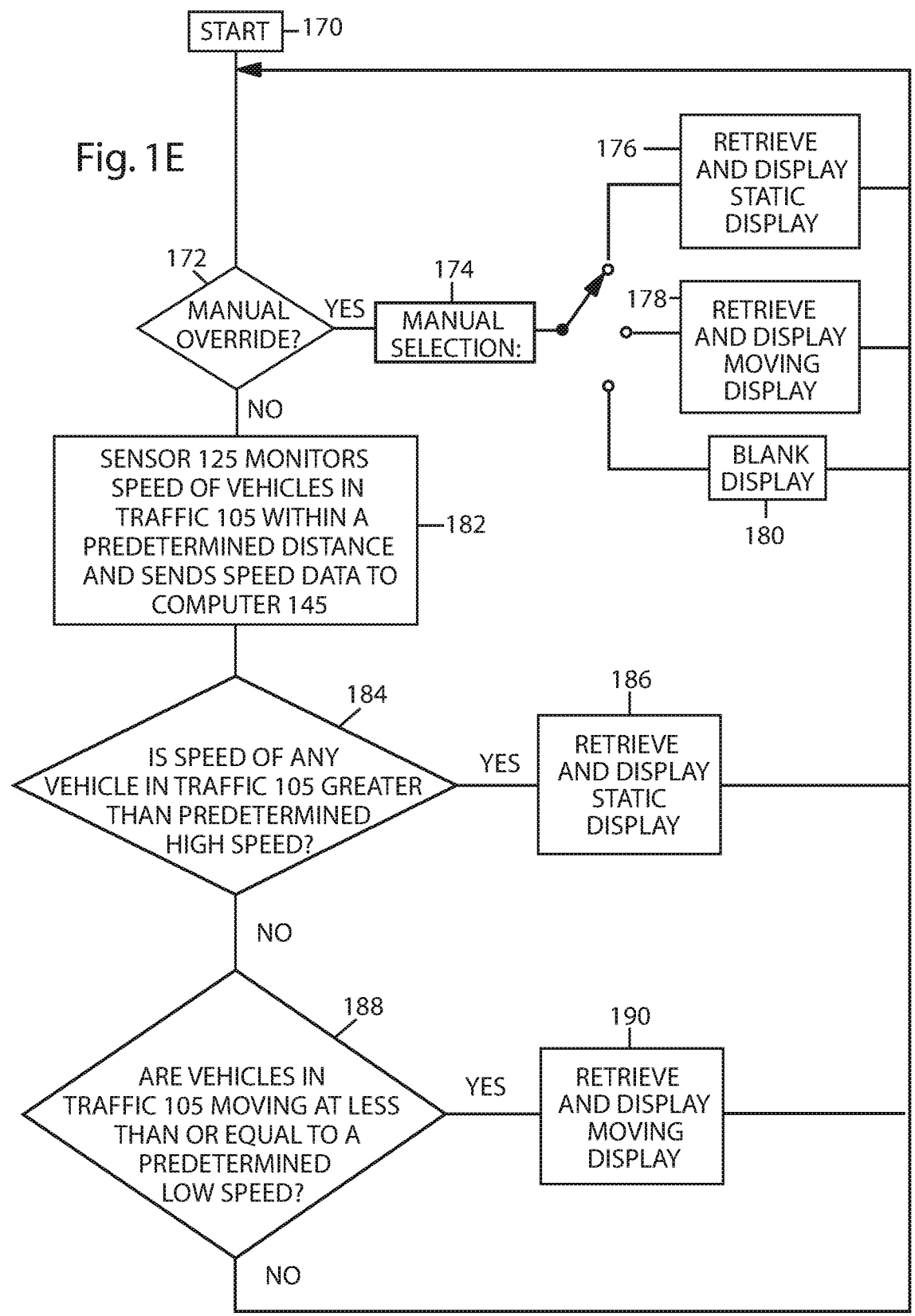

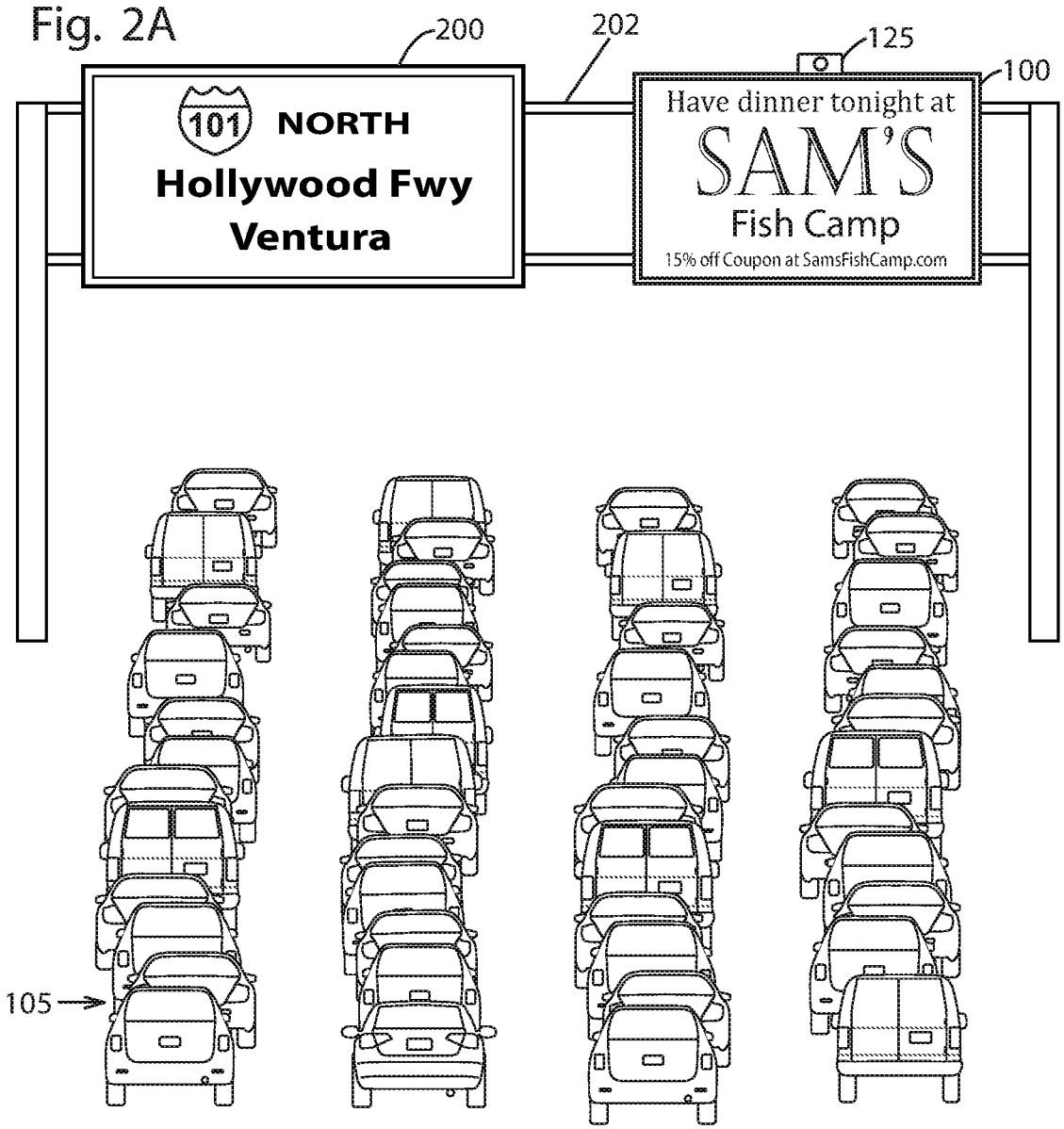

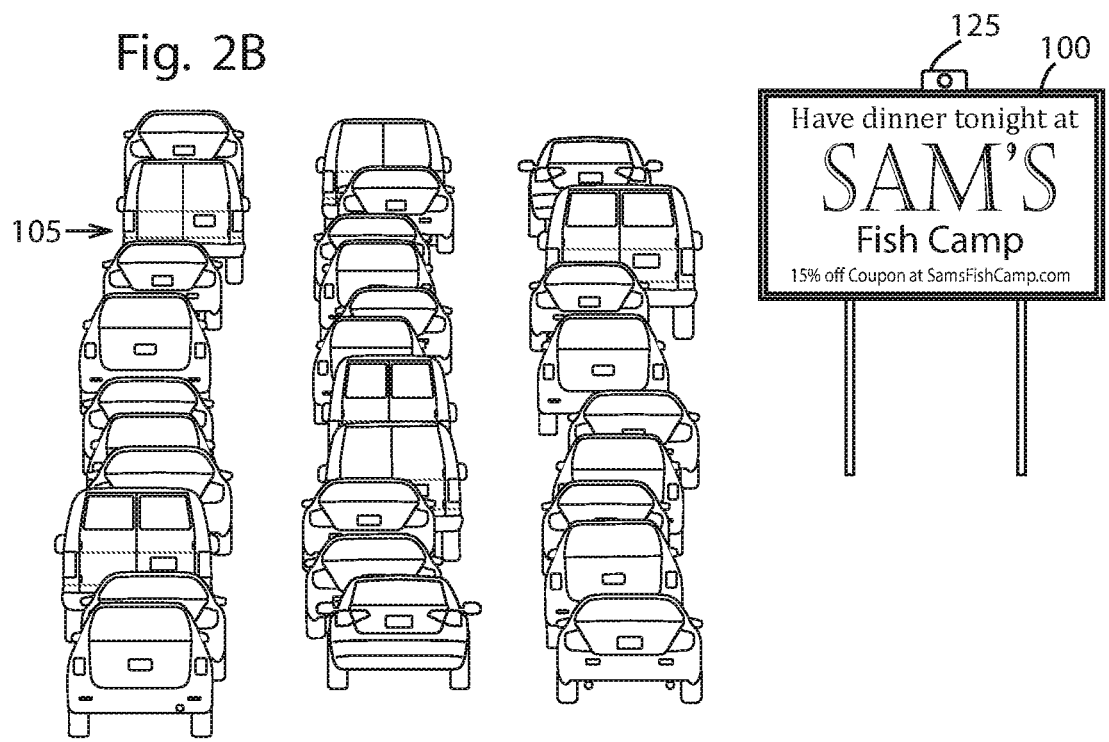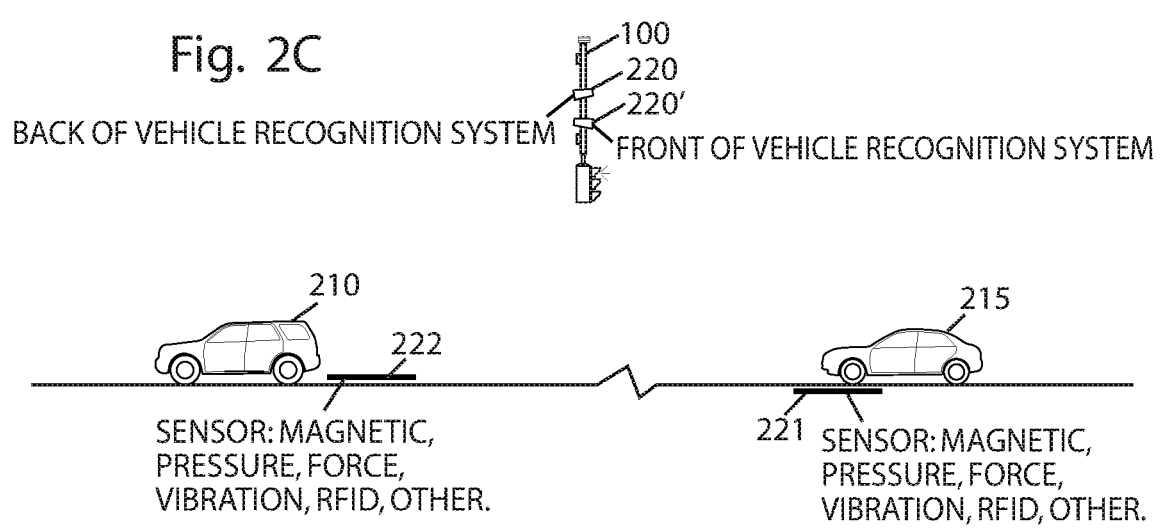

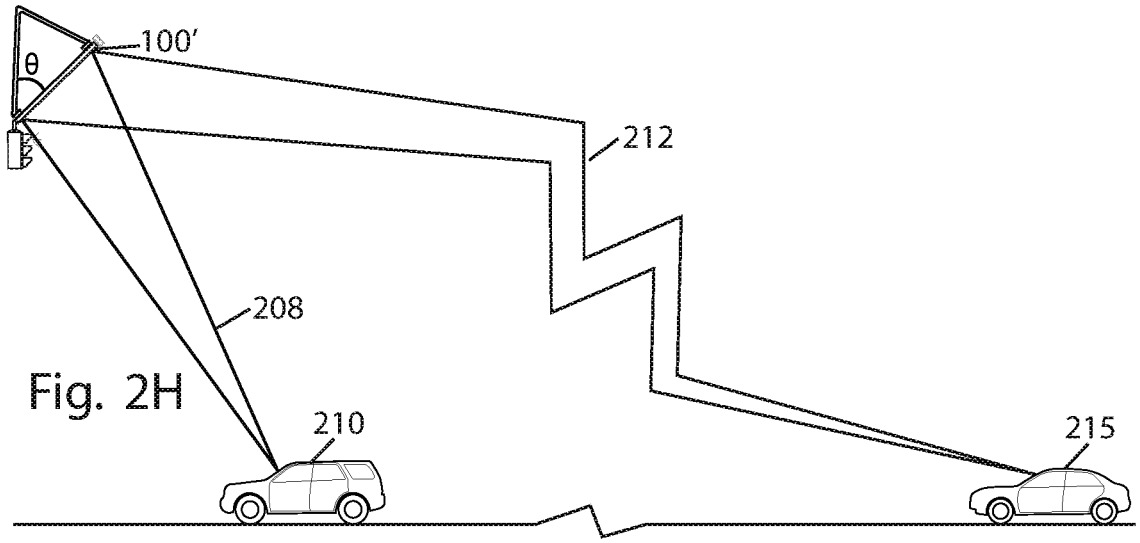
Fig. 2H
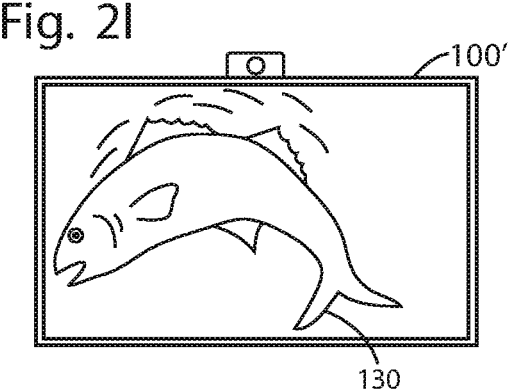
Fig. 2I
Fig. 2J1
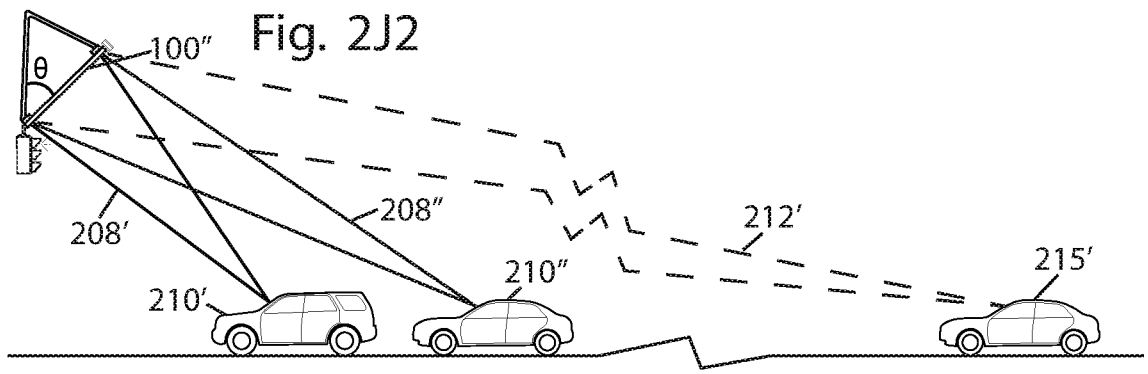
Fig. 2J2

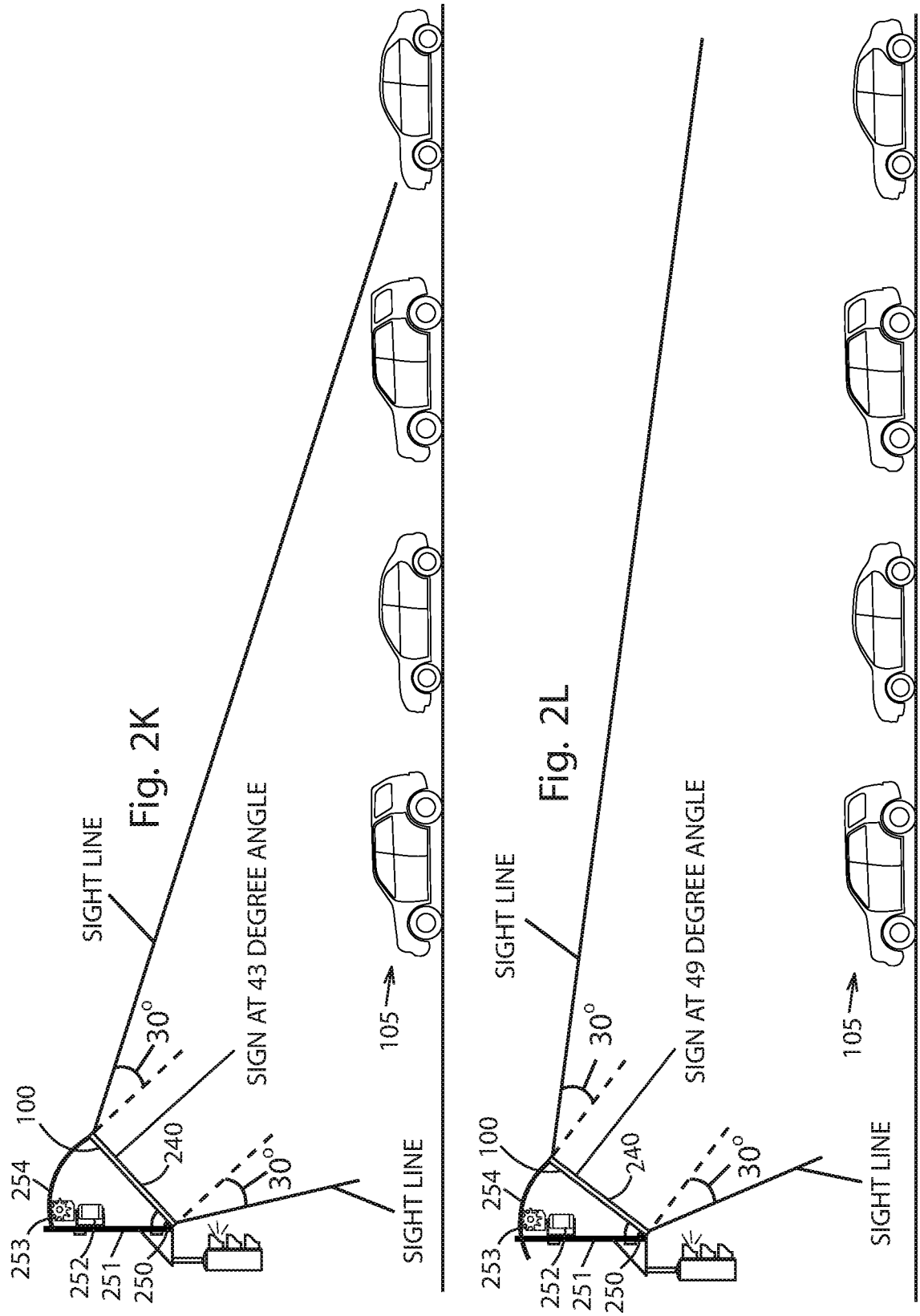

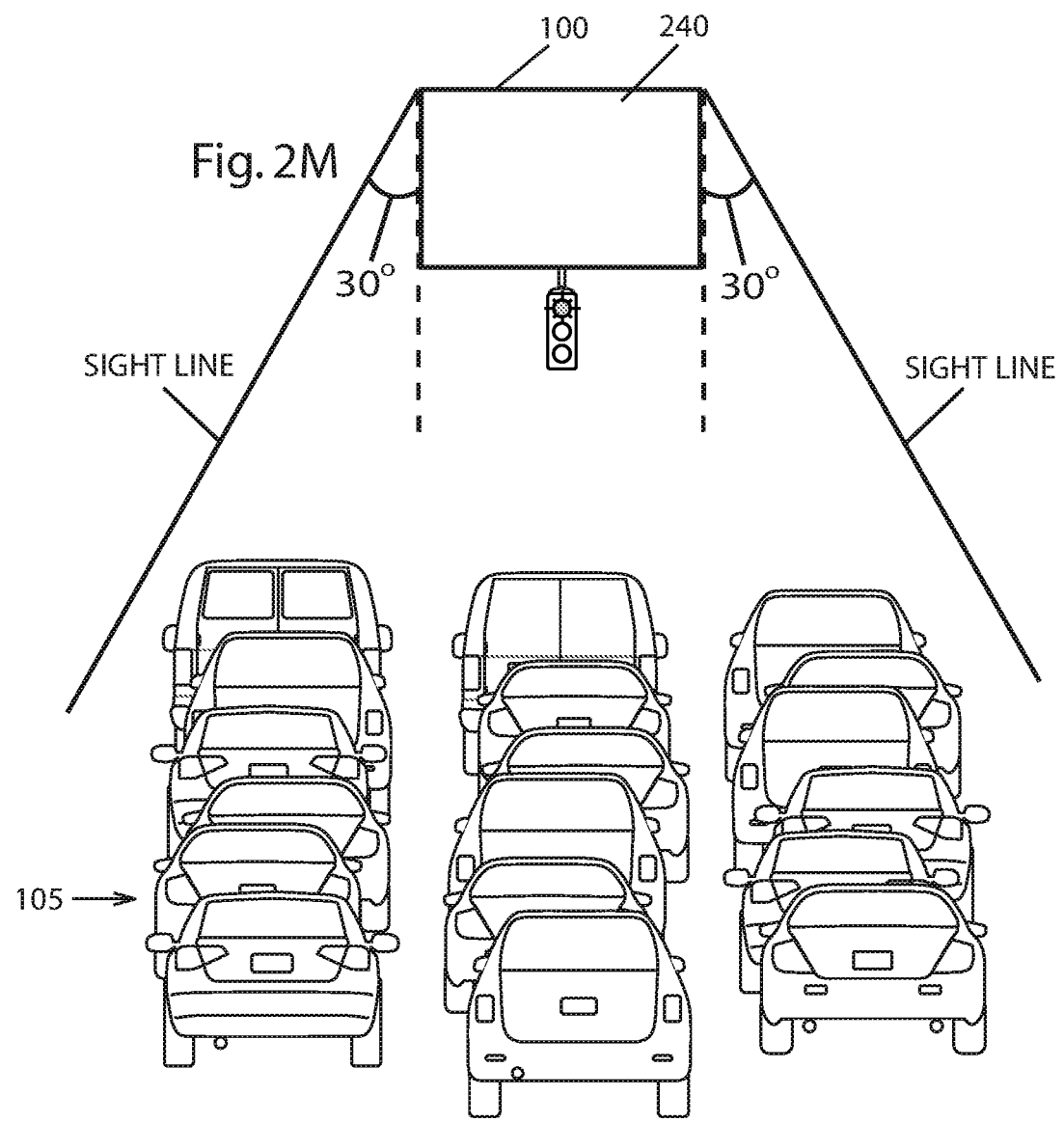

ACTIVE DISPLAY ON BUS

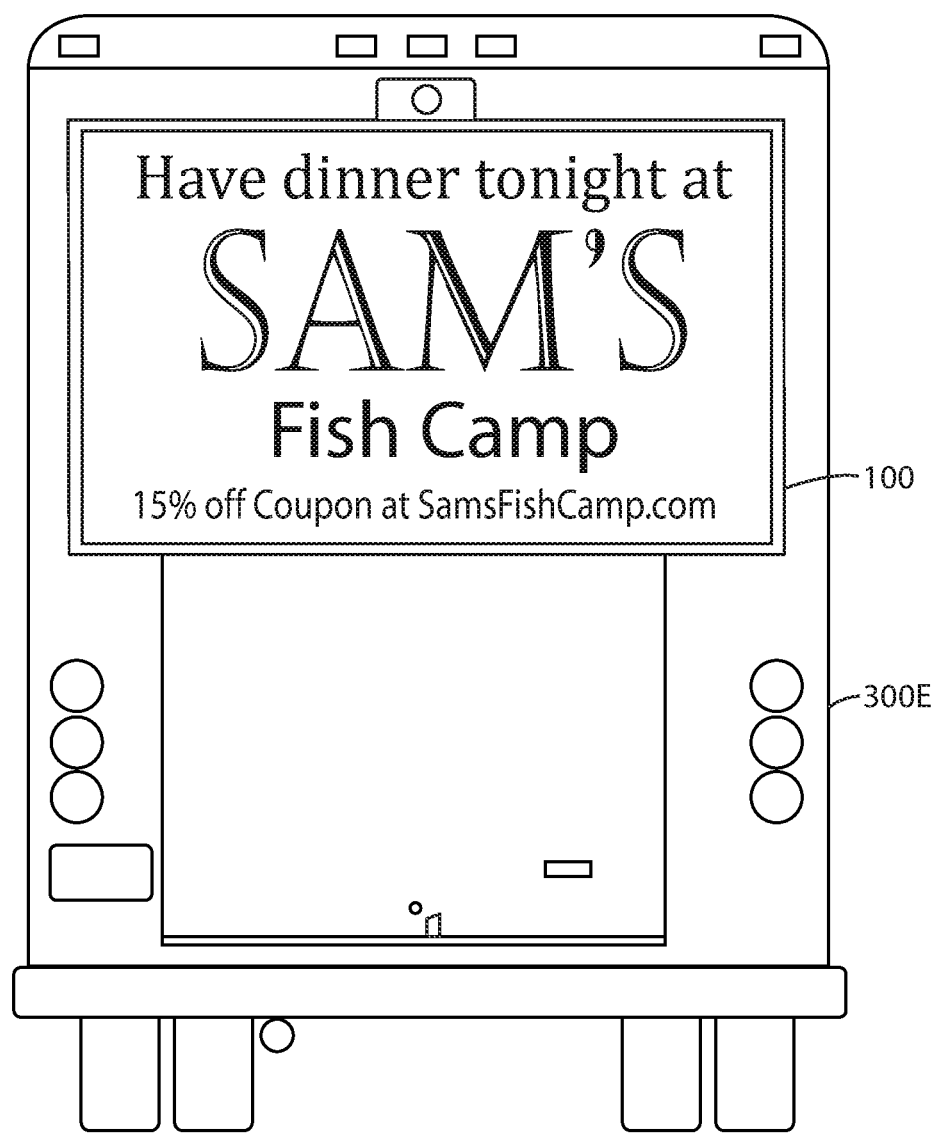
Fig. 8 — ACTIVE DISPLAY ON DELIVERY VAN

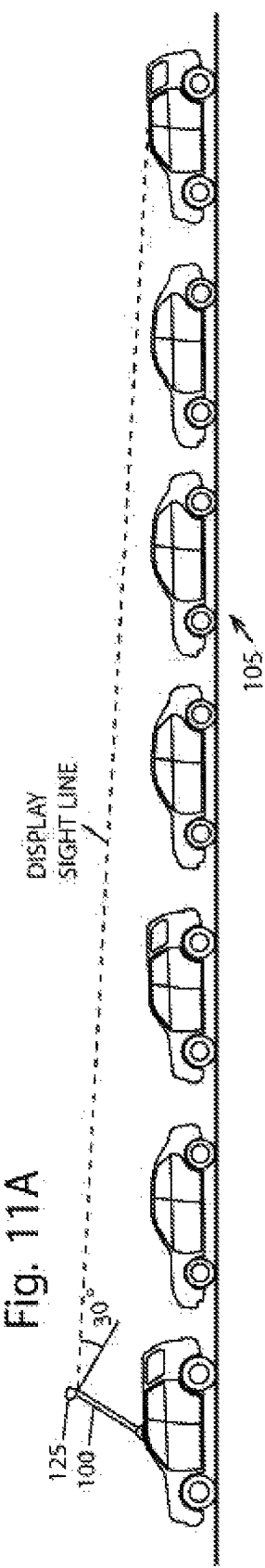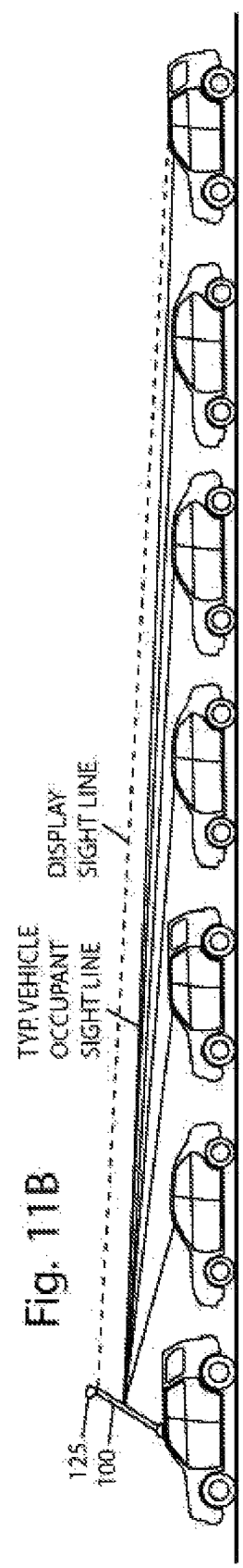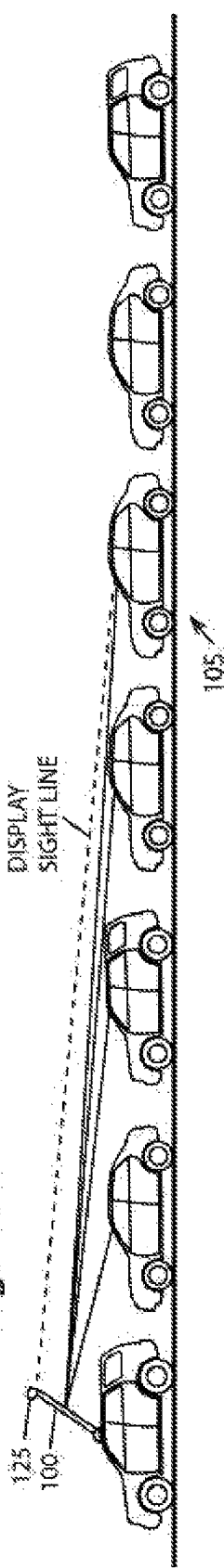

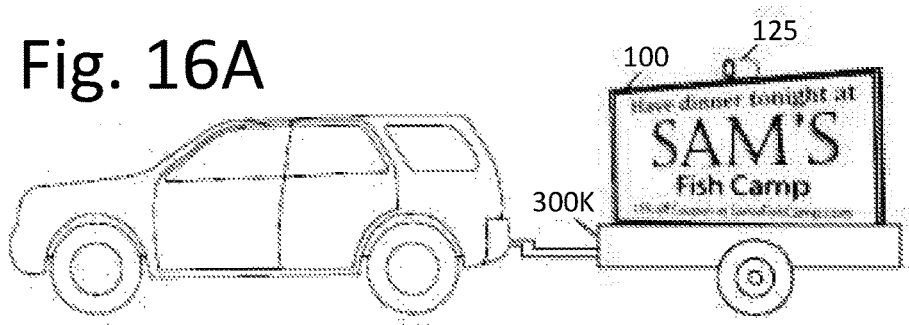
Fig. 16A
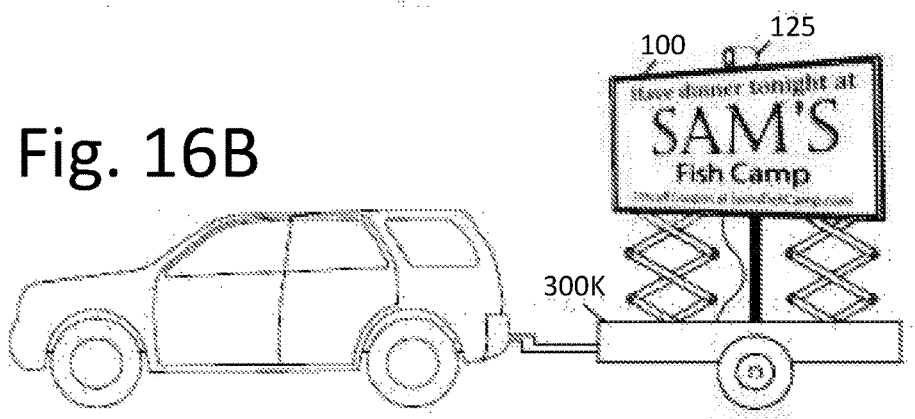
Fig. 16B
Fig. 16C
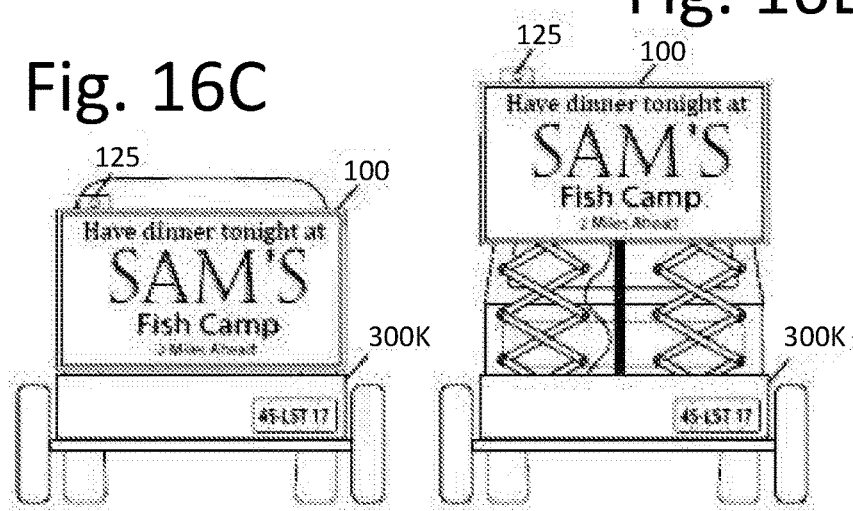
Fig. 16D
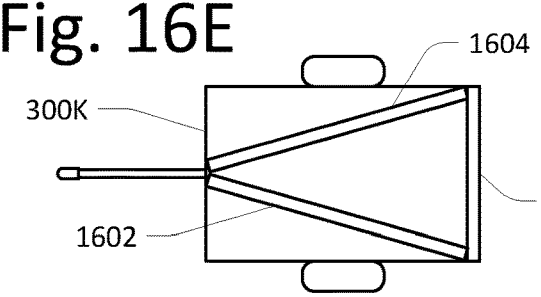
Fig. 16E
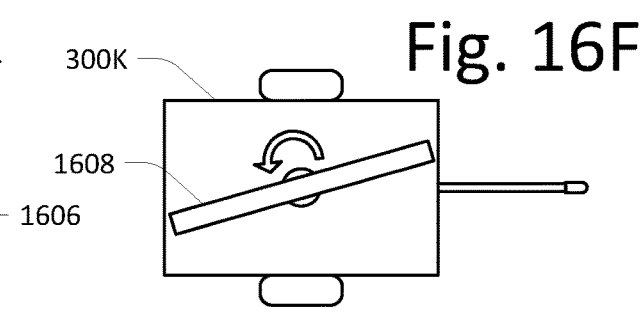
Fig. 16F

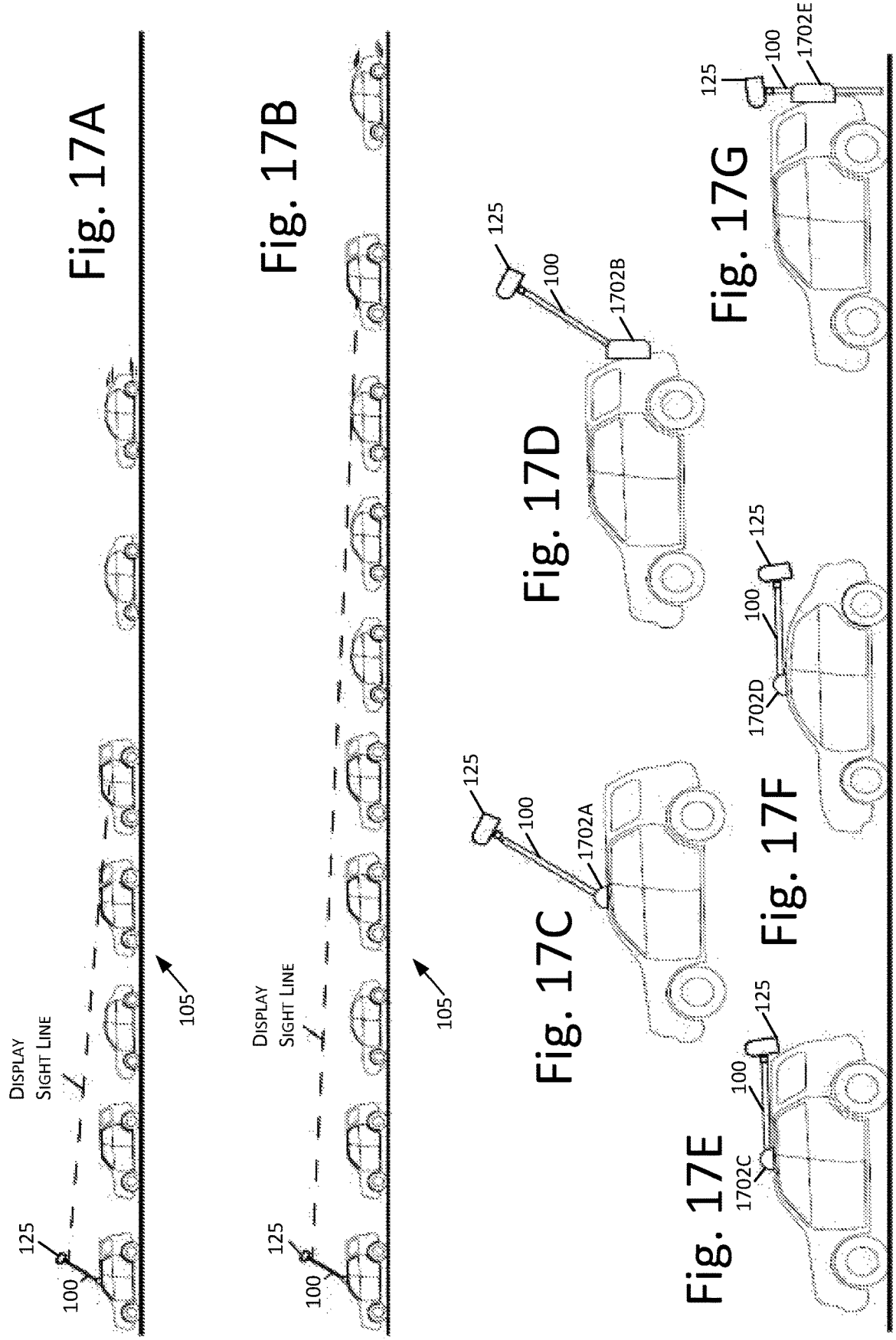

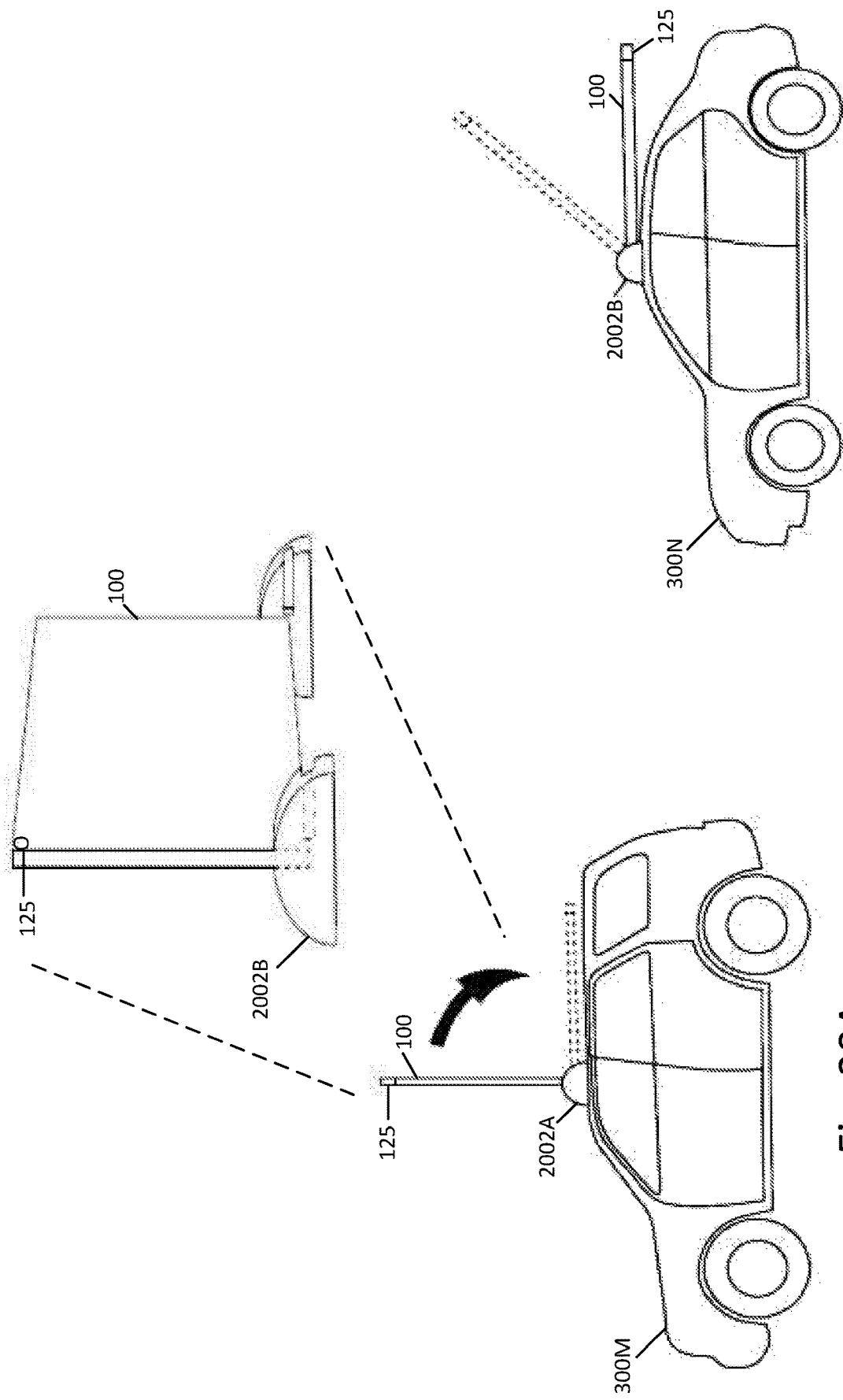

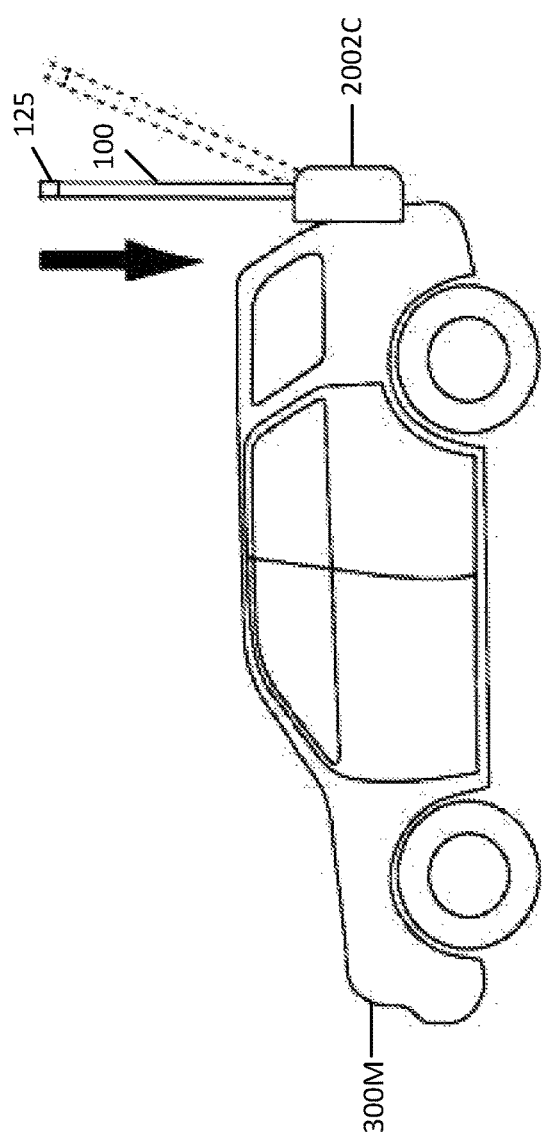
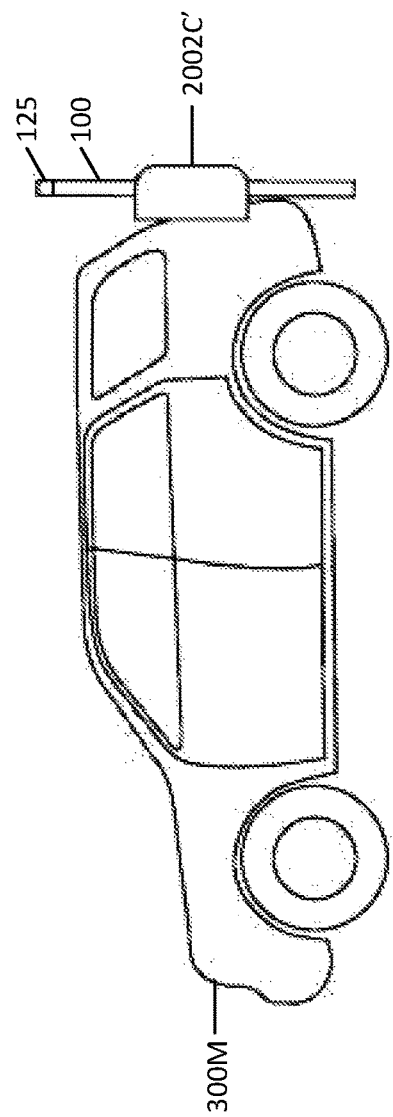
Fig. 20C
Fig. 20D

VEHICLE-MOUNTED, LOCATION-CONTROLLED SIGN

CROSS-REFERENCE TO RELATED APPLICATIONS

This application is a Continuation-in-part of U.S. patent application Ser. No. 16/582,891, (now U.S. Pat. No. 10,762, 809), filed Sep. 25, 2019, which is a Continuation-in-part of U.S. patent application Ser. No. 16/373,283, (now U.S. Pat. No. 10,592,916), filed Apr. 2, 2019, which is a Continuation-in-part of U.S. patent application Ser. No. 15/950,445, (now U.S. Pat. No. 10,304,360), filed Apr. 11, 2018, which is a Continuation of U.S. patent application Ser. No. 15/363,540, filed Nov. 29, 2016 (now U.S. Pat. No. 9,972,230), which is a Continuation-in-part of U.S. patent application Ser. No. 14/657,570, filed Mar. 13, 2015 (now U.S. Pat. No. 9,607, 510), which is a Continuation-in-part of U.S. patent application Ser. No. 14/022,141, filed Sep. 9, 2013 (now abandoned), which claims priority to U.S. Provisional Patent Application No. 61/699,992, filed Sep. 12, 2012, all of which are hereby incorporated by reference in their entireties.

BACKGROUND

Today's highly saturated television market makes it increasingly difficult for advertisers or businesses to reach their audiences in a cost-effective manner. The advent of cable, satellite television, and hundreds of channels, as well as the fast-growing popularity of digital video recorders, has induced merchants to spend more on advertising. However, the proliferation of media has lessened the number of viewers per medium and per advertising dollar. Studies show up to 40 percent of advertising is wasted and TV advertising's return on investment yields only 1 to 4 percent. Newspapers are in decline as well, as their advertising base dissipates with the digital age. Accordingly, there is a need for a cost-effective advertising solution.

BRIEF DESCRIPTION OF THE DRAWINGS

FIG. 1E is a block diagram showing an example operation of an example roadway sign, according to an embodiment of the present disclosure.

FIG. 2A shows an example roadway sign positioned beside a directional sign, according to an embodiment of the present disclosure.

FIG. 2B shows an example free-standing roadside sign, according to an embodiment of the present disclosure.

FIG. 2C shows a vehicle recognition system that may be usable with an example roadway sign, according to an embodiment of the present disclosure.

FIG. 2H shows an operation of a display, according to an embodiment of the present disclosure.

FIG. 2I shows the operation of the display of FIG. 2H, according to an embodiment of the present disclosure.

FIG. 2J1 shows the operation of the display of FIG. 2H, according to an embodiment of the present disclosure.

FIG. 2J2 shows the operation of the display of FIG. 2H, according to an embodiment of the present disclosure.

FIG. 2K shows the operation of the display of FIG. 2H, according to an embodiment of the present disclosure.

FIG. 2L shows the operation of the display of FIG. 2H, according to an embodiment of the present disclosure.

FIG. 2M shows the operation of the display of FIG. 2H, according to an embodiment of the present disclosure.

FIG. 8 shows an example active sign on a delivery vehicle, according to an embodiment of the present disclosure.

FIG. 11A shows an example sign including a privacy filter, according to an embodiment of the present disclosure.

FIG. 11B shows the example sign of FIG. 11A, according to an embodiment of the present disclosure.

FIG. 11C shows the example sign of FIG. 11A, according to an embodiment of the present disclosure.

FIG. 16A shows a side view of another example sign usable with a trailer in a first position, according to an embodiment of the present disclosure.

FIG. 16B shows a side view of the example sign of FIG. 16A in a second position.

FIG. 16C shows a rear view of the example sign of FIG. 16A in the first position.

FIG. 16D shows a rear view of the example sign of FIG. 16A in the second position.

FIG. 16E shows a top view of a first variation of the sign of FIG. 16A.

FIG. 16F shows a top view of a second variation of the sign of FIG. 16A.

FIG. 17A shows an example sign including one or more sensors, according to an embodiment of the present disclosure.

FIG. 17B shows the example sign of FIG. 17A, according to an embodiment of the present disclosure.

FIG. 17C shows the example sign of FIG. 17A, according to an embodiment of the present disclosure.

FIG. 17D shows the example sign of FIG. 17A, according to an embodiment of the present disclosure.

FIG. 17E shows the example sign of FIG. 17A, according to an embodiment of the present disclosure.

FIG. 17F shows the example sign of FIG. 17A, according to an embodiment of the present disclosure.

FIG. 17G shows the example sign of FIG. 17A, according to an embodiment of the present disclosure.

FIG. 20A shows a side view of an example sign pivotably mounted to a top of a vehicle, according to an embodiment of the present disclosure.

FIG. 20B shows a side view of another example sign pivotably mounted to a top of a vehicle, according to an embodiment of the present disclosure.

FIG. 20C shows a side view of an example sign slidably and pivotably mounted to a rear of a vehicle in a first (e.g., elevated and/or deployed) position, according to an embodiment of the present disclosure.

FIG. 20D shows a side view of the example sign of FIG. 20C in a second (e.g., lowered and/or stowed) position.

Figure 1A:
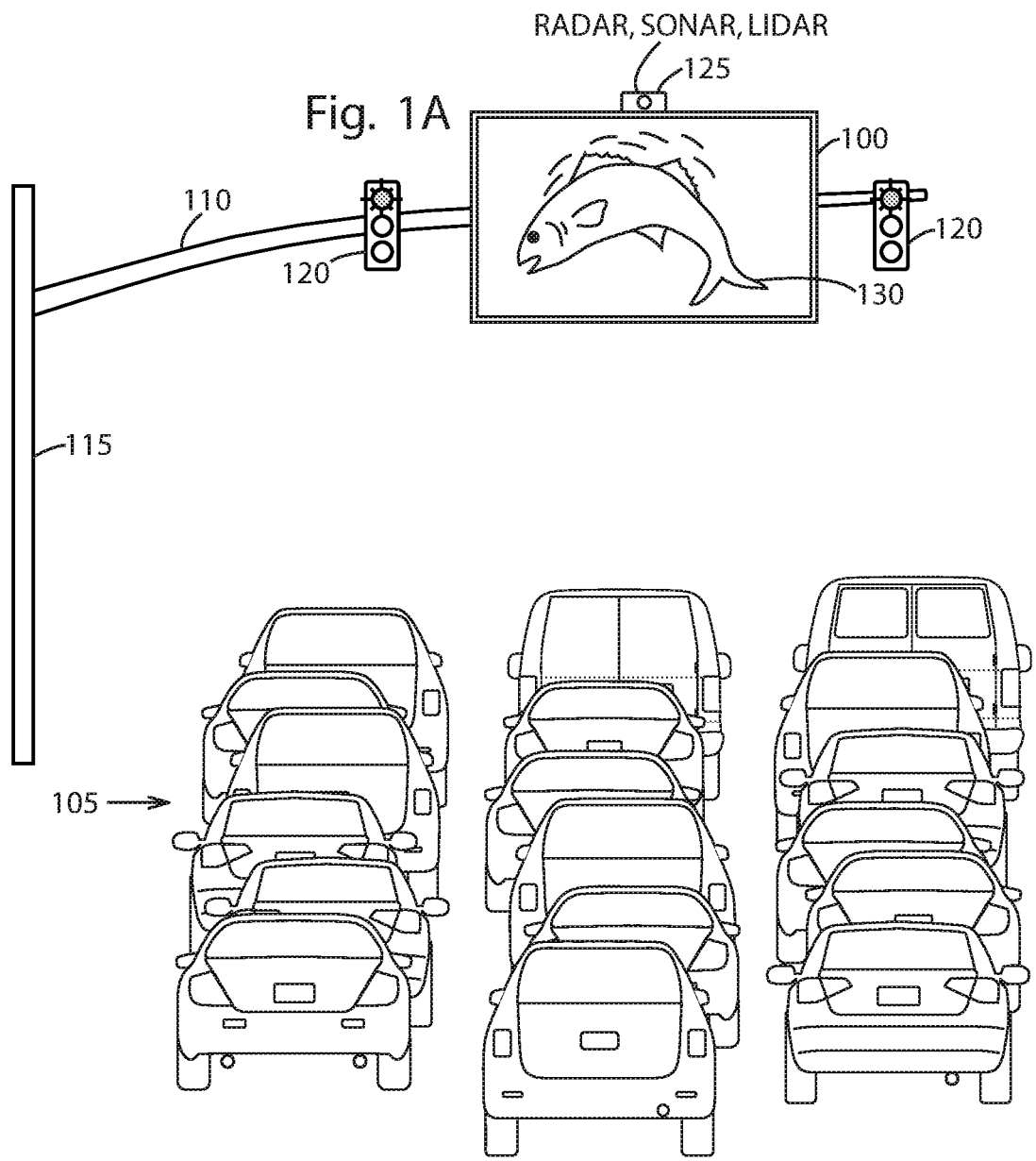
FIG. 1A shows an example roadway sign in an active condition, according to an embodiment of the present disclosure.

| DRAWING REFERENCE NUMERALS | | | |
|---|---|---|---|
| 100 | Sign | 102 | Traffic signal display |
| 104 | Countdown display | 105 | Traffic |
| 110 | Arm | 115 | Stanchion |
| 120 | Signal lights | 125 | Sensor(s) |
| 130 | Display | 135 | System |
| 140 | Data resource | 141 | Data link |
| 142 | External data link | 143 | External traffic |
| 145 | Computer | | control logic |
| 150 | Memory | 146 | Manual control |
| 170-190 | Blocks | 155 | Advertising |
| 202 | Beam | 200 | Roadway directional sign |
| 208 | Sight line | 205 | Shutter |
| 212 | Sight line | 210 | Vehicle |
| 220 | Vehicle recognition sensors | 215 | Vehicle |
| | | 221 | Subsurface sensor |
| 222 | Surface sensor | 230 | Solar panel |
| 240 | Privacy filter | 250 | Hinge |
| 251 | Frame | 252 | Drive assembly |
| 253 | Pinion | 254 | Curved gear rack |
| 300A-L | Vehicle | 305 | Hinge |
| 310 | Banner | 315 | GPS |
| 320 | Portion | 325 | Broadcast system |
| 330 | Transmitter | 340- | Blocks |
| 400 | Deflector | 384 | |
| 410 | Pivot arm | 405 | Hinge point |
| 500 | Pivot | 415 | Pivot point |
| 1005 | Pivot | 1000 | Post |
| 1015 | Pin | 1010 | Arm |
| 1025 | Slot | 1020 | Spring |
| 1202 | First Pivot | 1200 | Adjustment Mechanism |
| 1602 | First Display | 1204 | Second Pivot |
| 1606 | Third Display | 1604 | Second Display |
| 1702A-E | Adjustment Mechanism | 1608 | Rotatable Display(s) |
| 1804 | Viewing Target | 1802 | Power Source |
| 2102-2108 | Blocks | 2002 | Adjustment Mechanism |
| 2204 | Light Emitter(s) | 2202 | Holographic Display |
| 2208 | Screen(s) | 2206 | Light |
| 2212 | Optical Elements | 2210 | Hologram |

DETAILED DESCRIPTION

This application describes system(s) and method(s) for controlling content displayed on a billboard, display, or other sign. A sign according to this application may be mounted, disposed, or affixed above or adjacent to parking lots, groups of pedestrians, and/or roadways, such as highways, freeways, and/or interstates. In some examples, the sign may be mounted or affixed to ground-based vehicles such as buses, trains, cars, trucks, motorcycles, trailers and/or other vehicles (e.g., water vehicles and/or aerial vehicles).

The sign may include a display that presents content such as advertisements, promotional offers, public service announcements, notifications, and/or other content to drivers and/or occupants of vehicles. The content displayed by the sign may include static images, dynamic or periodically changing images, moving displays, videos, and/or any other visual content. Additionally, in some instances, the content may be a blank image (e.g., blue screen, black screen, etc.). When the sign is disposed on a vehicle, the vehicle may be stationary or may traverse or move through traffic to display content. In some examples, the sign may comprise an electronic display (e.g., a liquid crystal display, light emitting diode display, plasma display, or other digital display) and/or a non-electronic display (e.g., a non-digital display made of wood, metal, plastic, a combination thereof, or similar materials suitable for creating a non-digital display). In some instances, the sign may additionally or alternatively include one or more projectors and/or lasers that present holograms (e.g., static or dynamic).

In some examples, the sign may be part of a display system that includes a variety of sensors to sense objects in an environment of the display system. For instance, the sensors may be used to detect attributes (e.g., a speed, a location, a position, and so on) of the objects in the environment. In the case of a vehicle-mounted display system, sensors may also or instead be used by the system to determine attributes (e.g., a speed, a location, a position, and so on) of the display system (e.g., the sign) relative to a viewing target (e.g., a pedestrian, group of pedestrians, a vehicle, occupants of a vehicle, etc.). In some examples, a display system (stationary or vehicle-mounted) may adjust an elevation and/or orientation of the sign. In the case of a vehicle-mounted display system, a height and/or orientation of a sign of the display system may be adjusted based on a speed of the vehicle to which the display system is mounted. As one example, the sign may be elevated for display to one or more viewing targets proximate the vehicle when the vehicle is traveling at or below a threshold speed (e.g., 10 miles per hour, 20 miles per hour, etc.) and may be automatically lowered when the vehicle exceeds the threshold speed. As another example, an angle of the sign may be automatically adjusted based on a speed of the vehicle to reduce wind resistance at higher speeds. The position and/or orientation of a sign of a vehicle-mounted display system may additionally or alternatively be based on, for example, a location of one or more viewing targets (e.g., drivers, passengers, pedestrians, or other people) in the environment of the display system, whether or not the sign has been seen by one or more viewing targets, a location of the display system, a time of day, traffic, surrounding structures (e.g., bridges, garages, parking lots, drive-throughs, etc.), and/or one or more environmental conditions (e.g., wind, rain, sun light, etc.).

Content may be output on a display of the display system based on sensor data associated with the sensors. For example, the display system may use the sensor data to adjust a viewing angle at which the content is displayed, to relocate the system to another location in the environment, and/or to determine whether the content was viewed, just to name a few. In various examples, the content to be presented on the sign may be determined and/or adjusted based at least in part on a speed of a target audience relative to the environment, a speed of the sign relative to a speed of the target audience, a position of the target audience, an identity of the target audience, and/or an interaction sensed between the target audience and the display system. These, and other examples, are explained in more detail herein.

In at least some examples, the system described herein may be configured to receive sensor data from one or more sensors indicative of a position of a viewing target (a potential viewer of content) relative to the sign and adjust a viewing angle over which the display is viewable by the viewing target based at least in part on the received sensor data. In such an example, the system may be further configured to output image data (e.g., content) for display on the sign at the viewing angle. Here, the viewing angle may represent an angle at which to position the display for reaching the viewing target and may be adjusted in a variety of ways. For instance, the viewing angle may be adjusted based at least in part on rotating the sign about horizontal and/or vertical axes, moving the sign, adjusting (e.g., limiting or increasing) the viewing angle from which the display is viewable using one or more screens, shutters, blinds, privacy filters or other view limiting component that controls a range of angles from which the sign is viewable.

In some examples, the sensors of the display system may be used to determine a difference between a speed of an object in the environment and a speed of the display system, and output content on a display of the vehicle-mounted system based at least in part on the determined difference in speed. In such examples, the difference between the speed of the display system and the speed of the object (e.g., a target audience) may be used to determine a viewing angle for outputting the content to the target audience thereby ensuring that the content is viewable by the target audience prior to outputting the content.

In some examples, relocating the sign and/or adjusting a viewing angle for displaying content may be based at least in part on sensor data associated with the sign. In such examples, the system may use the sensor data to adjust a range of viewing angles that are visible to a target audience and select a viewing angle from the range of viewing angles that maximizes a likelihood that the target audience views the content. For instance, the sign may select a first viewing angle and a second viewing angle from the range of viewing angles to maximize a number of viewers that can view the sign and/or to target one or more particular viewers (e.g., viewing targets) from among multiple potential viewers in the environment. For instance, in some examples, the display system may orient the sign so that the viewing angle is directed toward one or more potential viewers that have not yet viewed the sign and/or toward whom the sign was not previously directed. In some examples, sensor data may be received from sensors coupled to the sign and/or remote sensors separate from the sign (e.g., sensors disposed in or adjacent to a roadway and/or sensors of another vehicle).

The system(s) and method(s) for controlling display of content may comprise a stability mechanism (to maximize legibility of the content during viewing) and/or an adjustment mechanism (to adjust a position and/or orientation of the sign relative to a frame or vehicle to which the sign is mounted). In examples that employ a stability mechanism, sensor data may be used by the system to make adjustments to an orientation of the sign (e.g., the display) relative to a viewing target to maintain an optimal viewing angle between the sign and the viewing target. In some examples, the adjustment mechanism enables the display to be positioned in a variety of viewing angles that are each configured to improve visibility of the displayed content by a viewing target, and may include positioning the sign automatically based at least in part on sensor data for one or more sensors. In the case of vehicle-mounted display systems, the display system may include one or more motion sensors (e.g., accelerometers, gyros, internal measurement units, etc.) to detect and measure motion of a vehicle to which the display system is mounted and to adjust position and/or orientation of the sign to compensate for motion of the vehicle. In this way, the system may implement a viewing angle that causes the content on the sign to appear stable to the viewing target during viewing. In one specific example, the adjustment mechanism may adjust the sign to account for motion of the vehicle to which the display system is mounted (e.g., due to contour of a roadway—uphill, downhill, curved, tilted, etc.) or environmental conditions that may impact viewing the sign (e.g., wind and the like). The system described herein may, in some examples, comprise a safety mechanism that prevents content from being displayed when it is unsafe to do so. Additionally or alternatively, law(s) may prohibit displaying content on a sign in certain scenarios, and the safety mechanism may be configured to turn off, cover, restrict the viewing angle, or otherwise prevent the sign from outputting content (or limiting a range of viewing angles) to comply with the law. In various examples, the safety mechanism may be configured to determine whether a display outputs static content, dynamic content, a combination thereof, or no content at all (e.g., in compliance with laws mentioned above).

The sign may include mechanisms that maximize an advertising impact of the displayed content while minimizing potential driver distraction. For instance, the sign may include a screen, shutter(s), mechanical blind(s), privacy filter or other view limiting component that limits viewing of the sign to within a predetermined distance or range, or when conditions are otherwise unsafe. In other words, the privacy filter or other structure may limit viewing of the displayed content to drivers and/or occupants of vehicles within the predetermined range. The sign may in some instances include one or more privacy filters (or other view limiting component), to limit viewing of the content from multiple positions (e.g., in front of, sides, above, below, etc.).

In some instances, the predetermined range may be associated with a range of viewing angles at which the display, or the displayed content, is visible. The privacy filter or other structure may prohibit or limit occupants of vehicles outside the predetermined range (or viewing angle) from viewing the displayed content. Restricting the displayed content in this manner may minimize or prevent driver distraction. However, as the vehicles approach the sign and/or are within the predetermined range (or viewing angles), the driver and/or the occupants of the vehicles may be permitted to see the displayed content. In this manner, the sign may control viewing of the displayed content to within the predetermined range of the sign.

In some examples, the sign may include actuators, motors, or other mechanisms (e.g., the adjustment mechanism noted above) that adjust the predetermined range at which the displayed content is visible. As an example, an actuator may operably couple to the sign and change a height and/or an angle at which the sign is disposed relative to the roadway (or viewing target). The angle and/or height at which the sign is disposed may adjust the predetermined range at which the displayed content is visible. The actuator may therefore provide a convenient mechanism to alter the viewing angles at which the displayed content is visible, thereby controlling a visibility of the displayed content. Additionally, or alternatively, in some instances, the predetermined range at which the displayed content is visible may be adjusted through repositioning the privacy filter or other structure relative to the sign or otherwise adjusting a range of viewing angles that are visible through the privacy filter or other structure.

In some examples, sensors may monitor or detect speeds of the vehicles within a predefined proximity, vicinity, range, or distance of the sign. In some instances, the sensors may be integrated with or within the sign and/or may be separate from the sign. For instance, the sensors may be embedded into roadways, or may be placed on separate structures that are adjacent to the roadway on which the sign is disposed (e.g., post, gantry, traffic signal, vehicle, etc.). In some instances, the sensors may detect the speeds of the vehicles as the vehicles approach the predetermined range of viewing angles at which the displayed content is viewable, or may detect the speeds of the vehicles within the predetermined range of viewing angles at which the displayed content is viewable.

The sensors may include any type of sensors configured and/or arranged to detect speeds of the vehicles. In some instances, suitable sensors may include radar, sonar, lidar, infrared, acoustic (e.g., detect sound from passing vehicles), inductive or magnetic (e.g., wire embedded within the roadway that creates electrical current), microwave (e.g., sensor measures change in frequency of waves), infrared, video (e.g., video/image analysis to determine speed of vehicles), piezoelectric (e.g., piezoelectric sensor mounted or integrated into the roadway), and/or pneumatic (e.g., pneumatic road tube disposed across roadway). As noted above, these sensors may be integrated into the roadway, may be placed on a structure positioned beside a roadway, or a structure to which the sign couples (e.g., post, gantry, traffic signal, vehicle, etc.).

In some instances, the sign may output different content based at least in part on the speed of the vehicles. That is, based on the speed of the vehicles, the sign may output different content on the display. As an example, in instances where vehicles are traveling at a high rate of speed, or are traveling faster than a predetermined threshold speed, the display may output static content (e.g., a static image, multiple sequential static images, etc.), may prohibit the output of content, may output slowly changing content, or may be made blank (e.g., black image, blue image, etc.). Outputting static or blank images in this scenario may prevent or minimize driver distraction. In other words, when the speeds of the vehicles are greater than the predetermined threshold speed, the sign may output less distracting or diverting content. Comparatively, in instances where vehicles are stopped, traveling at a lower rate of speed (e.g., creeping), or are traveling lower than the predetermined threshold speed, the display may output dynamic content, such as videos, motion-picture, changing or flashing displays. In this scenario, as vehicles are travelling at lower rates of speed, the risk of accident and the speed with which accidents may occur may be lower and, accordingly, the sign may output more dynamic or attention catching content.

In examples in which the sign mounts to a vehicle, the sign may include one or more sensors to determine speeds, locations, positions, orientations, etc. of the sign and/or a viewing target, and/or content to be output by the sign. For instance, a first sensor may determine the speed of the vehicle on which the sign is coupled, while one or more additional sensors may determine the speed(s) of the vehicles in oncoming traffic and/or traffic located behind the vehicle. Using these speeds (the speed of the vehicle to which the sign is mounted and the speed of the other vehicles relative to the vehicle to which the sign is mounted), the sign may determine the absolute speed(s) of the other vehicles and the sign may display static or dynamic content based upon such absolute speed(s) according to the techniques described above and elsewhere herein.

Sensors may also determine a number or quantity of vehicles within the predefined proximity, vicinity, distance, or range from the sign. In some examples, the sign may determine a finite number of vehicles, while in other examples, the sign may determine a ranges or approximations of quantity of vehicles (e.g., zero vehicles, 1-5 vehicles, 6-10 vehicles, 11+ vehicles, no vehicles, few vehicles, many vehicles, etc.). The sensors may also monitor a proximity of the sign relative to other structures to determine whether to change the position and/or orientation of the sign. For example, a sensor may detect or determine clearances in-front of a vehicle to which the sign is coupled. As the vehicle drives, the sensors may be used for determining upcoming clearances for use in controlling the position and/or height of the sign. For example, if the vehicle enters a garage, the sensor may detect the low clearance and alert a driver of the vehicle. In such instances, the alert may warn of the potential damage if the sign is not lowered and/or may notify the driver to lower the sign from a raised position, for instance. In some instances, the notification may be sent based at least in part on determining that the sign will contact the structure. The sign may also automatically lower upon determining the clearance or may provide the driver (or other personnel) with one or more notifications to take one or more actions to prevent potential damage to the sign.

In some instances, the sensors may be integrated with or within the sign and/or may be separate from the sign to determine the number of the vehicles within the predetermined range or within the viewing angles of the display. For instance, sensors may be embedded or integrated into roadways, or may be placed on separate structures that are adjacent to the roadway (e.g., post, gantry, traffic signal, vehicle, etc.). In some instances, suitable sensors may include radar, sonar, lidar, infrared, acoustic (e.g., detects sound from passing vehicles), inductive or magnetic (e.g., wire embedded within the roadway that creates electrical current), microwave (e.g., sensor measures change in frequency of waves), infrared, video (e.g., video/image analysis to count the number of vehicles), piezoelectric (e.g., piezoelectric sensor mounted or integrated into the roadway), and/or pneumatic (e.g., pneumatic road tube disposed across roadway).

The sign may utilize the number or quantity of vehicles to determine to output different content on the display. For instance, the sign may output certain content based on the number of vehicles such that, upon detecting a specified number or quantity of vehicles within the predetermined range of the sign, the sign may cause certain content to be displayed. Determining the number of vehicles within the predetermined range from the sign may also be used to determine an average vehicle speed, which may be utilized to output certain content on the display (e.g., dynamic content or static content).

In some instances, the number of vehicles may also be utilized to determine a rate or value associated with displaying the content. For instance, a value associated with displaying an advertisement on the sign may be based at least in part on the number of vehicles within the predetermined range of the sign and/or a number of occupants of vehicles within the predetermined range of the sign. In other words, the number of vehicles within the predetermined range and capable of seeing the displayed content may affect a price associated with displaying the advertisement on the sign. As an example, in rush-hour traffic where a large number of vehicles are on the roadway, a value associated with displaying an advertisement on the sign may increase, as compared to the middle of the night or in the early morning where not as many vehicles are on the roadway. Accordingly, using the sensors to determine or count the number of vehicles, a value of displaying an advertisement on the sign may take into consideration the number of vehicles on the roadway or a number of occupants within the vehicles. In some examples, advertisers may be charged based on the actual measured number of impressions of an advertisement (e.g., a number of people that actually observed or were within range to observe the advertisement during the time in which it was displayed).

In some instances, the sign may utilize the speed of the vehicle(s) within the predetermined range of the sign, as well as the number of vehicles, when outputting content on the display. For instance, if a specified number of vehicles within the predetermined range of the sign are traveling greater than the predetermined threshold speed, the sign may display static content, may prohibit the output of content on the display, or the sign may be made blank. As another example, if a specified number of vehicles within the predetermined range of the sign are traveling less than the predetermined threshold speed, the sign may display dynamic content, such as videos, motion-picture, changing or flashing displays.

Additionally, or alternatively, content being displayed and/or a position (or orientation) of the sign may be based at least in part on a time of day. For example, during low-traffic hours the sign may lower to a retracted position. The content may also, during low-traffic hours, prevent or terminate display of content on the sign (e.g., power off).

In some instances, the sign may include lifts, jacks, hoists, hydraulic cylinders, pneumatic cylinders, linear actuators, or any combination thereof to position of the sign relative to the roadway and/or to the vehicle to which the sign couples. In some instances, the sign may include one or more lifts to vertically and/or horizontally position or maneuver the sign above the roadway. When the sign is a vehicle-mounted sign, the lift(s) may raise and/or lower the sign above the vehicle to increase or decrease a visibility in front of, or behind the vehicle. Adjusting the vertical and/or horizontal position of the sign may affect the predetermined range at which the displayed content is viewable and/or the viewing angles at which the displayed content is viewable. Additionally or alternatively the sign may include an adjustment mechanism configured to adjust an orientation of the display screen relative to the vehicle or trailer to which it is mounted. In examples that include a lift, the adjustment mechanism may be part of, or separate from, the lift. The adjustment mechanism may be configured to rotate the sign about a vertical axis (e.g., rotation from side to front/back of the vehicle) and/or rotate about a horizontal axis (e.g., tilting the sign up or down to capture a range closer or further from the sign).

In some instances, the sign may be vertically adjusted based on the speed and/or the number of vehicles within the predetermined range of the sign. As an example, when a specified number of vehicles are traveling slower than the predetermined threshold speed, the sign may be lowered or deployed from a gantry disposed over the roadway to display content. Alternatively, when a specified number of vehicles are traveling greater than the predetermined threshold speed, the sign may retract or stow. In examples in which the sign is a vehicle-mounted sign, the sign may be deployed or raised when the speed of the vehicle to which the sign is mounted is at or below a threshold speed (e.g., 5 miles per hour, 10 miles per hour, etc.), and may be collapsed, retracted, or folded down, or otherwise lowered when the speed of the vehicle is greater than the threshold speed. Furthermore, as noted above, the sign may be vertically adjusted based at least in part on structures (e.g., garage) within a path or field of travel of the vehicle to which the sign couples. For example, sensor may detect an upcoming structure and cause the sign to retract or fold down to avoid damage to the sign.

In some examples, the sign may display content that is tailored or targeted to one or more occupants of a vehicle that is within the predetermined range and/or viewing angle of the sign. For instance, the sign may include cameras and software to recognize license plates (rear and/or front) or other vehicle identifiers. In some instances, the cameras may be oriented to capture a license plate of a vehicle as the vehicle approaches the sign, such as when the vehicle is within the predetermined range of the sign. The software may utilize the license plate to determine an identity of a driver of the vehicle and/or information about the driver or other occupants of the vehicle (e.g., demographics, number of occupants, age of one or more occupants, gender, etc.). In some instances, the identity of the driver may be used to cross-index available email addresses, phone numbers, and/or user accounts. The email addresses and/or phone numbers may be utilized to determine characteristics of the driver. For instance, using an identification of the driver, the sign (or another communicatively coupled computing device) may determine preferences of the driver, a shopping or purchase history of the driver, and/or a browsing history of the driver. Utilizing this information, the sign may display targeted advertising directed to the driver. Additionally, or alternatively, the sign may utilize the location of the sign to display content advertising nearby restaurants, shops, or hotels that are proximate to the location of the driver.

Moreover, in some instances, the sign may employ facial recognition techniques to identify or determination information (e.g., demographics, number of occupants, age of one or more occupants, gender, etc.) about occupants of vehicles (e.g., the driver, passengers, etc.). In other embodiments, radio-frequency identification (RFID) tags may be used to obtain demographic information about the occupants of the vehicle. For instance, an RFID tag associated with a vehicle may be read by an RFID reader of the sign or in communication with the sign to retrieve information about the vehicle, driver, or other occupants. In some examples, the sign may include a global positioning system (GPS), and utilizing a known location of the driver, for instance, via their mobile phone, the system may display targeted content on the sign. In some instances, the sign may display the content and/or the sign (or another communicatively coupled computing device) may deliver the content to the mobile device of the driver. For instance, knowing the location of the sign and the location of the driver, the sign may display an advertisement for a restaurant located within the vicinity of the sign. This advertisement may be transmitted to the mobile phone of the driver as well and/or other occupants of the vehicle (e.g., by text message, email, an application on the driver's mobile phone, etc.). In some instances, the occupants of the vehicle may utilize the advertisements to make reservations (e.g., hotel, restaurant, etc.) and/or place orders (e.g., online retailers).

The sign may vary a brightness of the display depending on the time of day and/or a direction of the display. For instance, the sign may include a light sensor (e.g., photoresistor) that detects an ambient brightness (e.g., luminosity) and causes a brightness of the display to increase during bright daylight and decrease during period of lower ambient light (e.g., evening and nighttime hours). A clock may additionally or alternatively be included in and/or in communication with the sign and used to determine a time of day and/or determine a corresponding brightness of the display.

In some instances, the sign may be coupled to one or more solar panels to power components of the sign, such as the display and other electronic components of the sign. When the sign is mounted to the vehicle, the vehicle transporting the sign may include solar panels to power the sign. For instance, carrier vehicles, such as a semi-truck, may include solar panels disposed along a hood, roof, top, and/or sides of the vehicle and/or trailer that supply the sign with power.

The system(s) and methods according to this disclosure may also transmit radio transmissions (e.g., AM, FM, satellite, etc.), online audio, radio frequency transmissions (e.g., cellular, wifi, Bluetooth, etc.), or a speaker system to broadcast audio within the proximity or vicinity of the sign. In some instances, the audio may be related to and/or supplement the content output on the display.

In some instances, the sign may include a defroster for preventing the accumulation of ice and/or snow on the display. Additionally, or alternatively, the sign may include washers, fans, etc. to clean dirt, grime, or other debris off the display.

These and other details are described further below with reference to drawings showing various example implementations.

Example Roadway-Mounted Sign

FIG. 1A illustrates a sign 100 positioned over a roadway on which vehicular traffic 105 travels. As shown, the sign 100 may be secured to an arm 110 of a stoplight stanchion 115. In some instances, the stanchion 115 may be located at an intersection, on ramp, off ramp, or other location where vehicles frequent and/or periodically stop. However, the stanchion may also be located along, over, or near other portions of the roadway.

In some instances, the arm 110 may include one or more signal lights 120 that direct or control a flow of the traffic 105. While FIG. 1A illustrates a particular location of the sign 100 on the stanchion 115, or relative to the signal lights (e.g., in between the signal lights 120), the sign 100 may be located adjacent to the signal lights 120, above the signal lights 120, or below the signal lights 120. Additionally, the stanchion 115 may include more than one sign 100.

The sign 100 may include one or more sensors 125 that detect speeds of vehicles in the traffic 105. In some instances, the sensor(s) 125 may detect an average or general speed of vehicles in the traffic 105, or the average or general speed may be computed based on speed measurements of individual vehicles. The sensor(s) 125 may provide a computer-sensible digital signal representative of the average or general speed of vehicles in the traffic 105. Additionally, or alternatively, as discussed herein, a vehicle recognition system may be used to determine the speeds of the vehicles within the traffic 105. The sensor 125(s) may include radar (radio detection and ranging), sonar (sound navigation and ranging), lidar (light detection and ranging), infrared, video, or another vehicle-sensing system that measure the speeds of the vehicles within the traffic 105.

The sensor(s) 125 may be affixed or coupled to the sign 100, the arm 110, and/or the stanchion 115. For instance, the sensor(s) 125 may be positioned atop the sign 100, on sides of the sign 100, a bottom of the sign 100, and/or may be built into the sign 100. Additionally, or alternatively, the sensor(s) 125 may be located on the roadway (e.g., embedded therein), positioned adjacent to the roadway on a shoulder and/or positioned above the roadway (e.g., post, gantry, traffic signal, vehicle, etc.).

The sensor(s) 125 may be oriented to detect the speed of the traffic 105 as vehicles approach or near the sign 100. As an example, the sensor(s) 125 may be arranged to detect the speed of the traffic 105 within about 100 meters of the sign 100. However, in other instances, the sensor(s) 125 may detect speed of the traffic 105 at other distances, such as within about 25 meters, 50 meters, or 75 meters of the sign 100.

The sign 100 includes a display 130 that displays visual images through the use of any display technology. The display 130 may include an array or discrete and organic light-emitting diodes (LEDs), or alternatively, may include a plasma screen, a liquid-crystal display (LCD), an electro-mechanical screen, a video projection screen, a micro-electrical mechanical systems (MEMS) projection display, etc. A brightness of the display 130 may be adjusted to accommodate a time of day. For instance, the display 130 may increase in brightness during periods of bright light (e.g., daylight) and decrease during periods of low light (e.g., at nighttime). Additionally, or alternatively, the display 130 may be powered during certain times of the day to conserve energy. For example, during non-peak traffic hours the display may terminate the presentation or output of content.

In some instances, the sign 100 may include a projector for presenting a hologram within a vicinity of the sign 100. The projector, may, for instance project the hologram into a space within the sign for presenting content (e.g., advertisements). Components of the sign 100 may control a display of the projection and/or content (i.e., the hologram) that is presented.

The sign 100 may be oriented over the roadway to be seen by vehicles and/or occupants in the traffic 105. The sign 100 may receive information or other data (e.g., image data, video data, etc.) to be displayed on the display 130. In some instances, the sign 100 may receive the data from a data source or data resource 140 (FIG. 1D) via one or more network connections, such as satellite, radio, television, Internet, and/or hard-wire. The data resource 140 may transmit information about the use of system 135 (or 135', FIG. 3B) and/or the sign 100 for billing and/or other informational purposes. For example, an amount of time the sign 100 displays a particular piece of content (e.g., advertising material) may be recorded, stored, and/or forwarded from the data resource 140 to one or more third-parties. The amount of time the sign 100 displays the piece of content may be used to determine a value associated with displaying the content. Accordingly, businesses may be billed for the amount of time their content was displayed on the sign 100.

Additionally, or alternatively, billing may be based on an algorithm that accounts for one or more weighted factors, including time of day, direction of exposed traffic, day of week, number of vehicles driving past the sign 100, holiday impact, local special events, weather conditions, location of the sign 100, demographics of the vehicle, the driver, and/or the occupants of the vehicle, geographical demographics, and/or the demand for advertising at a particular location of the sign 100. Billing in some instances may also be part on a percentage of sales contributable to the content being display. For example, billing may be based on a sales volume or a percentage of sales of goods or services in consideration for displaying content on the display 130.

Figure 1B:
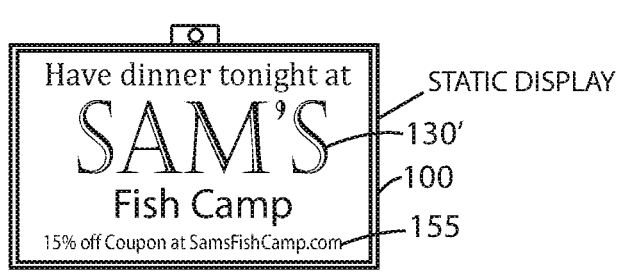
FIG. 1B shows an example roadway sign in a static condition, according to an embodiment of the present disclosure.

In FIG. 1A, the display 130 on the sign 100 may include a video or moving image (e.g., dynamic). In FIG. 1B a display 130' on the sign 100 may include a static image, such that the image on the display 130' does not change with time. In some instances, the display 130' may be blank in that no visible information is displayed or the display 130' may be illuminated to a particular color (e.g., grey, black, blue, etc.). In some instances, the display 130' may be blank or illuminated to the particular color when no paid advertising information is available, or when local authorities require this to be the case, for example.

Figure 1C:
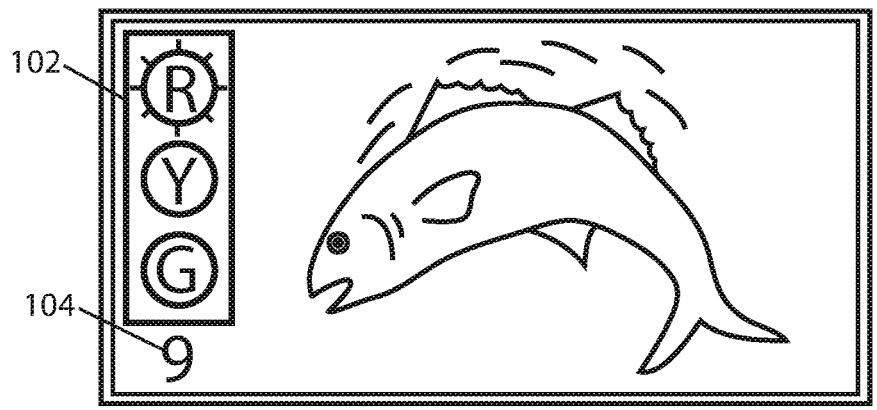
FIG. 1C shows an example roadway sign including a traffic stop light and a countdown timer, according to an embodiment of the present disclosure.

While the signal lights 120 in FIG. 1A is shown separate as being separate from the sign 100, in some instances, the signal lights 120 may be incorporated into the sign 100. For instance, as shown in FIG. 1C, the sign 100 may include a traffic signal display 102 having colored red, yellow, and green lights to indicate "stop", "caution", and "go" instructions to the traffic 105, respectively. The sign 100 may also include a countdown display 104 that indicates the time remaining in seconds until a "green" or "go" signal or until the traffic signal display 102 changes.

Figure 1D:
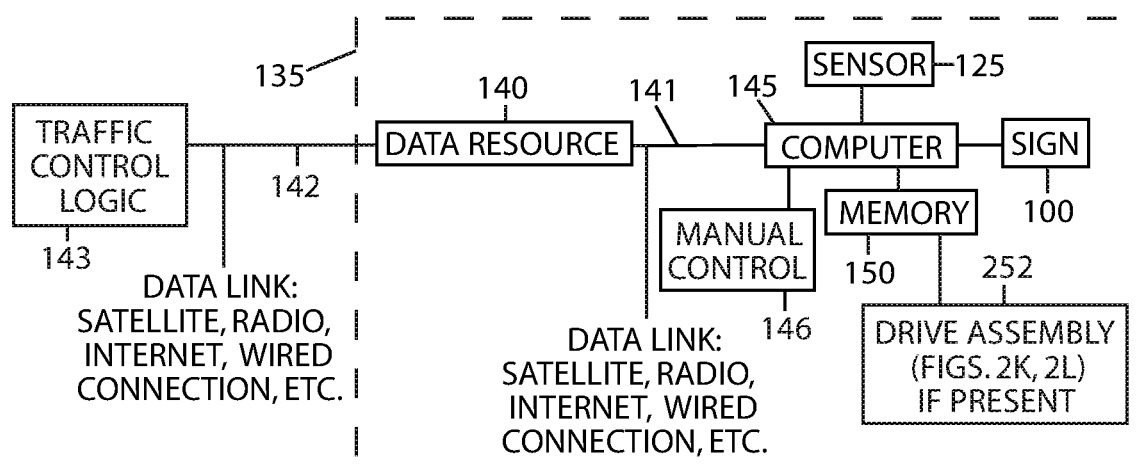
FIG. 1D shows an example system, according to an embodiment of the present disclosure.

FIG. 1D shows a system 135 that may be used in some instances for controlling the sign 100. The system 135 may be energized by local power mains or batteries. In some instances, the system 135 may include solar panel(s) 230 (FIG. 2D) that capture solar energy and power the system 135. In some instances, the system 135 may include a data resource 140, a computer 145, memory 150, the sign 100, and/or the sensor(s) 125. The data resource 140 may include programmed instructions for operating the sign 100 and the displays 130, 130' (FIG. 1A), etc. In some instances, the data resource 140 may represent a slave computer having memory that receives information from another communicatively coupled computer (e.g., server). The information may control an operation of the sign 100, broadcasts, and the like, from any remote source such as another computer connected via the Internet. The system 135 may include wireless and/or wired transceivers to provide an external data link 142, such as a satellite link, radio, Internet, or wired connection, that connects the data resource 140 to an external traffic control logic 143 that provides traffic signal control timing for the traffic signal display 102 and the countdown display 104. For instance, when the data resource 140 receives a "green" or "go" signal from the external traffic control logic 143, programmed instructions within the data resource 140 may cause the sign 100 to display a static image so that drivers of vehicles in the traffic 105 are not distracted.

The computer 145 contains a microprocessor or other logic that obtains information from the data resource 140 and stores the information in the memory 150. The computer 145 may retrieve the programmed instructions as needed, and at least one or more images for output on the displays 130, 130', as described below in connection with FIG. 3C. The computer 145 may also receive signals or other data representative of the speed of vehicles in the traffic 105 from the sensor(s) 125 as the vehicles approach the sign 100.

When the sign 100 is energized, the sensor(s) 125 monitors the speed of vehicles in the traffic 105 within a predetermined range and as the traffic 105 approaches the sign 100. The computer 145 may receive the speed (e.g., speed data) from the sensor(s) 125. When the traffic signal 120 is green or a specified number of vehicles reach a predetermined threshold speed, for example 40 km/h, the programmed instructions in the memory 150 may cause the display 130' (FIG. 1B) to be retrieved from the memory 150 and transmitted to the sign 100 for display. As noted above, the display 130' may be either a static image or blank and may be used when the traffic 105 is moving relatively fast and drivers may not have time to follow a moving advertisement (or other content) and/or may be unduly distracted. Conversely, upon receiving data from the sensor(s) 125 indicating the traffic 105 is moving relatively slowly or below the predetermined threshold speed, for example, 8 km/h or less, the computer 145 may retrieve the display 130 (FIG. 1A) from the memory 150 and may transmit the display 130 to the sign 100. The display 130 may be used at predetermined relatively low speeds, such as stop-and-go rush-hour traffic, when drivers may have time to safely observe moving or dynamic advertisements and/or are less or unlikely to be unduly distracted. Although speeds of 8 km/h and 40 km/h are used in the above example, other predetermined speeds may be used to present the displays 130 and 130', respectively.

In some instances, certain locales may legislate the speeds, times of day, etc. when the sign 100 may be active, display dynamic content (e.g., videos, flashing advertisements), display static content, and/or when the sign 100 is blank. In such instances, the system 135 may include a manual override control 146 that permits manual control of the sign 100 for emergencies and events (e.g., parades) so that officials may take control of the sign 100 in real time and/or for a predetermined period, after which the system 135 may be re-enabled. In some instances, the manual override control 146 may be a panel-mounted or hand-held rotary switch on the sign 100, or the equivalent. This information may be provided and controlled by the data resource 140.

The data resource 140 may send updated display information to the computer 145 at a predetermined rate so that displays 130 and 130' display available latest information (e.g., most recent or new advertisements). The display 130' may include subordinate or short-term advertising 155 as indicated in FIG. 1B. For example, an advertiser may offer discounts to attract business at slow times of the day, or during non-peak hours. In some instances, the displays 130 and/or 130' may terminate the output of content during non-peak hours to conserve energy. If the traffic signal display 102 and/or the countdown display 104 are present, the external data link 142 (FIG. 1D) may receive signals from the external traffic control logic 143 and transmits these signals to the computer 145.

In some instances, optional short-range FM or other broadcasting may be broadcasted in conjunction with displaying the displays 130 and/or 130' and throughout the cycling of a moving and static or blank display.

FIG. 1E is a flowchart showing one aspect of operation of the present embodiment. Instructions for this mode of operation are contained in the memory 150 of the computer 145. At the start (block 170) the system 135 is energized. For instance, the system 135 may be powered by solar energy captured by solar panels. When manual override is selected by the manual override control 146, an operator may make a manual selection (block 174) to retrieve and display a static display (block 176), to retrieve and display a moving display (block 178), or to display a blank image on the sign 100 (block 180). If manual override is not selected (block 172), the computer 145 receives information regarding the speed of vehicles in the traffic 105 via the sensor(s) 125 (block 182). If the traffic 105 is moving faster than a predetermined threshold speed (block 184), the computer 145 retrieves and displays a static display from the memory 150 (block 186). If vehicles in the traffic 105 are moving at less than or equal to a predetermined speed (block 188), the computer 145 retrieves and displays a moving display from the memory 150. After a selection is made at each choice point (blocks 172, 184, and 188), control of this aspect of the program running in the computer 145 returns to the first choice, i.e., manual override (block 172). Operation of the sign 100 may continue in this manner until the sign 100 is de-energized.

FIG. 2A shows a roadway directional sign 200 accompanied by an advertising and/or informational sign 100. The sign 100 may be mounted beside the roadway directional sign 200 on a beam 202. As discussed above, in some instances, the sign 100 may include the sensor(s) 125 to detect the speed of the traffic 105. The sensor(s) 125 may also be configured to determine the direction of the traffic 105. The sensor(s) 125 may transmit speed data to the computer 145 (FIG. 1D), which determines whether the sign 100 displays the display 130 or the display 130'.

In some instances, the sign 100 may also display roadway information and/or other public service announcements, such as "Caution! Slow traffic for the next 5 miles" or "Amber Alerts."

FIG. 2B illustrates that instead of being placed overhead, the sign 100 may be mounted in a free-standing manner beside a roadway.

FIG. 2C shows the addition of vehicle recognition sensors 220 and 220' in the vicinity of the sign 100. In some instances, the vehicle recognition sensors 220 and 220' may be mounted on the sign 100 above the roadway, adjacent or on the side of the roadway, across the roadway, or integrated into the roadway. The vehicle recognition sensors 220 and 220' may include cameras and software to recognize license plates on vehicles. In some instances, the vehicle recognition sensor 220 is positioned or arranged to capture the rear license plate information after a vehicle 210 passes beneath the sign 100, while the vehicle recognition sensor 220' may be positioned or arranged to capture the front license plate information as a vehicle 215 approaches the sign 100. License plate information and the related model and year of the vehicles 210 and 215 may be used to determine driver demographics and deliver selective advertising. Additionally, vehicle ownership records may be cross-indexed with available email addresses, Internet addresses, and/or mobile devices to facilitate delivery of selective advertising. For instance, using the email address and/or the mobile phone number of the driver, the sign 100 and/or another communicatively coupled computing device may analyze a browsing or search history of the driver and determine content specific to the driver. The content may be displayed on the sign 100 and/or may be delivered to the mobile device of the driver. For instance, utilizing a browser history, the sign 100 and/or another communicatively coupled computing device may determine that the driver enjoys seafood. Using a location of sign 100, the sign 100 (or another communicatively coupled computing device) may determine that a seafood restaurant is nearby may display marketing material targeted to the driver. Additionally, or alternatively, the sign 100 and/or the system 135 may transmit coupons, reservation links, and/or other marketing material to the mobile device of the driver.

In some instances, cameras and software capable of scanning and recognizing license plates may include those manufactured by the Thales Group of Neuilly-sur-Seine Cedex, France, and Perceptics Imaging Technology Solutions of Knoxville, Tenn.

Additionally, or alternatively, the sign 100 and/or the system 135 may include facial recognition software to identify occupants of vehicles (e.g., driver and/or passengers) for gathering of demographics, determining targeted advertising material, transmitting coupons or reservation links to mobile devices of the occupants, and displaying the targeted advertising material on the sign 100.

The vehicle recognition sensors 220 and 220' may also include cameras or other sensors that detect and/or recognize license plates, windshield tags, radio-frequency identification (RFID) tags, or other vehicle identifiers that are usable to identify vehicles or their occupants and/or to determine demographic information about the occupants. In some instances, the vehicle recognition sensors 220 and 220' may be a part of the data resource 140 (FIG. 3B).

In addition to the vehicle recognition sensors 220 and 220', the sign 100 and/or the system 135 may include or employ additional sensors that count and provide information about passing vehicles. As an example, FIG. 2C illustrates subsurface and surface sensors 221 and 222, respectively, disposed on the roadway in which the vehicles 210 and 215 travel. The subsurface and surface sensors 221 and 222 may determine the number of vehicles that have entered a designated area adjacent to a stop light, for example, ten vehicles deep in three lanes, may determine the number of vehicles within a predetermined distance, vicinity, or range of the sign 100, and/or may determine the number of vehicles within the viewing angles at which a display of the sign 100 is viewable. In some instances, the subsurface and surface sensors 221 and 222 may also determine the speed of the vehicles within the predetermined distance or range of the sign 100.

The subsurface and surface sensors 221 and/or 222 may be communicatively coupled to the sign 100 and/or the system 135 to transmit data indicating the number and speed of vehicles in traffic 105. For instance, the subsurface and surface sensors 221 and 222 may be connected to the computer 145 (FIG. 3B) and transit data indicating the number and speed of vehicles in traffic 105. Upon detecting a specified number of vehicles the computer 145 may cause the sign 100 to be activated. In some instances, the computer 145 may cause the sign 100 to be activated based at least in part on the speeds of the vehicles being under the predetermined threshold speed. Additionally, or alternatively, the computer 145 may cause the sign 100 to be activated (e.g., display dynamic content) when the signal light is red, and deactivated (e.g., display static content, a blank screen, or no content) upon a green light.

In some instances, the subsurface and surface sensors 221 and/or 222 may include optical, magnetic, force, pressure, and vibration sensors. As noted above, although described herein as subsurface and surface sensors positioned on the roadway, the sign 100 and/or the system 135 may include sensors positioned or coupled to the sign 100 placed above the roadway and/or adjacent to the roadway (e.g., on the shoulder). In other instances, vehicle mounted black box systems and/or RFID tags that transmit vehicle data to roadside, road surface, or road-embedded sensors may also be used to determine a vehicle count within a defined area and/or demographically identify vehicle occupants. In some examples, the sensors may include magnetic sensors sold by the Honeywell Corporation of Morristown, N.J., USA, optical sensors and counting devices sold by Jamar Technologies, Inc., of Hatfield, Pa., USA.

Figure 2D:
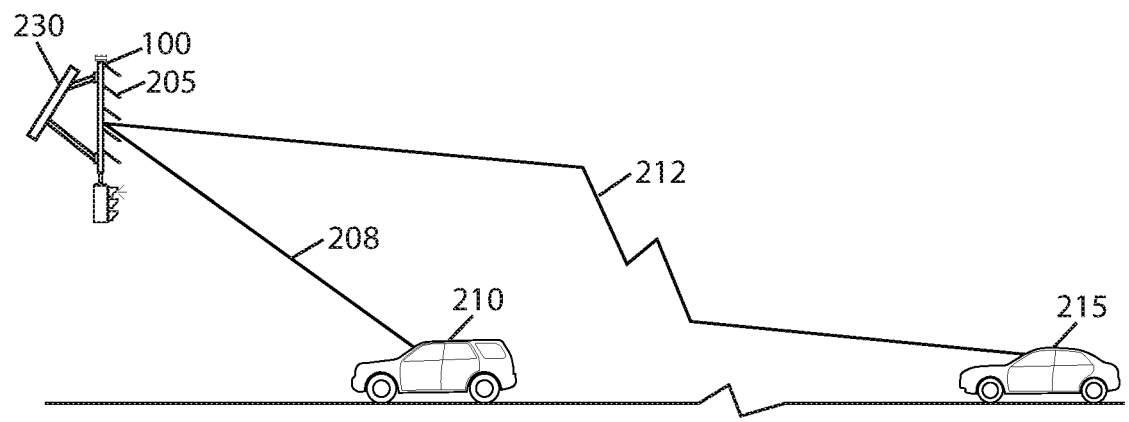
FIG. 2D shows an example roadway sign including shutters, according to an embodiment of the present disclosure.

FIGS. 2D-2I show selectively revealing a sign or portions of the sign 100 to viewers at predetermined distances. For instance, FIGS. 2D-2G show the sign 100 including a plurality of shutters 205 to selectively display content output by the sign 100. Additionally, FIG. 2D illustrates the sign 100 including the solar panel 230 to provide energy for powering the sign 100 and/or the system 135.

Figure 2E:
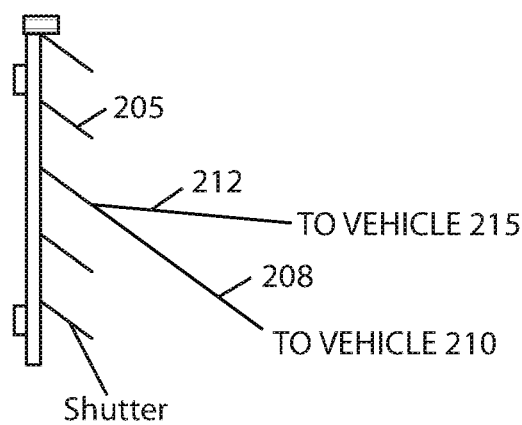
FIG. 2E shows the example roadway sign of FIG. 2D, according to an embodiment of the present disclosure.
Figure 2F:
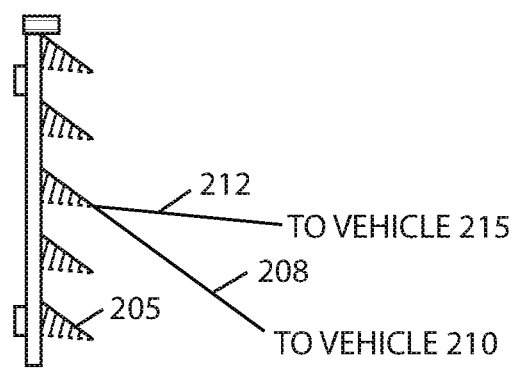
FIG. 2F shows the example roadway sign of FIG. 2D, according to an embodiment of the present disclosure.

FIGS. 2D-2F show two representative vehicles 210 and 215 located at different distances from the sign 100. For instance, vehicle 210 may be near or closer to the sign 100 than the vehicle 215. The shutters 205 may extend across a width of sign 100 and include a sufficient number, length, and angle with respect to the sign 100, such that occupants in the vehicle 210 are able to see images displayed on the sign 100. Alternatively, as the vehicle 215 is at a greater distance from the sign 100 than the vehicle 210, the shutters 205 may partially or completely block or prohibit the images displayed on the sign 100. That is, the shutters 205 may prevent occupants in the vehicle 215 from observing images displayed on the sign 100. As shown, a pair of sight lines 208 and 212 between the vehicles 210 and 215 to the sign 100 indicate the portions of display on the sign 100 that are visible.

FIG. 2E is a side view indicating the portions of sign 100 that are visible to occupants of the vehicles 210 and 215. In some instances, the sight lines 208 and 212 may meet and cross an outer edge of the shutters 205. The images displayed on the sign 100 may be visible to the occupants of the vehicle 210, while the cross-hatched regions under the shutters 205 may not be visible to occupants of the vehicle 215.

FIG. 2F is a side view of the sign 100 with cross-hatching, showing portions of the sign 100 that occupants of the vehicle 215 are not permitted to see.

Figure 2G:
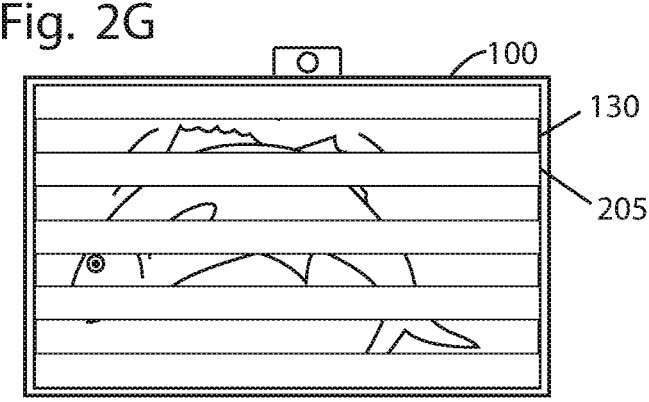
FIG. 2G shows a partial image displayed on the example roadway sign of FIG. 2D, according to an embodiment of the present disclosure.

FIG. 2G is a frontal view of the sign 100, showing portions of the sign 100 that are seen by occupants in the vehicle 215. As shown, the occupants in the vehicle 215 may be prevented from seeing an entirety of an image output on the sign 100.

In some instances, the viewing angles and/or viewing distance at which the image is viewable may be adjusted and/or modified through varying a number of shutters, a length of the shutters, and/or an angle at which the shutters 205 are coupled to the sign 100.

FIGS. 2H-2L show additional mechanisms to prevent an observer outside of a predetermined distance or range from the sign 100 from viewing the image on the sign 100. In other words, observers within the predetermined distance or range may be permitted to view the image on the sign 100. Those observers who view the sign 100 within a predetermined range of viewing angles, as measured in a vertical plane perpendicular to the sign 100, display panel, or surface of the sign 100 will be able to view the image output on the sign 100. As such, the enabled observers will be within the predetermined range from the sign 100, while observers who view the sign 100 from outside the predetermined range are outside the predetermined range of viewing angles and will not be able to see the image output on the sign 100.

FIGS. 2H-2J1 show a sign 100' that projects two different images, each at a predetermined angle with respect to the plane of a display of the sign 100'. In some instances, the sign 100' may utilize technology developed by Sharp Electronics, of Japan. This technology, called the "Sharp Dual Directional Viewing LCD" splits light into left-of-center and right-of-center images within the display of the sign 100'. A viewer positioned to the left-of-center of the display sees a first image, while a viewer positioned to the right-of-center of the display sees a second image. In this sense, the sign 100' may represent a dual directional viewing display that display multiple images. In some instances, the sign 100' presents two images that are displaced vertically from one-another. That is, observers at different vertical angles, and hence different distances from the plane of the sign 100', may see different images.

FIG. 2H shows the vehicles 210 and 215 and the sight lines 208 and 212. FIGS. 2I and 2J1 show the display 130 and the display 130', respectively, that are seen by occupants in the vehicles 210 and 215, respectively. The sight line 212 includes zigzag portions to indicate that the distance from the vehicle 215 to the sign 100' is compressed. The sign 100' may be tilted at a predetermined angle θ from a vertical or plane to enable selection or adjustment of the sight line angles for the vehicles 210 and 215. However, while FIG. 2H illustrates a particular angle of the sign 100', signs according to this application may be disposed at other angles, including vertical 90° from a horizontal axis or plane. Additionally, the sign 100' may provide a different number of sight lines, such as three sight lines, using a "Triple Directional Viewing LCD". The sign 100' may provide three sight lines, instead of two sight lines, for instance, to allow for greater viewing options. The signs, termed multi-directional viewing signs, may enable simultaneous viewing of a plurality of images, a blank screen, or a dark screen by occupants of vehicles at predetermined distances or angles.

The signs of the instant application may additionally or alternatively use a "Switchable Viewing-Angle Liquid Crystal Display" to provide a narrow viewing angle such that a viewer positioned to the left or right of center of the display sees no image, while a viewer positioned at or near the center at an approximate right angle to the display is able to view an image. An example of this directional viewable sign 100" is shown in FIG. 2J2 and is rotated 90° so that the directional viewable sign 100" is viewable by occupants of vehicles within a predetermined range of vertical viewing angles. For instance, the occupants of a vehicle 210', which is relatively close to the directional viewable sign 100", may view the display at relatively large vertical angle (nearly 90°) as measured from the plane of the directional viewable sign 100", and thus may see a displayed image. The directional viewable sign 100" may also be viewable by the occupants of the vehicle 210' when the vehicle 210' is within a range of other close distances or large angles (around 90°). However, occupants of a vehicle 215', which is relatively distant from directional viewable sign 100" and may be outside the range of viewable distances and angles, may view the directional viewable sign 100" at a relatively smaller vertical angle and thus may not be able to view the displayed image. In some instances, the directional viewable sign 100" may be mounted at any angle (e.g., about 40°) such that the viewable distance range may vary. In some instances, the directional viewable sign 100" may be disposed at an angle such that an image displayed by the directional viewable sign 100" may be viewable be from about 9 meters to about 21 meters, as measured from a position on the ground directly under the directional viewable sign 100". However, the image may be viewable at other distances from the directional viewable sign 100" through varying a height of the directional viewable sign 100" above the roadway and/or adjusting an angle at which the directional viewable sign 100" is disposed.

FIGS. 2K and 2L show a sign 100 with predetermined restricted viewing angles. While the directional viewable sign 100" in FIG. 2J2 illustrates the directional viewable sign 100" including an electronic technology to restrict viewing of a displayed image to within viewing angles and according to a viewer's distance from the directional viewable sign 100", FIGS. 2K and 2L show an instance employing a film or other screen overlaid on a sign. In some instances, the screen may be disposed at various angles relative to the sign 100 to restrict the viewing angles. For instance, viewing angles for the traffic 105 may be restricted by the use of a privacy filter 240, such as the model ALCF-P ABR2, sold by 3M Company, of Minneapolis, Minn., USA. In some instances, the privacy filter 240 may be placed in front of and/or parallel to the sign 100.

The privacy filter 240 may include a plastic film that contains a plurality of louvers. At large vertical angles (e.g., nearly 90° or perpendicular to the surface of the sign 100), most of the light from the sign 100 may pass through the privacy filter 240 so as to be viewable by observers within vehicles who are close to the sign 100. However, at smaller viewing angles that are relatively far from or perpendicular to the sign 100, the privacy filter 240 may block all or substantially all of the light from the sign 100. The image on the sign 100 may be selectively shown to vehicles nearer or farther away from the sign 100 by tilting the sign 100 to predetermined angles. For example, to allow vehicles close to the sign 100 to view the image (or other information) on the sign 100, the sign 100 may be tilted downward towards the roadway. Tilting the sign 100 towards the roadway may allow occupants within the vehicles to view the image as their line of sight is generally perpendicular to the sign 100. Alternatively, tilting the sign 100 upward may allow vehicles far from the sign to see the image on the sign 100.

In some instances, the privacy filter 240 may be oriented so that the sign 100 is visible by viewers who are relatively close to the sign 100 (e.g., 9 meters, 21 meters, etc.). However, as noted above, by tilting the sign 100 from a 43° angle to the ground or horizontal plane (FIG. 2K) to a 49° angle (FIG. 2L), for example, the image displayed by the sign 100 may become visible at greater distances. In some instances, the sign 100 may tilted between a range of about 0° to 90° to adjust an orientation of viewing angles to an audience. In such examples, the viewing angles may be further adjusted by using the privacy filter 240. In these examples, the sign 100 tilted at a 49° angle to the ground or horizontal plane (FIG. 2L), may increase or decrease the sight line to the audience by employing the privacy filter 240 to achieve an angle above or below the 49° angle without changing the tilt of the sign 100. Thus, a viewing angle may be adjusted based on a tilt of the sign 100, a privacy filter 240 or other structure that limits viewing of the sign to within a predetermined distance or range of viewing angles, or a combination thereof. When a privacy filter is used, the privacy filter may not entirely block display of content at angles outside the viewing angle. For instance, the privacy filter may allow a small amount of bleed through at angles outside the viewing angle (e.g., in the range of 1-10%) while still substantially limiting distraction of viewers outside the viewing angle.

In some instances, the sign 100 may include more than one privacy filter, or more than one privacy filter may be used to limit viewing of the sign 100. For example, a first privacy filter may be disposed in front (or over a front) of the display 130, while a second privacy filter may be disposed to a side of the display 130. In such instances, the first privacy filter may limit viewing of the display 130 from the front while the second privacy filter may limit viewing of the display from the side. In some instances, the second privacy filter may be oriented relative to the first privacy filter and/or the display. The use of two privacy filter, or any other number of privacy filters, may further limit viewing angles at which the display 130 is viewable. Such implementations may reduce driver distractions, for example, positioned to a side of the display 130.

FIG. 2M shows the privacy filter 240 oriented so that the image displayed by the sign 100 is visible over a horizontal angular range of 30° to either side of a plane perpendicular to the sign 100. In addition, more than one privacy filter 240 may be combined in series or overlapped and at right angles to each other so that the sign 100 is visible within a narrow region bounded by 30° vertical and horizontal. However, other angular ranges may be used.

According to the embodiments of the present disclosure, the sign 100 may be oriented vertically (so that the plane of the sign 100 is perpendicular to the plane of the roadway beneath) or at other angles than shown and discussed herein. For instance, in FIGS. 2K and 2L, the sign 100 may mount to a frame 251 that is secured to an arm 110 that extends from a stanchion (FIG. 1A), or may include another mounting arrangement that supports frame 251. A hinge 250 may be positioned at the lower edge of the sign 100, thereby connecting the sign 100 to the frame 251 and permitting the sign 100 to tilt downward at predetermined angles. A drive assembly 252 including a motor and gearbox may rotatably, hingedly, or pivotably connect to a pinion gear 253. In some instances, the drive assembly 252 may be secured to the frame 251 near or adjacent to the upper edge of the sign 100. A curved rack gear 254, having a radius of curvature equal to, or substantially equal to, the height of the sign 100 may attach or couple to the sign 100 at one end and may engage the pinion gear 253 on the drive assembly 252. When the drive assembly 252 is energized, the pinion gear 253 rotates and may rotate the plane of the sign 100.

The drive assembly 252 may be energized by instructions from the computer 145 (FIG. 1D). In some instances, when the drive assembly 252 includes a stepper motor, the angle of the sign 100 may be determined by counting the number of energizing pulses applied to the motor. With other types of motors, for example, a DC or an AC motor, a feedback mechanism such as a rotary encoder may provide this angular information to the computer 145. In some instances, the energy source used for the sign 100 may also power the drive assembly 252. Additionally, as noted above, one or more components of the system 135, such as the sign 100, may be powered via solar energy captured by the solar panel 230 and stored in one or more batteries.

In some instances, when the sign 100 is vertical or at 90° with respect to the roadway beneath, as shown in FIG. 1A, the sign 100 may be seen from the greatest distance (e.g., the maximum audience, by occupants in the traffic 105). In some instances, when tilted at 49° to the roadway, as shown in FIG. 2L, sign 100 may be seen by occupants in fewer vehicles, and when tilted at 43°, as shown in FIG. 2K, even fewer occupants are able to see the sign 100. However, the sign 100 may be tilted at any angle from 0 to 90° with respect to the plane of the roadway beneath. Additionally, this same arrangement may be used with the shutters 205 on the sign 100, as shown in FIGS. 2D-2G, with plain signs, such as in FIG. 1A, as well as the directional viewing sign 100, as shown in FIG. 2H.

Accordingly, the selection of the size of the viewing audience may be modified through modifying an angle at which the display of the sign 100 is viewable, which may be useful in maximizing display exposure at different times of the day. For example, during rush hour, if it is known that vehicles within a depth of ten vehicles will be stopped or slowly moving within six seconds of a red light, the sign 100 may be tilted so that its viewing range is limited to the depth of ten vehicles and then activated following those six seconds.

Example Vehicle-Mounted Sign

Figure 3A:
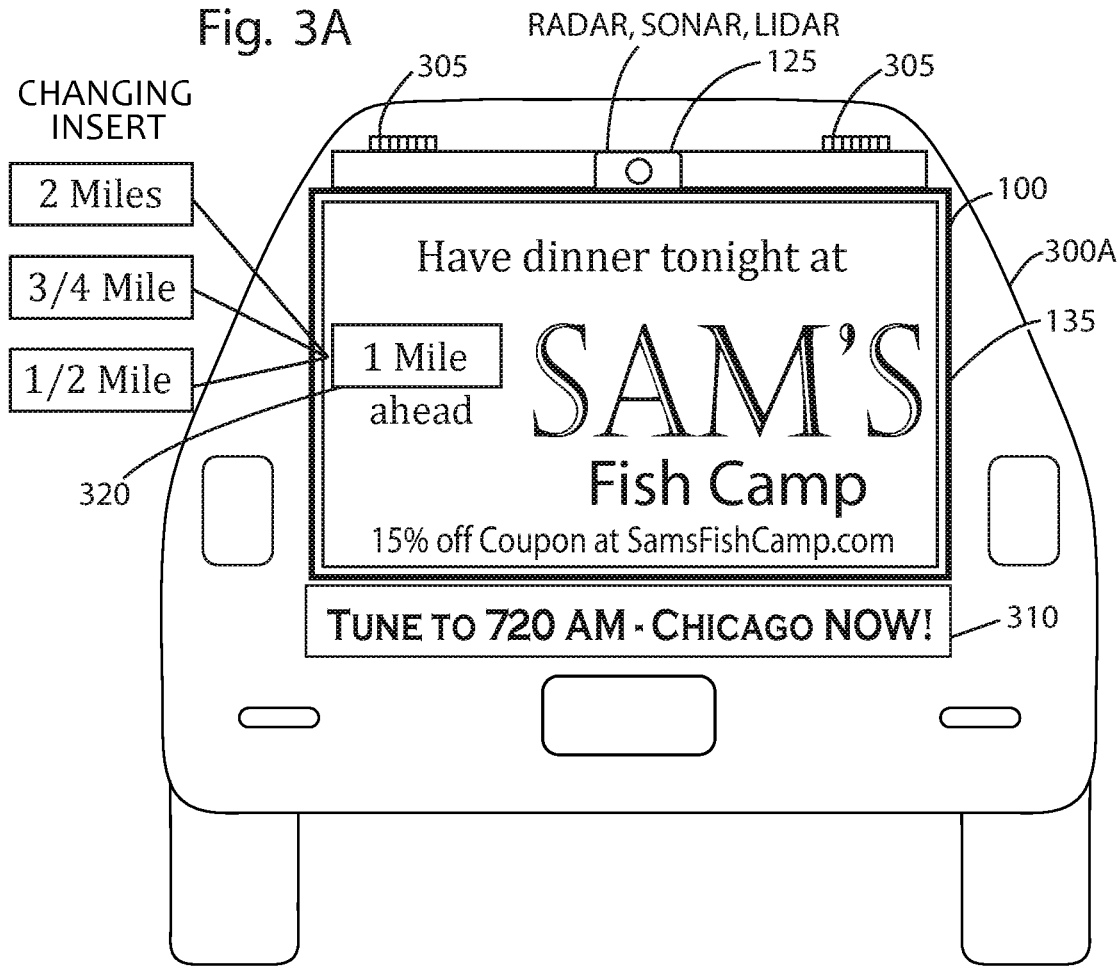
FIG. 3A shows an example vehicle-mounted sign, according to an embodiment of the present disclosure.
Figure 3B:
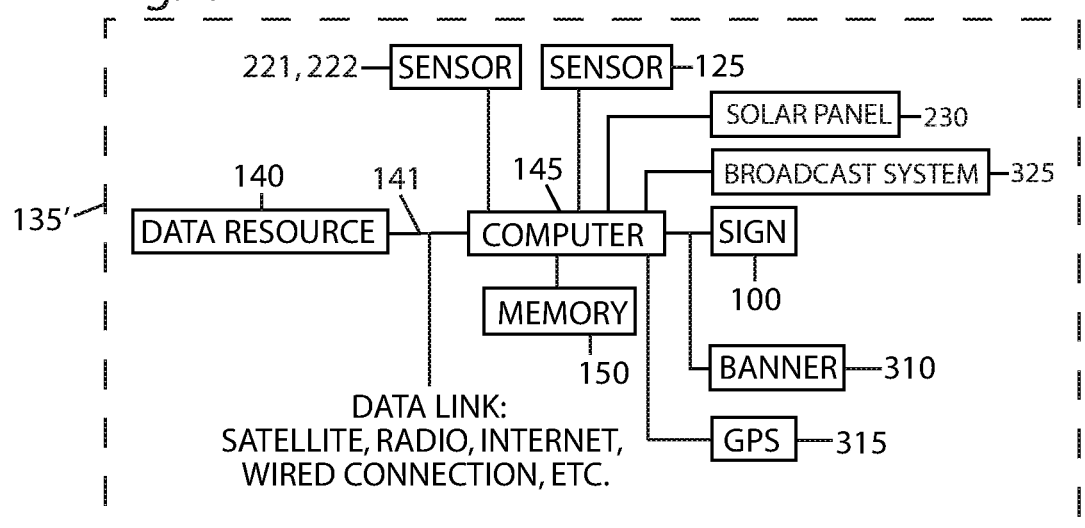
FIG. 3B shows an example system for use in moving vehicles, according to an embodiment of the present disclosure.
Figure 9A:
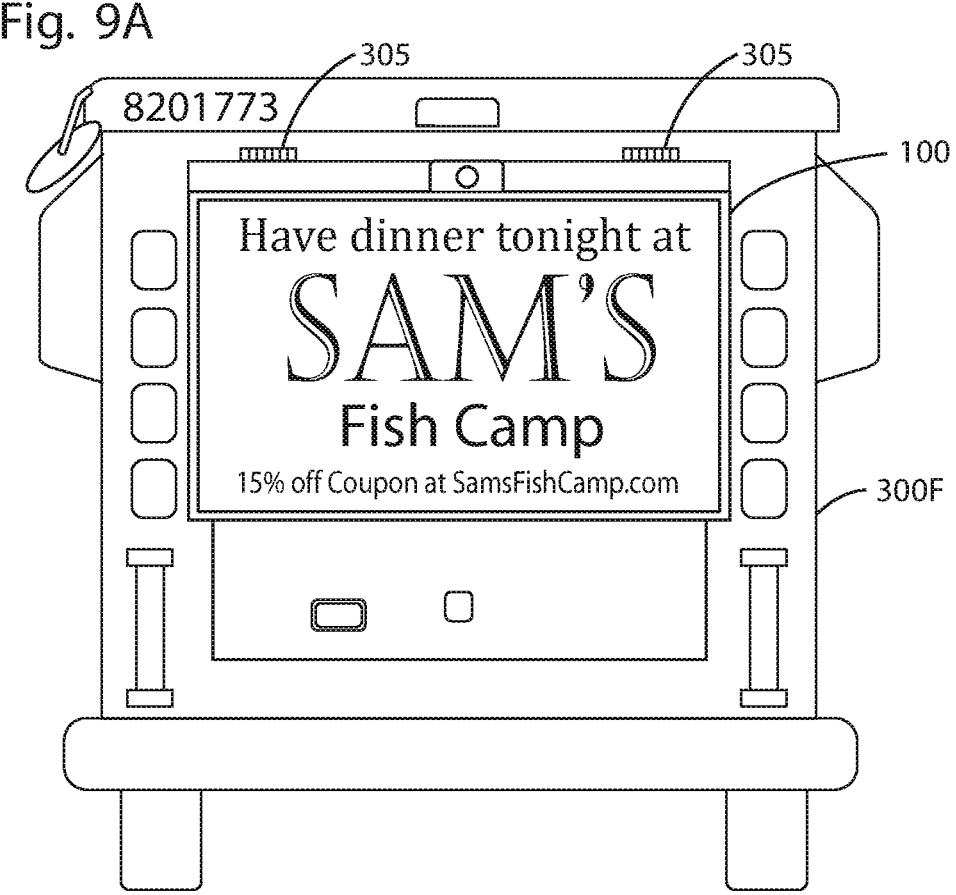
FIG. 9A shows an example swing-away sign mounted on hinges on a delivery vehicle, according to an embodiment of the present disclosure.

FIGS. 3A and 9A illustrate a sign 100 mounted, coupled, or disposed on a vehicle (e.g., bus, train, car, truck, etc.). In some instances, including the sign 100 on the vehicle and may provide additional targeted advertising capabilities. The sign 100 and/or the vehicle may include a global positioning system (GPS) to track a location of the vehicle and deliver location-based targeted advertising.

FIG. 3A shows a vehicle 300A with the sign 100. In some instances, the sign 100 may represent a swing-up sign mounted on the rear of the vehicle 300A. The sign 100 may optionally mount on the vehicle 300A by one or more hinges 305 that allow sign 100 to be lifted up and away from the rear of the vehicle 300A for access to a compartment or storage area at the rear of the vehicle 300A. In some instances, the sign 100 may be positioned fully downward, as shown in FIG. 3A, and may be secured by springs within a latching mechanism or the hinges 305. For instance, the springs may bias the sign 100 against the vehicle 300A such that the sign 100 is perpendicular to a roadway on which the vehicle 300A travels.

In some instances, the sign 100 and/or the vehicle 300A may include a banner 310. For instance, as shown in FIG. 3A, the banner 310 may affixed to the rear of the vehicle 300A, below the sign 100. In some instances, the banner 310 may display additional messages or content in a similar manner as the sign 100. Additionally, the banner 310 may also be displayed as a "crawler" or moving sign along the bottom of the sign 100. In some instances, the banner 310 may display time-sensitive information to direct a viewer to tune in to a short-range FM broadcast or select a particular radio station. However, the banner 310 may display other messages or content.

FIG. 3B shows an electronic control system 135', which in some instances, may include similar components or be similar to the system 135 (FIG. 1C). The system 135' may control the operation of the banner 310 and, in some instances, may receive location data from a GPS 315. The system 135' may also be powered at least in part by the solar panel 230. For instance, the solar panel 230 may be mounted atop a roof of the vehicle 300A and may generate power via solar energy.

In some instances, the system 135' may include a short-range FM, AM, and/or a broadcast system 325 (e.g., mobile device, cell phone, etc.) that transmits information associated with the display 130 on the sign 100. The information transmitted to a mobile device of the driver, may supplement an advertisement on the display 130 of the sign 100, for instance.

The GPS 315 provides location data to the computer 145 as the vehicle 300A travels from one location to another. The computer 145 may receive location-specific information from the data resource 140 and may cause the sign 100 and/or the banner 310 to display content in either a moving or static form. For instance, the sign 100 and/or the vehicle 300A may include the sensor(s) 125 configured to detect speeds of vehicles within a certain vicinity or range of the sign 100 and/or the vehicle 300A. The sensor(s) 125 may be arranged to detect speeds of oncoming traffic (e.g., in a direction the vehicle 300A travels) and/or speeds of traffic located behind the vehicle 300A.

In some instances, the sign 100 may include additional sensors to determine a speed at which the sign 100 is traveling, or may communicatively couple to the speedometer of the vehicle 300A. Depending on the speed of vehicle 300A and/or the other traffic 105 (FIGS. 1A, 2A, and 2B) in a vicinity of the sign 100, the sign 100 and/or the banner 310 to display content in either a moving form (e.g., periodically changing) or a static form (e.g., blank or visual). Additionally, or alternatively, the sign 100 may include sensors to detecting low-clearance objects within a vicinity or path of the sign 100 and/or the vehicle 300A. For example, the sign 100 or the vehicle 300A may include a sensor for detecting low-clearance structures or objects (e.g., garage door, road signs, overpasses, trees, etc.) within or overhanging a path of the vehicle 300A. Such detection may serve to warn a driver of the vehicle 300A of the low-clearance object and/or to take one or more actions to prevent damage to the sign 100. For example, the sign 100 may transmit a notification to the driver warning of the upcoming low-clearance structure. Therein, the driver may lower the sign 100 manually or may cause the sign 100 to lower (e.g., push of a button). However, in some instances, the sign 100 may be configured to automatically lower or retract based on detecting the upcoming low-clearance structure. In some instances, the sign 100 may automatically raise after the vehicles passes under or has passed the structure.

In addition, in some instances, a portion 320 of the display 130 on the sign 100 may be devoted to displaying location-sensitive information, such as proximity or distance to a business or other venue associated with advertisements being displayed on the sign 100.

Figure 3C:
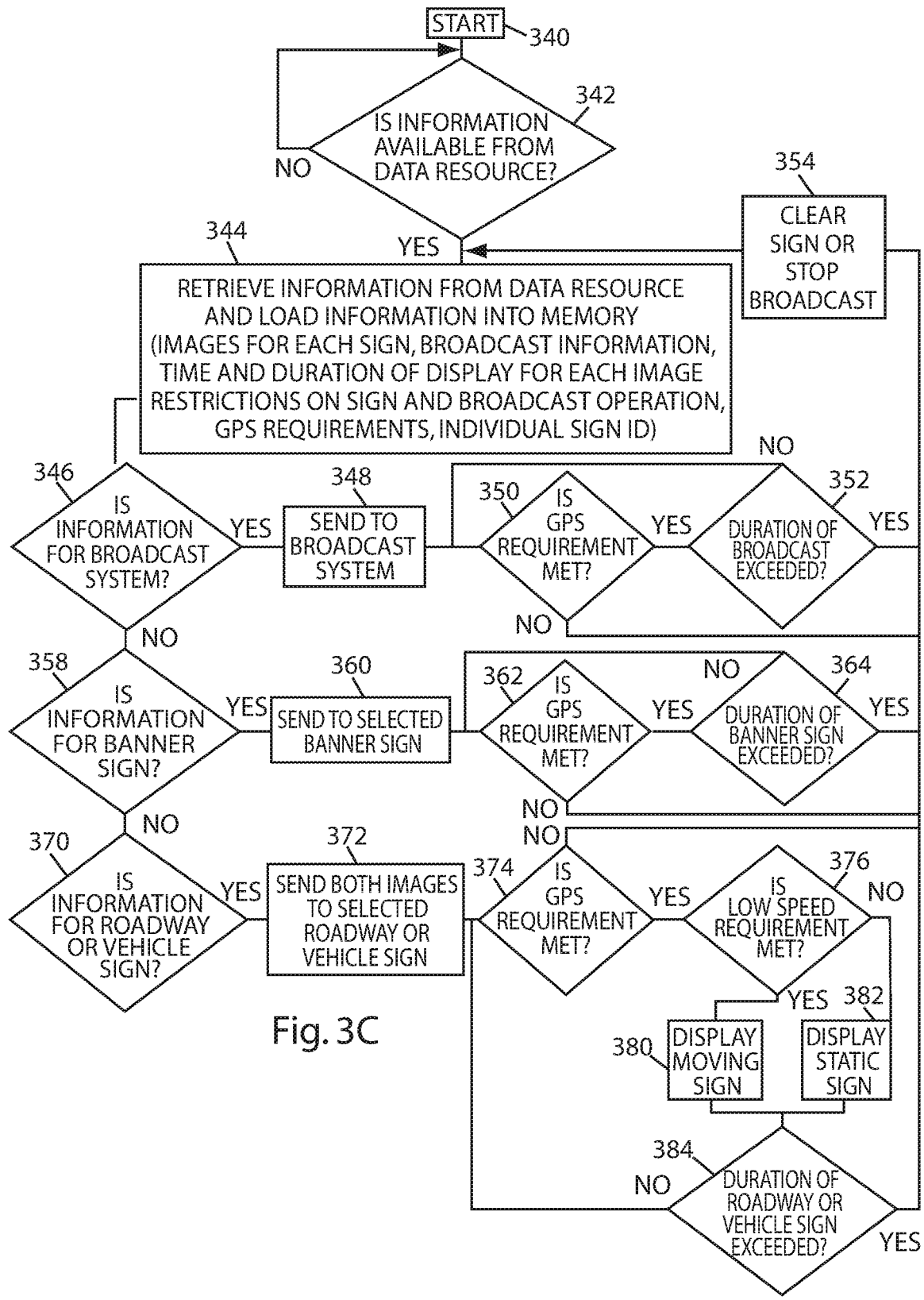
FIG. 3C is a block diagram showing an example operation of an example vehicle-mounted sign, according to an embodiment of the present disclosure.

FIG. 3C is a flow chart showing the operation of the system 135' according to one or more embodiments of the present disclosure. In this example, the system 135' may connect to one or more sign or broadcasting module discussed previously (e.g., a broadcast system, a banner, a roadway sign, and/or a vehicle sign). After being energized (block 340), the computer 145 may periodically determine an availability of data from the data resource 140, for example. In some instances, the computer 145 may periodically determine the availably of data once per day, every three hours, at midnight, or any other time the data resource 140 and/or the system 135' are operative (block 342). This determination may be done via a data link 141 (FIGS. 1C and 3B) that connects the computer 145 to the data resource 140 (e.g., satellite, radio, internet, wired connection, and the like). When data is available from the data resource 140, the computer 145 may download the data via the data link 141. Upon being downloaded, the data may be stored in memory 150 (bock 344).

The computer 145 may determine whether the information received is for a broadcast system (block 346) and if so, may send the information to the broadcast system 325 (block 348). When information for a broadcast is sent to the broadcast system 325, the system 135' may determine if the GPS requirement contained in the information is met (block 350). For instance, the system 135' may determine whether the broadcast system 325 is located within parameters supplied by the advertiser and relayed through the data resource 140. If this is true, the system 135' may determine whether the duration of the broadcast has been exceeded (block 352). If the duration of the broadcast has not been exceeded, control may revert to block 350 and loop through blocks 350 and 352. This process may continue until either the GPS requirement is not met (i.e., the vehicle 300A is outside the predetermined advertising area) or the predetermined duration of the broadcast has been exceeded. In either case, if the GPS requirement is not met or the duration of the broadcast has been exceeded, control may advance to block 354 and the broadcast is stopped. After the broadcast is stopped, control may revert to memory 150 to determine if additional broadcasts are stored and ready for use.

In some instances, the sign 100 may operate similar to that for the broadcast. For instance, the computer 145 may continually check the GPS and duration requirements of the broadcast system (blocks 350 and 352) and/or the computer 145 may determine if memory 150 contains new information (block 358) for the banner 310 (FIG. 3A). If so, this information is sent to the banner 310 (block 360). As described above, the GPS and duration requirements are tested (blocks 362 and 364). When the GPS requirement is not met and/or the required duration of the banner 310 has been exceeded, control may advance to block 354, the banner 310 may be cleared (e.g., output blank image or prohibit display), and the memory 150 may be checked for new information.

While the computer 145 may determine the requirements for the banner 310 and/or the broadcast system 325, the computer may also determine if information is available in the memory 150 of the computer 145 (block 344) for a roadway or vehicle sign 100 (block 370). If the information is for a roadway or vehicle sign, the information, including both static and moving images, may be sent to the sign (block 372). In some instances, the GPS requirement is determined (block 374) and the computer 145 may also determine whether the speed of the vehicles in the traffic 105 is below the predetermined threshold speed (block 376), as discussed above. If the speeds (or an average thereof) of the vehicles are greater than the predetermined threshold speed, such that one or more vehicles are moving faster than the predetermined threshold speed, the sign 100 may output (block 382) the display 130' (FIG. 1A, for example). Alternatively, if the speeds (or an average thereof) of the vehicles are lower than the predetermined threshold speed, such that one or more vehicles are traveling at less than the predetermined threshold speed, the sign 100 may output (block 380) the display 130. Additionally, a duration the sign 100 displays the display 130' and/or the display 130 may be compared against a duration. If the predetermined duration for displaying either the display 130' or the display 130 is exceeded, control may advance to block 354 and the sign 100 may prohibit display of the content. The sign 100 may therein be readied for a next display or advertisement. However, if the duration of displaying the display 130' or the display 130 is not exceeded, control may return to block 374 and the process may loop through blocks 376, 380, 382, and 384 until the duration is exceeded and/or the GPS requirement is no longer met.

The system 135' may, in some instances, operate in the same manner as the system 135, with the addition of the GPS 315. The above is illustrative of one example of many aspects possible with this embodiment. For instance, the actual programming steps are determined by conditions at the location of the sign 100, advertising demand, local restrictions, and the like.

Figure 4:
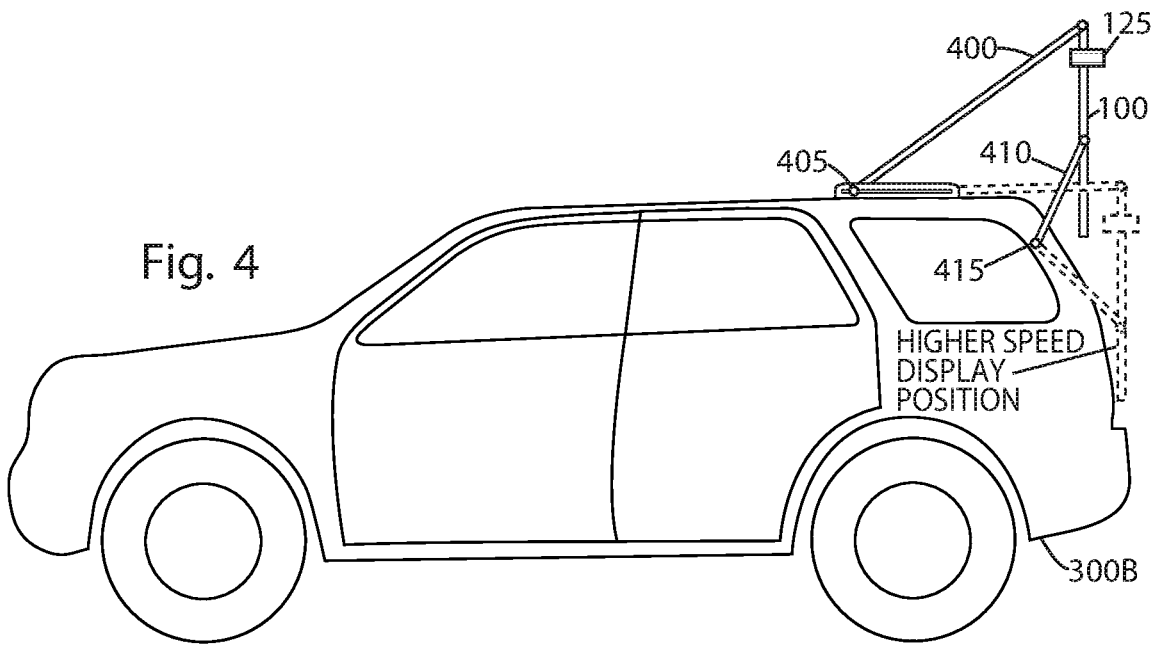
FIG. 4 shows an example sign attached to a vehicle, according to an embodiment of the present disclosure.

FIG. 4 shows a sign 100 mounted atop a vehicle 300B. In some instances, the sensor 125 may be positioned at or near a top of the sign 100 and may face towards the rear of the vehicle 300B. The sign 100 may be secured to one or more bars and/or deflectors 400 on a roof of the vehicle 300B via a slidable pivot 405. A pivot arm 410 may attach or couple to the side of the sign 100 at a first end and a pivot point 415 on the vehicle 300B. The pivot arm 410 may also attach or couple to another side of the sign 100 at a second end and a pivot point on the vehicle 300B.

As shown in FIG. 4, the sign 100 may be movable between an elevated position and a lowered position. The elevated position of the sign 100 is shown in solid lines, while the lowered position of the sign 100 is shown in dashed lines. As the sign 100 moves up and down, between the elevated position and the lowered position, the sign 100 may be secured in a vertical position by the pivot arm 410. In some instances, the sign 100 may be in the elevated position when the vehicle 300B moves at speeds below a predetermined threshold, and may be in the lowered position above when the vehicle 300B moves at speeds above the predetermined threshold. In some instances, the sign 100 may transition between the elevated position and the lowered position via a hydraulic or pneumatic cylinder, a motor, actuators, or the like. The system 135 or 135' may control the raising and lowering of the sign 100 on the vehicle 300B.

Figure 5:
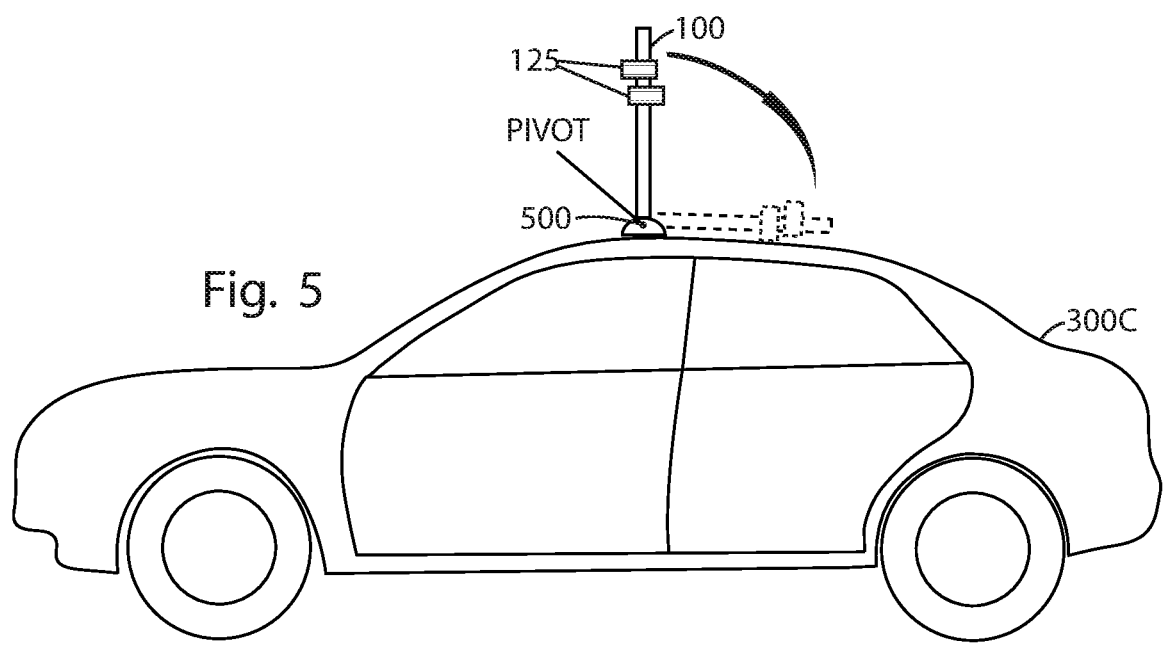
FIG. 5 shows an example sign attached to a vehicle, according to an embodiment of the present disclosure.

FIG. 5 illustrates an alternative mounting of a sign 100 on a vehicle 300C, showing that the sign 100 may be movable between an elevated position and a lowered position. The elevated position of the sign 100 is shown in solid lines, while the lowered position of the sign 100 is shown in dashed lines. In some instances, the sign 100 may transition between the elevated position and the lowered position via a pivot 500. The sign 100 may transition between the elevated position and the lowered position via several mechanisms. For example, the pivot 500 may contain a spring that allows the sign 100 to pivot downward when a speed of the vehicle 300C exceeds a predetermined threshold. Additionally, or alternatively, a motor or cylinder may be used, as discussed in connection with FIG. 4 to raise and lower the sign 100.

In some instances, whether the sign 100 is in the elevated or lowered position by may be based on a time of day. For example, in non-peak hours, the sign 100 may be lowered and the output of content may be restricted to conserve energy.

In some instances, the sign 100 may face forward with respect to the vehicle 300C, so as to present content to oncoming vehicles, or may face rearward with respect to vehicle 300C to present content to vehicles located behind the vehicle 300C. In some instances, the vehicle 300C may include multiple signs, where one sign faces forward and another sign faces rearward. The sign(s) 100 may be controlled by the system 135 or 135', as described above.

Figure 6:
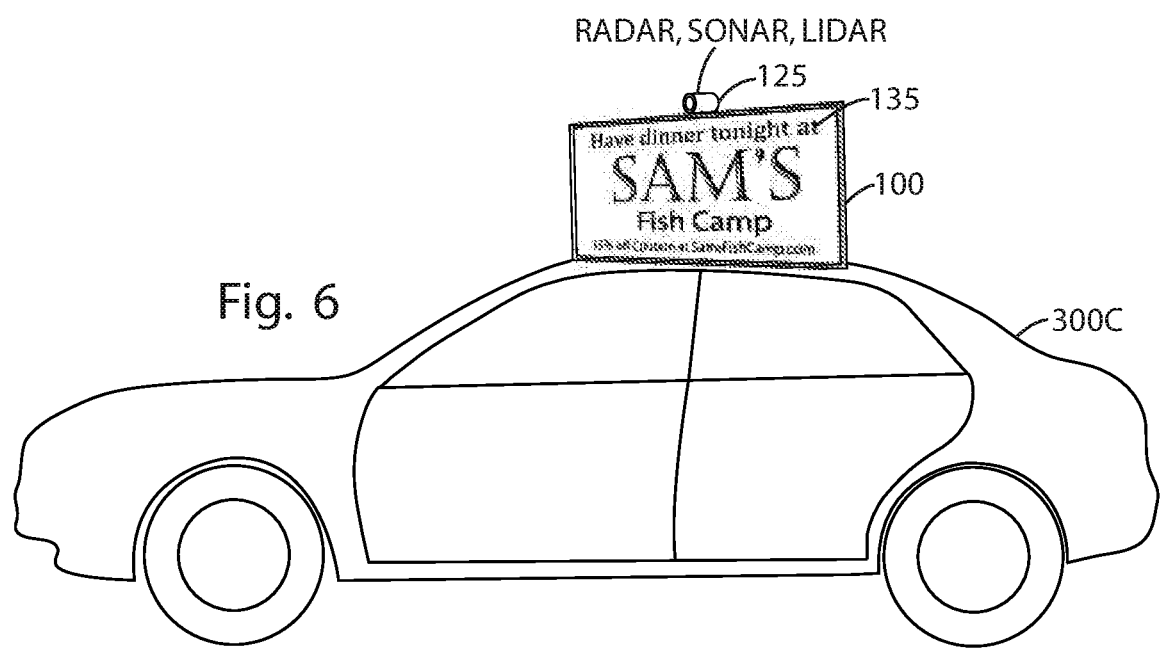
FIG. 6 shows an example sign diagonally mounted atop a vehicle, according to an embodiment of the present disclosure.

FIG. 6 illustrates a sign 100 mounted diagonally on a vehicle 300C. The sign 100 may be oriented to face opposing traffic and the display 130 may be active when traffic is stopped or moving below the predetermined threshold speed. For instance, the sensor(s) 125 may determine that the speed of oncoming traffic is below the predetermined threshold speed and the sign 100 may present the dynamic display. In some instances, a second sign 100 may be added and oriented to face traffic on an opposite side of the vehicle 300C. Additionally, or alternatively, a third sign 100 may face toward the rear of the vehicle 300C. In some instances, each sign may be equipped with a respective sensor(s) 125 to sense speed and/or may receive independent data feeds from the system 135 (FIG. 3B).

Figure 7:
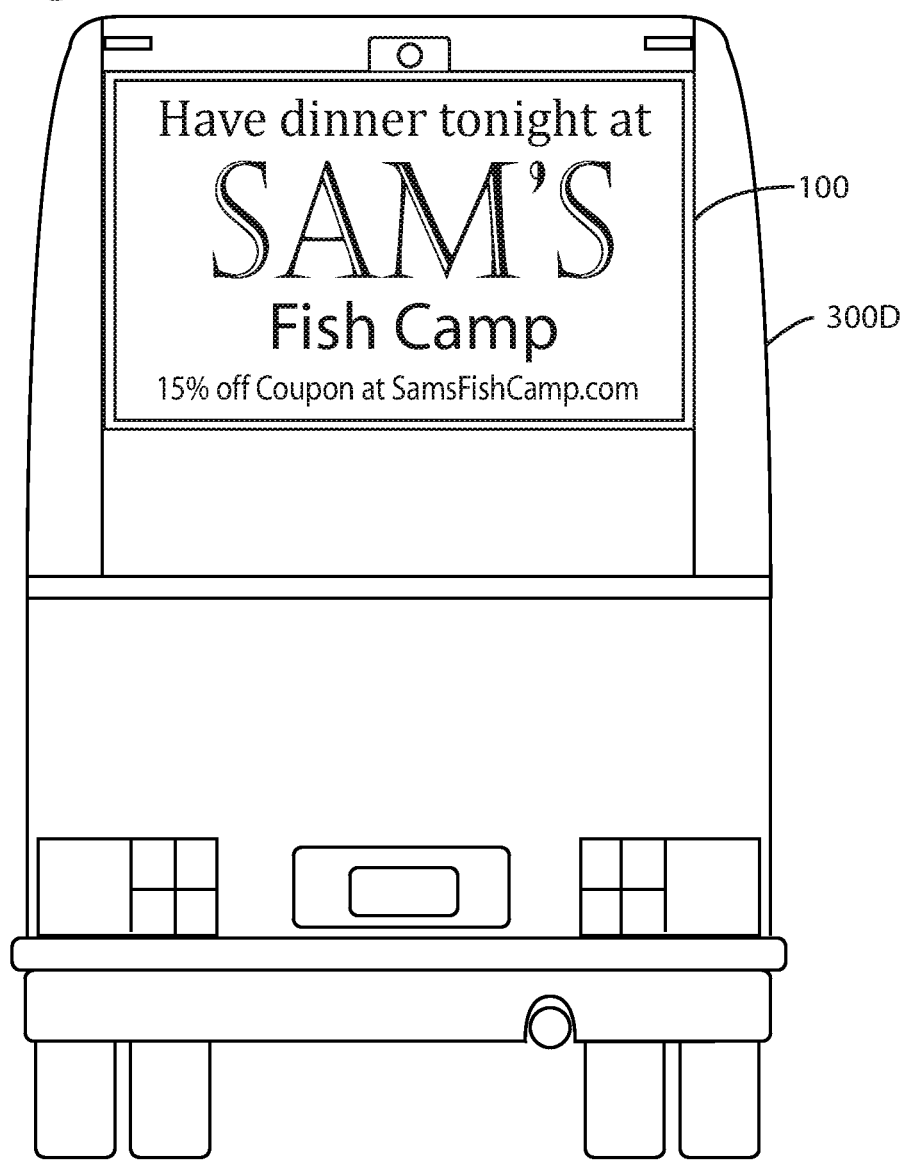
FIG. 7 shows an example active sign on a bus, according to an embodiment of the present disclosure.

FIGS. 7 and 8 illustrate a sign 100 mounted or coupled to the rear of a bus or recreational vehicle 300D and a delivery vehicle 300E, respectively.

Figure 9B:
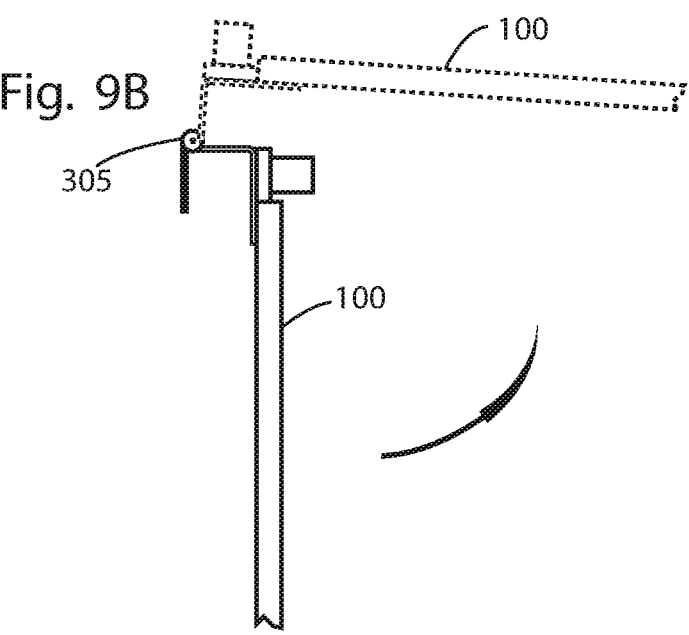
FIG. 9B shows the example swing-away sign of FIG. 9A, according to an embodiment of the present disclosure.

FIG. 9A illustrates a sign 100 mounted or coupled to the rear of a delivery vehicle 300F. In some instances, the sign 100 may be coupled to the rear of the delivery vehicle 300F by the hinges 305, as shown in FIG. 9A, to permit a user to access a door or storage area at the back of the delivery vehicle 300F. FIG. 9B illustrates the sign 100 in a lowered position in solid lines, and in an elevated, or alternate, position in dashed lines. The hinges 305 permit the sign 100 to lift or transition to alternate position, thereby allowing access to the rear of the delivery vehicle 300F.

Figure 10A:
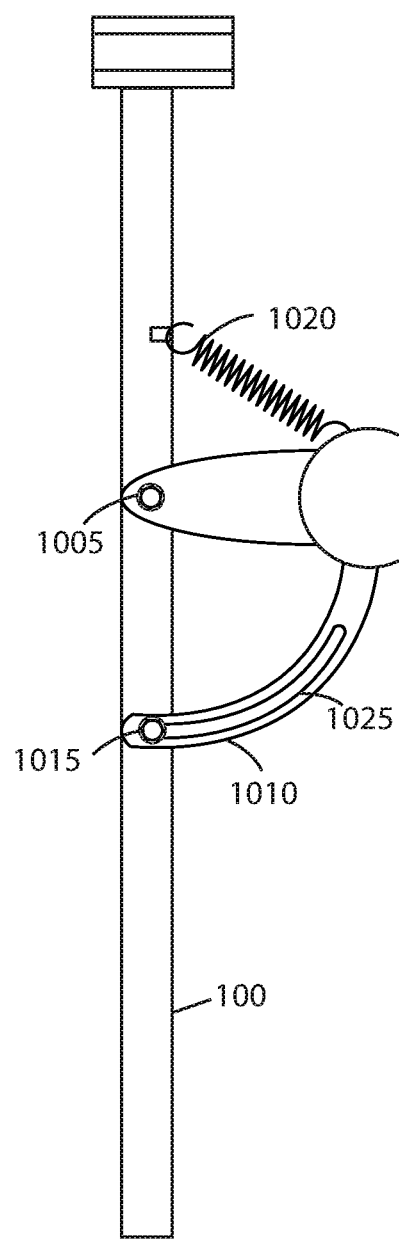
FIG. 10A shows an example sign having a pivot, according to an embodiment of the present disclosure.
Figure 10B:
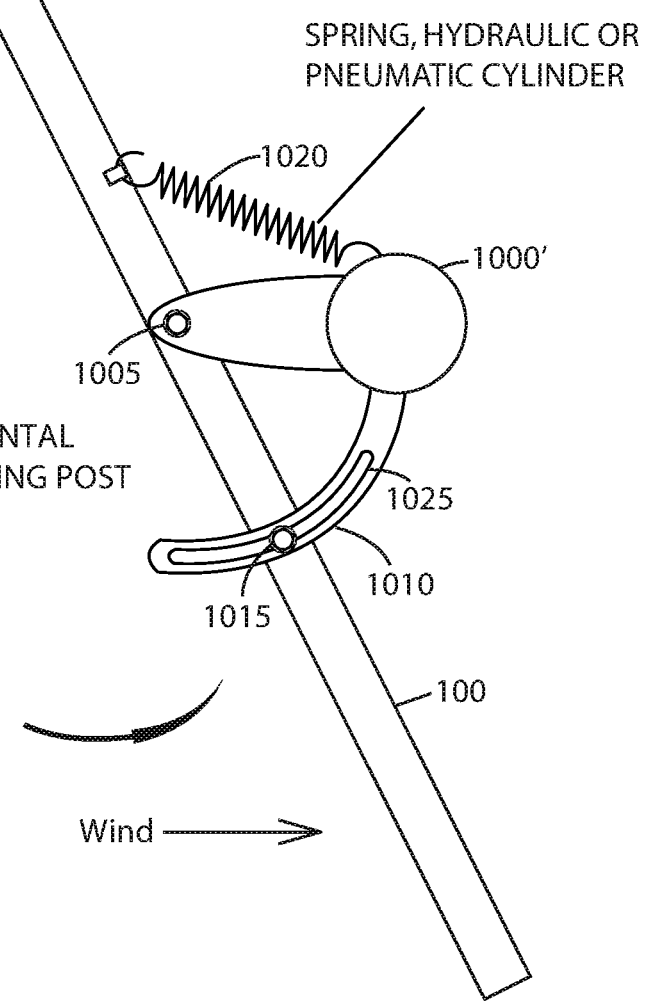
FIG. 10B shows the example sign of FIG. 10A, according to an embodiment of the present disclosure.

FIGS. 10A and 10B illustrate an alternative mounting for a sign 100. In some instances, the alternative mounting may be useful when the sign 100 is subjected or exposed to strong winds. For instance, tilting the sign 100 with respect to the direction of the wind may reduce a force applied to the sign 100 and/or a mount coupled to the sign 100, thereby reducing potential damage to the sign 100 and/or damage a vehicle (e.g., roof) or a fixed stanchion to which the sign 100 is secured. As shown, the sign 100 may be secured to a post 1000 via a pivot 1005 and about which the sign 100 may rotate. A spring 1020 may urge the sign 100 to rotate clockwise about the pivot 1005. The pivot 1005 may be disposed away from a center of the sign 100 such that as wind strikes a front of the sign 100, the sign 100 may pivot about the pivot 1005 and rotate in the direction indicated in FIG. 10B.

A curved arm 1010 with a slot 1025 is secured to the post 1000. A pin 1015 may be disposed in the slot 1025 and secure the curved arm 101 to the sign 100. For instance, the pin 1015 may slidably move within the slot 1025 as the sign 100 rotates about the pivot 1005. In some instances, the pin 1015 may rests against a lower end of the slot 1025 via a counterclockwise torque exerted on the sign 100 by the spring 1020.

As wind strikes the front of the sign 100, the wind may exert a torque on the sign 100, as shown in FIG. 10B. If the force of wind overcomes the force exerted by the spring 1020, the sign 100 may rotate about the pivot 1005 and swing in a direction as indicated in FIG. 10B. In some instances, the pin 1015 may limit a rotational or angular distance the sign 100 may travel. When the force of the wind on the sign 100 is below a predetermined amount (e.g., the amount of tension force applied by the spring 1020), the spring 1020 urges the sign 100 back to a vertical position, as shown in FIG. 10A.

FIGS. 11A, 11B, and 11C illustrate a sign 100 disposed above a vehicle and in an erected or deployed state. As shown, the vehicle may be in front of or ahead of traffic 105. The sign 100 may include the displays 130 and/or 130', respectively, for presenting content to the occupants of the vehicles in the traffic 105. In FIG. 11A, the sign 100 may be associated with a display sight line at which the displays 130 and/or 130' are viewable. For instance, the sign 100 may include the privacy filter 240 to limit angles at which the displays 130 and/or 130' are viewable. In some instances, the sign 100 may include more than one privacy filter to limit the angles (or positions) at which the displays 130 and/or 130' are viewable. The sign 100 and/or the vehicle to which the sign is mounted may include mechanisms, hinges, and/or actuators that change the viewing angles at which the displays 130 and/or 130' are viewable.

For instance, as shown in FIG. 11A, the displays 130 and/or 130' may be viewable at an angle of 30 degrees such that certain occupants within the traffic 105 are permitted to view content output on the sign 100. In doing so, the displays 130 and/or 130' may be directed to be viewable from a predetermined distance from the sign 100. However, the sign 100 may pivot, as shown in FIGS. 11B and 11C, to adjust the displays 130 and/or 130' to a different portion of the traffic 105. As such, the viewing distance and/or the range of viewing angles may be modified.

The sign 125 includes one or more sensors 125 that detect speeds of vehicles in the traffic 105 to present the display 130 and/or the display 130'.

Figure 11D:
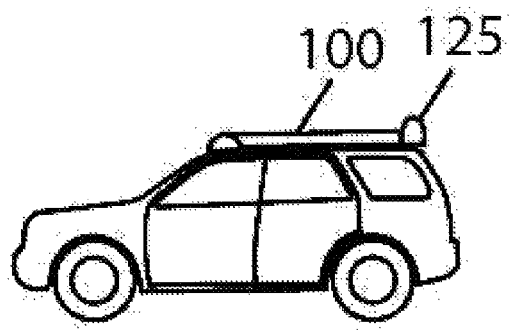
FIG. 11D shows an example sign usable with a vehicle, according to an embodiment of the present disclosure.
Figure 11E:
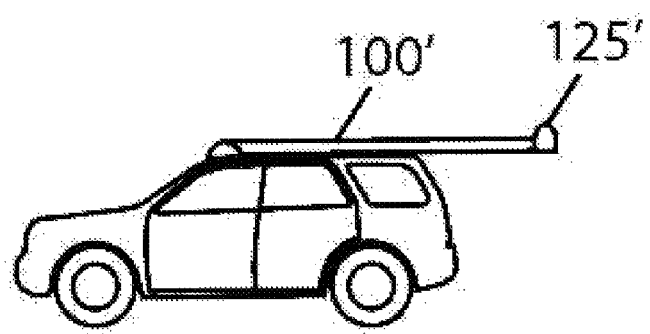
FIG. 11E shows an example sign usable with a vehicle, according to an embodiment of the present disclosure.

FIGS. 11D and 11E illustrate the sign 100 in a folded-down or retracted state. In the retracted state, the sign 100 may prevent display of content to the traffic 105. In some instances, the sign 100 may retract based at least in part on the speed of the vehicle (to which the sign 100 couples) traveling faster than a predetermined speed. Additionally, FIGS. 11D and 11E illustrate that the sign 100 may vary in height or size, which may affect the viewing angles of the sign 100 and/or the amount of the traffic 105 that is able to view the displays 130 and/or 130'. For instance, as shown, the sign 100 in FIG. 11E may be larger and/or may extend farther than the sign 100 in FIG. 11D, thereby permitting more of the traffic 105 or occupants to observe the displays 130 and/or 130' when the sign 100 deploys.

Figure 12A:
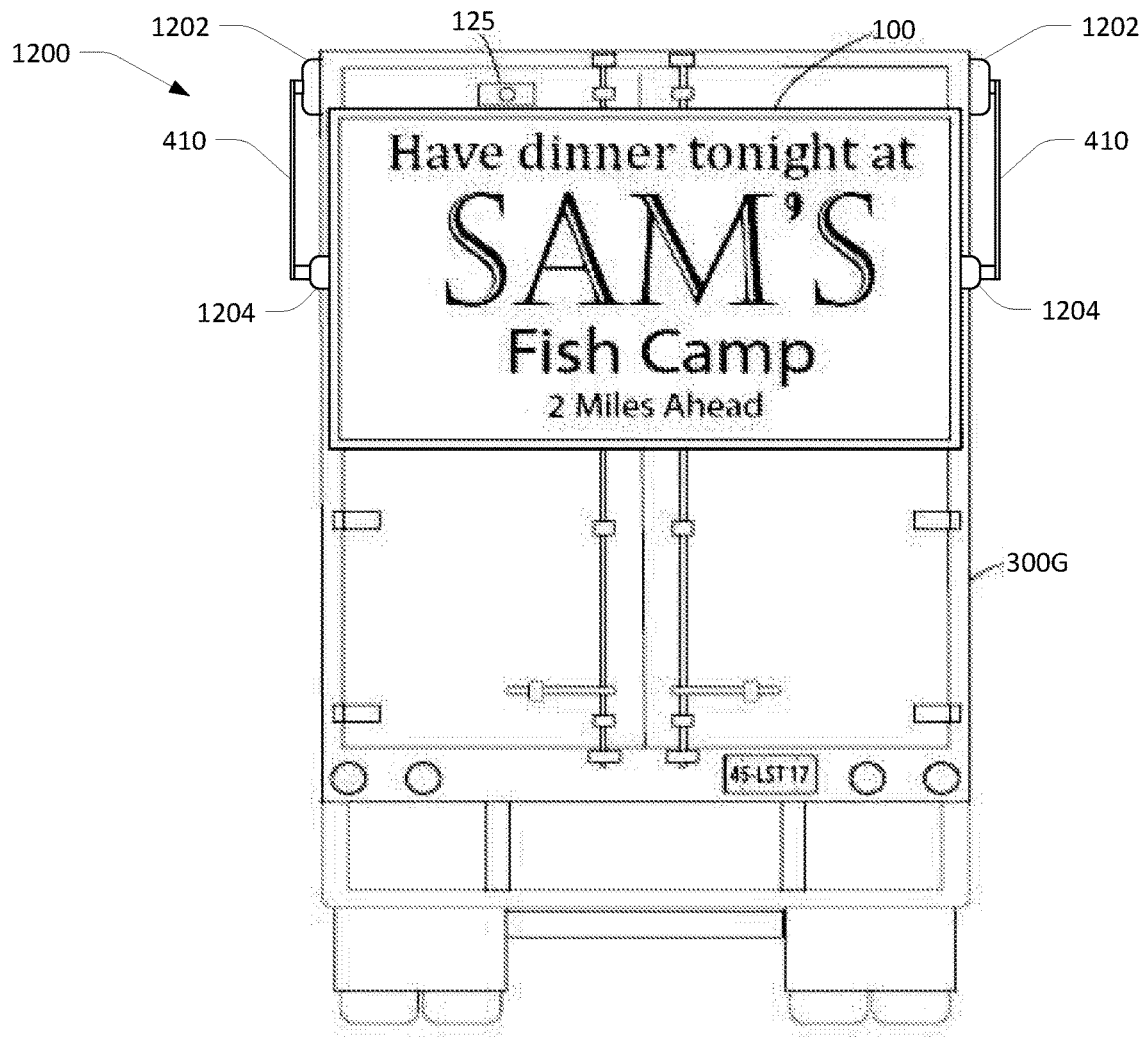
FIG. 12A shows a back view of an example sign usable with a semi-trailer, according to an embodiment of the present disclosure.
Figure 12B:
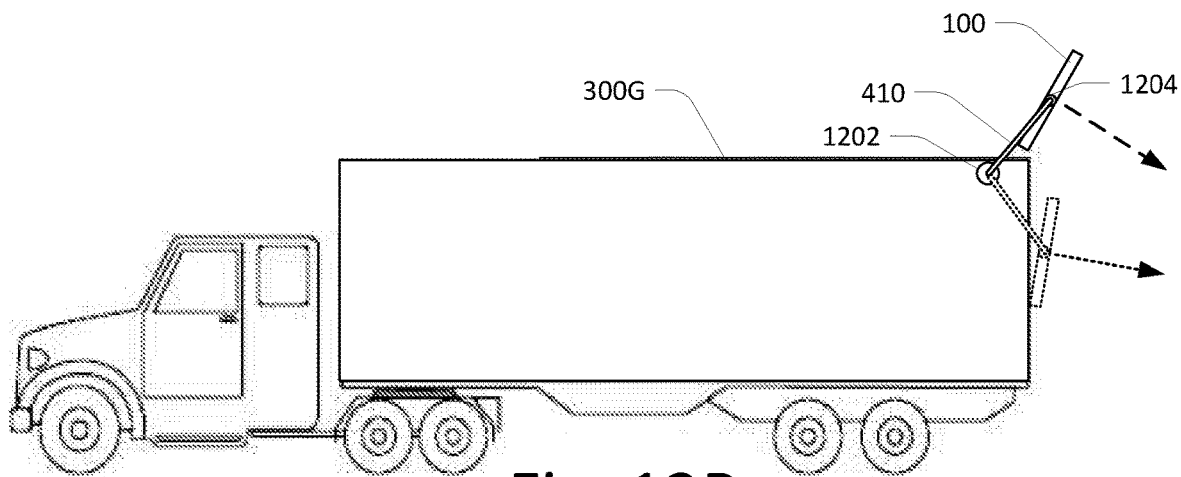
FIG. 12B shows a side view of the example sign usable with a semi-trailer of FIG. 12A.

FIG. 12A and FIG. 12B illustrate a vehicle-mounted display system comprising a sign 100 mounted or coupled to the rear of a semi-trailer 300G. In some examples, the sign 100 may comprise one or more displays configured to control output of content at one or more viewing angles. As shown in FIG. 12A, the sign 100 comprises a display movably mounted to the rear semi-trailer 300G by an adjustment mechanism 1200. The adjustment mechanism 1200 is configured to change a position and/or orientation of the sign 100 relative to the semi-trailer 300G. For instance, the adjustment mechanism 1200 in this example includes a pair of pivot arms 410. First ends of the pivot arms 410 are coupled to the semi-trailer 300G at first pivots 1202 and second ends of the pivot arms 410 are coupled to second pivots 1204. The pivot arms 410 are rotatable relative to the semi-trailer 300G about the first pivots 1202 and the sign 100 is rotatable relative to the pivot arms 410 about the second pivots 1204. In some examples, the first pivots 1202 and/or the second pivots 1204 may include actuators (e.g., motors and/or gearboxes) to drive rotation of the pivot arms 410 about the first pivots 1202 and/or to drive rotation of the sign 100 about the second pivots 1204.

FIG. 12B is a side view of the vehicle-mounted display system of FIG. 12A, and shows the sign 100 positioned in a first, elevated position shown in solid lines, and a second, lowered position shown in dashed lines. FIG. 12A illustrates the sign 100 in the second, lowered position. In the first position, the sign 100 is elevated at least partially above a top of the semi-trailer 300G to increase a visibility of the sign to vehicles behind the semi-trailer in traffic. In the second position, the sign 100 is recessed at or below the top surface of the semi-trailer 300G, thereby reducing a force applied to the sign 100 by air when the semi-trailer is moving.

In the first, elevated position, the sign 100 is elevated above a viewing target (one or more vehicles located behind the seam-trailer 300G) and is oriented such that an axis normal to a face of the sign is oriented below the horizon (as shown by the larger dashed arrow protruding from the face of the sign 100 in FIG. 12B). In some examples, position and/or orientation (e.g., the angle of the sign relative to the horizon) may be adjusted based on a speed of the semi-trailer to which the sign is mounted. In some examples, an angle between the axis normal to the face of the sign and the horizon may be increased to reduce a wind resistance of the sign 100 when the semi-trailer 300G is moving at or above a first threshold speed). Additionally or alternatively, a position of the sign 100 may be moved from the first position to the second position in response to the semi-trailer 300G moving at or above a second threshold speed, which may be the same as, less than, or greater than the first threshold speed.

The vehicle-mounted display system of FIGS. 12A and 12B also includes one or more sensors 125. In various examples, the sign 100 may output content based on an identity of a viewer (e.g., using facial recognition to target content to the identified viewer) captured by the one or more sensors 125. The sign 100 may also or instead be configured to receive a signal from the viewer (e.g., a signal from a mobile device of the viewer) captured by the sensor(s) 125, and responsive to receiving the signal, output different content to the same viewer (a first viewer) or to a new viewer (a second viewer).

Figure 13:
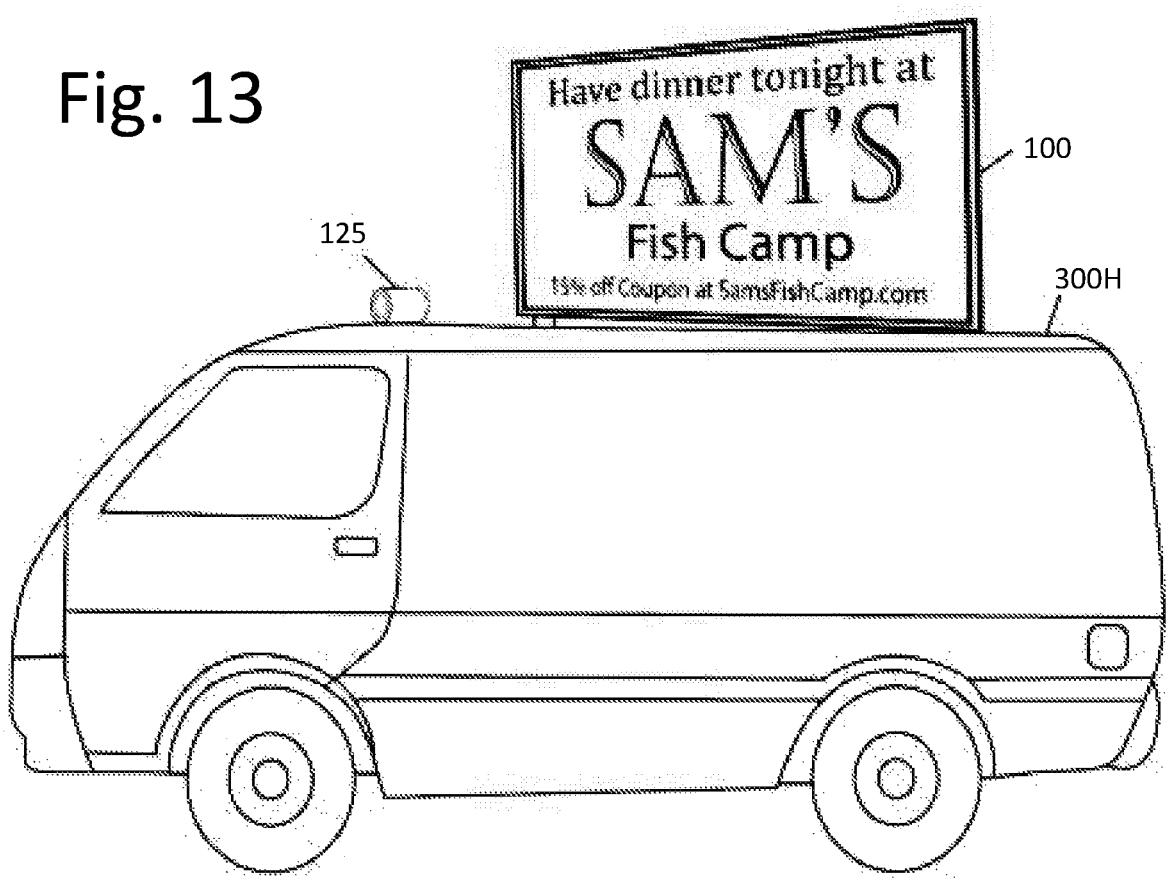
FIG. 13 shows an example sign attached to a van, according to an embodiment of the present disclosure.

FIG. 13 illustrates a sign 100 mounted diagonally on a top surface of a van 300H. The sign 100 may be oriented to face opposing traffic and the display 130 may be active when traffic is stopped or moving below the predetermined threshold speed. As illustrated tin FIG. 13, one or more sensors 125 are mounted to the van 300H. However, in other examples, the sensor(s) 125 may also or instead be coupled to or integrated with the sign 100. In some examples, the sign 100 may be mounted to a vehicle offering a ride-share service (e.g., the van 300H) thereby providing revenue to the ride-share service by advertising content on the sign 100. The sign 100 may additionally or alternatively convey information about the status of the ride-sharing service (e.g., that the van is occupied or is available for hire).

Figure 14:
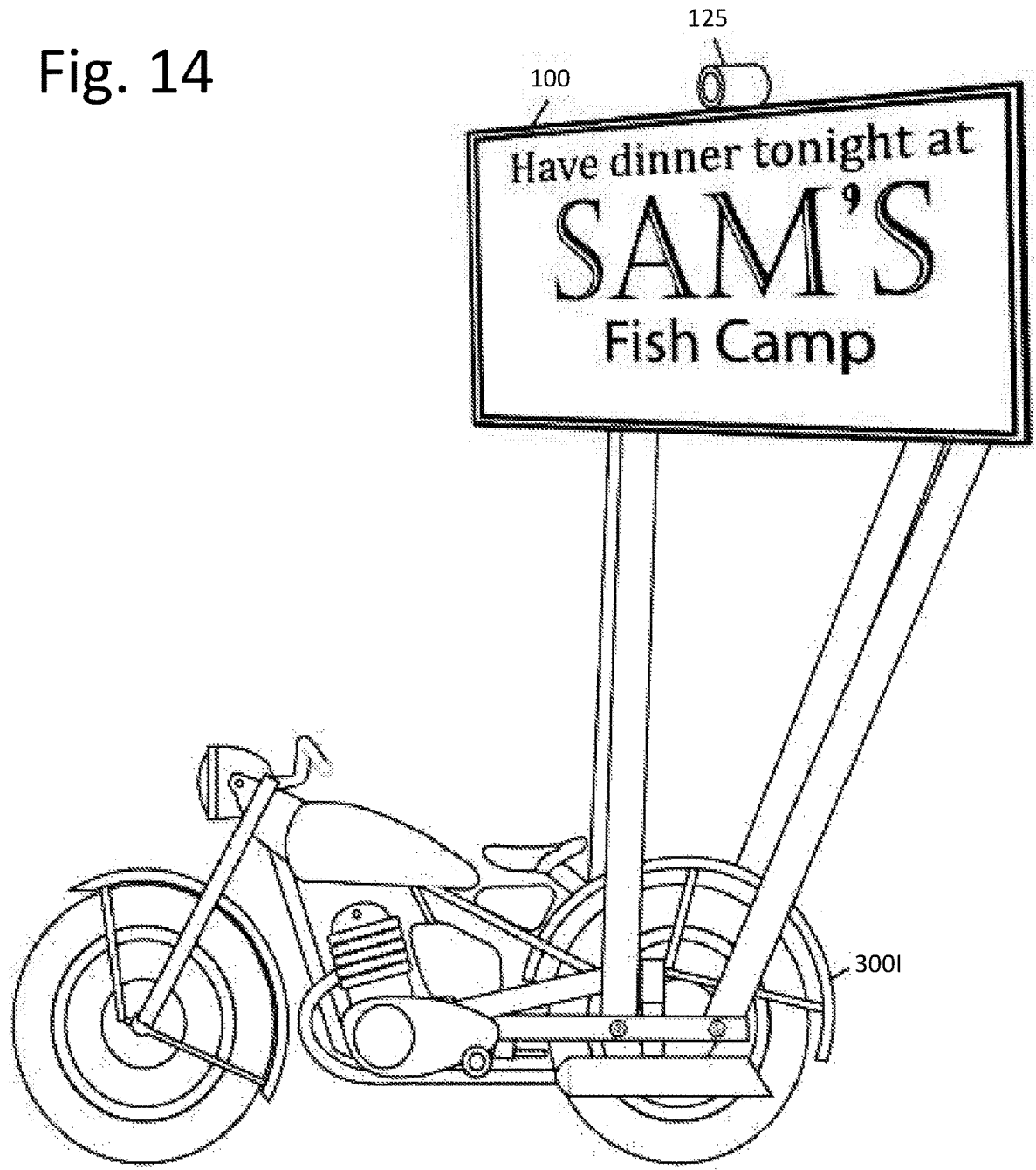
FIG. 14 shows an example sign attached to a motorcycle, according to an embodiment of the present disclosure.

FIG. 14 illustrates a sign 100 mounted diagonally to a motorcycle 3001. Although only one side is visible, in some examples, the sign 100 may include a pair of displays mounted diagonally on opposite sides of the motorcycle 3001 (e.g., in a V-shape with the point of the V oriented toward a front of the motorcycle 3001). While illustrated as mounted diagonally in this example, in other examples, the sign 100 may include one or more displays oriented in different directions (e.g., front, back, sides, etc.) or that are movable through the use of different adjustment mechanism(s) that enable the sign 100 to rotate and/or translate (e.g., move left, right, front, back, up and/or down) relative to the motorcycle 3001. In the illustrated example, the sign 100 is mounted to the motorcycle 3001 via multiple elongated supports. While shown as being of fixed length, the elongated supports may be telescoping or otherwise adjustable in length to change an elevation of the sign relative to the motorcycle 3001. For instance, the sign 100 may be adjustable between a first, elevated position (as shown in FIG. 14) and a second, lowered position (not shown).

Figure 15A:
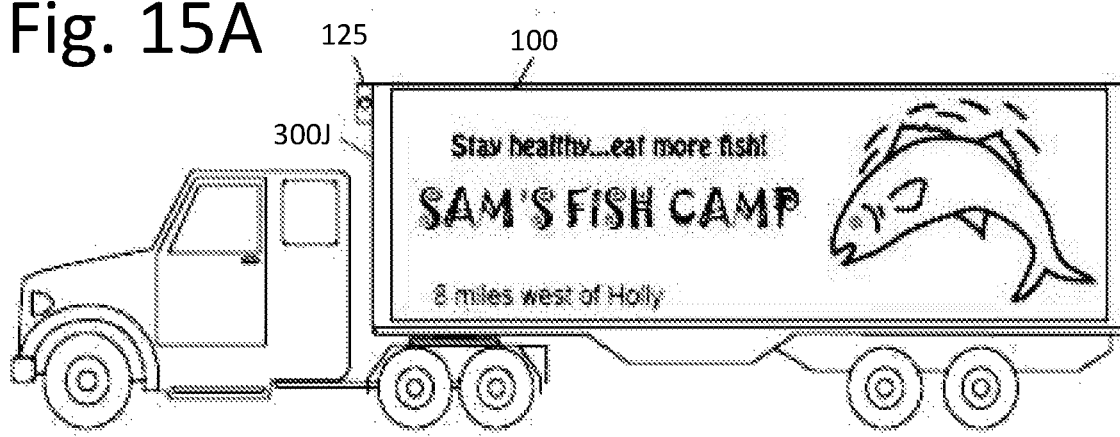
FIG. 15A shows a side view of an example sign usable with a trailer in a first position, according to an embodiment of the present disclosure.
Figure 15B:
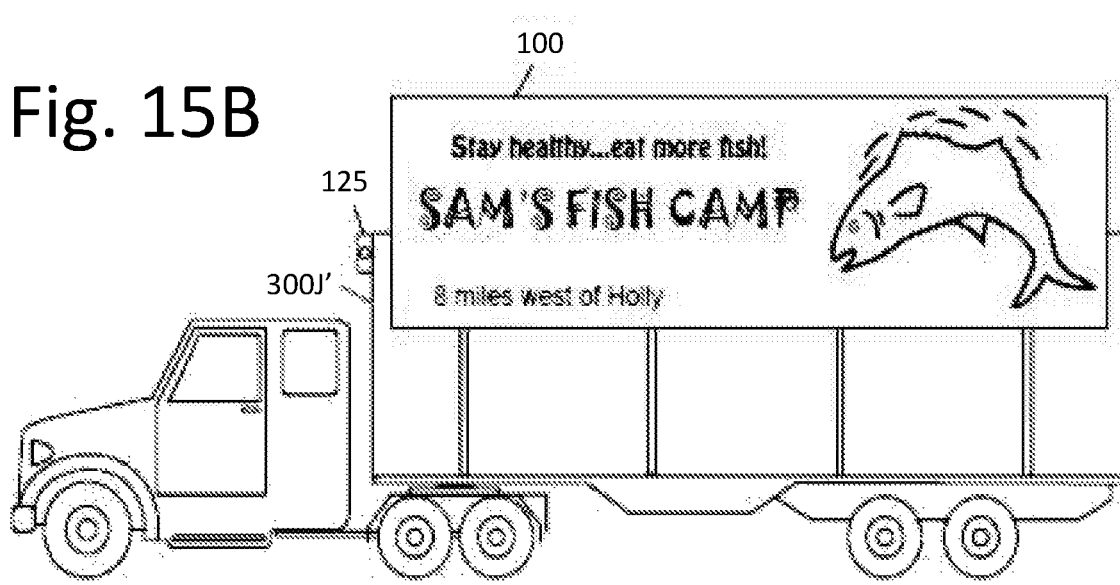
FIG. 15B shows a side view of the example sign of FIG. 15A in a second position.

FIGS. 15A and 15B illustrate a sign 100 disposed on a side of a trailer 300J in a retracted state and an elevated state, respectively. In some examples, the sign 100 may be located on one or both sides of the trailer 300J. One or more sensor(s) 125 may sense objects located in front of, behind, above, or to the sides of the trailer 300J. For instance, the sensor(s) 125 may be directed to sense objects (potential viewers) located in a same direction of travel as the trailer 300J, an opposite direction of travel as the trailer 300J, and/or on lateral sides of the trailer 300J (e.g., pedestrians next to or nearby the trailer). In some examples, the sign 100 may display content at a viewing angle to target the content to a viewer located in front of, behind, and/or next to the trailer 300J. In some examples, a privacy filter (privacy filter 240) or other view limiting component may restrict viewing of the content to a viewing target located in front of, behind, and/or next to the trailer 300J. In this way, the sign 100 may not appear visible from all angles, thereby improving safety for vehicles or pedestrians that otherwise may be distracted by the content of the sign 100 if presented without the privacy filter or other view limiting component. To accomplish such, the sign 100 may include more than one privacy filter to limit viewing of the content at respective angles and/or positions (e.g., in front, left-side, right side, etc.).

FIG. 15B illustrates the sign 100 in an elevated state (relative to the trailer 300J) to reach one or more viewers. For instance, the sign 100 may be relocated (e.g., moved, lowered, raised, etc.) relative to the trailer 300J based at least in part on sensor data from sensor 125. In some examples, the sign 100 may adjust a viewing angle for a viewer by raising or lowering the sign 100 (e.g., to increase or decrease a range of viewing angles available to the one or more viewers) and/or rotating the sign (e.g., tilting a top or bottom of the sign outward from the trailer 300J). In various examples, the sign 100 may output content in the elevated state while in transit and/or while stationary. The sign 100 may be raised using an adjustment mechanism including, for instance, one or more electric motors, hydraulic pumps, pneumatic compressors, or other actuators. In some examples, the elevated state of the sign 100 may correspond to an active display state (content may be output for display) and the retracted state may correspond to an inactive state (content may not be output for display). Additionally or alternatively, content may be output for display on the sign 100, and be viewable to a viewer, while in the retracted state.

FIGS. 16A, 16B, 16C, and 16D show side and rear views of a trailer-mounted display system including a sign 100 mounted to a vehicle trailer 300K. In some instances, one or more sensors 125 may be positioned at or near a top of the sign 100 and may face towards the front, rear, sides, or at any other angle relative to the vehicle trailer 300K. As shown, the sign 100 may be movable between an elevated position (FIGS. 16A and 16C) and a lowered position (FIGS. 16B and 16D). In some examples, the sign 100 mounted to the vehicle trailer 300K may be adjusted to output content in any direction (front, rear, sides, etc.) to face a viewing target.

FIG. 16E is a top view of a first variation of the trailer-mounted display system of FIGS. 16A-16D, in which the sign 100 includes a first display 1602, a second display 1604, and a third display 1606 mounted in a triangular configuration with the first display 1602 and the second display 1604 mounted in a V-shape with the point oriented toward a front of the trailer, and the third display 1606 mounted parallel to a trailing end of the trailer. The first display 1602, second display 1604, and third display 1606 may be raised and lowered collectively or individually by one or more adjustment mechanisms.

FIG. 16F is a top view of a second variation of the trailer-mounted display system of FIGS. 16A-16D, in which the sign 100 includes a rotatable display 1608 which may be rotatable relative to the trailer 300K about a vertical axis. The rotatable display 1608 may have a range of rotation of at least about 30 degrees up to 360 degrees. In some examples, the rotatable display 1608 may be a double sided display capable of displaying content on opposing sides.

FIGS. 17A and 17B illustrate a sign 100 disposed above a vehicle and in an elevated or deployed state. As shown, the vehicle may be in front of or ahead of traffic 105. The sign 100 may include the displays 130 and/or 130', respectively, for presenting content to the occupants of the vehicles in the traffic 105. In FIG. 17A, the sign 100 may be associated with a display sight line at which the displays 130 and/or 130' are viewable. For instance, the sign 100 may include the privacy filter 240 view-limiting component to limit angles at which the displays 130 and/or 130' are viewable as described in FIGS. 11A, 11B, and 11C, for example. The sign 100 and/or the vehicle to which the sign 100 is mounted may include adjustment mechanisms which may include, for example, hinges, and/or actuators that change the viewing angles at which the displays 130 and/or 130' are viewable. In some examples, the viewing angles may be adjusted in dependence upon sensor data received from one or more sensors 125. For instance, the display sight line in FIG. 17B reaches a viewing target further from the sign 100 than a viewer reached by the display sight line in FIG. 17A and may be achieved by the sign 100 receiving sensor data and modifying a position (e.g., height) and/or orientation (e.g., tilt) of the sign 100. In this example, tilting the sign 100 up slightly (e.g., 1-5 degrees) enables the content on the display to reach a viewer at a greater distance as compared to the viewer in FIG. 17A.

As shown in FIG. 17A, the displays 130 and/or 130' may be viewable at a first viewing angle such that certain occupants within the traffic 105 are permitted to view content output on the sign 100. In doing so, the displays 130 and/or 130' may be controlled to be viewable from a predetermined distance from the sign 100. However, the sign 100 may pivot and/or tilt, as shown in FIG. 17B, to adjust the displays 130 and/or 130' to a different portion of the traffic 105. As such, the viewing distance and/or the range of viewing angles may be modified to direct the viewing angle to particular viewing targets among multiple potential viewers. In some examples, modifying the viewing distance and/or the range of viewing angles may be based on sensor data receive from the sensor 125. In some examples, the sign 100 may be elevated and/or tilted at various viewing angles to account for hilly roadways (e.g., to reach a viewer at a different elevation than the sign 100).

FIGS. 17C and 17D, show the sign 100 in a deployed state, while FIGS. 17E, 17F, and 17G show the sign 100 in a folded-down or retracted state. In the retracted state, the sign 100 may prevent display of content to the traffic 105. In some instances, the sign 100 may retract based at least in part on the speed of the vehicle (to which the sign 100 couples) traveling faster than a predetermined speed. Additionally, FIGS. 17C, 17D, 17E, 17F, and 17G illustrate that the sign 100 may vary in height and/or mounting location (e.g., using adjustment mechanisms 1702A, 1702B, 1702C, 1702D, and/or 1702E), which may affect the viewing angles of the sign 100 and/or the amount of the traffic 105 that is able to view the displays 130 and/or 130'. For instance, as shown, the sign 100 in FIG. 17G may extend farther (e.g., to account for elevation changes in the traffic 105 behind the vehicle) than the sign 100 in FIG. 17D, thereby permitting more of the traffic 105 or occupants to observe the displays 130 and/or 130' when the sign 100 deploys. In some examples, the sign 100 may limit the field of view to avoid outputting content to a moving vehicle in the traffic 105. The adjustment mechanisms 1702A, 1702B, 1702C, 1702D, and/or 1702E may, in some examples, be integrated with or comprise a mount that secures the sign 100 to a vehicle.

Figure 18A:
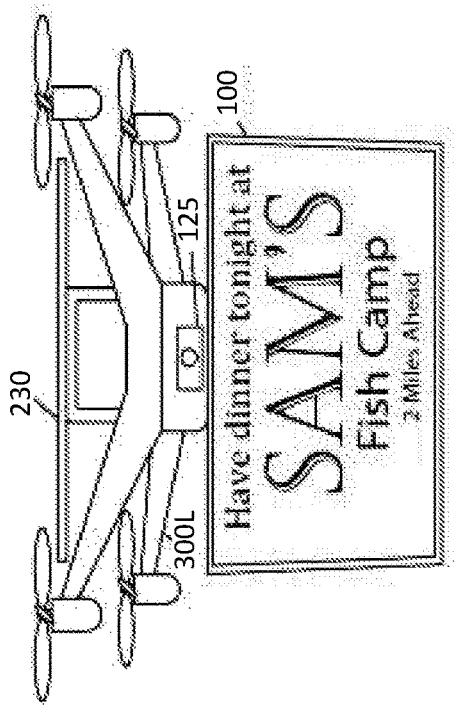
FIG. 18A shows a first perspective view of an example sign attached to an aerial vehicle, according to an embodiment of the present disclosure.
Figure 18C:
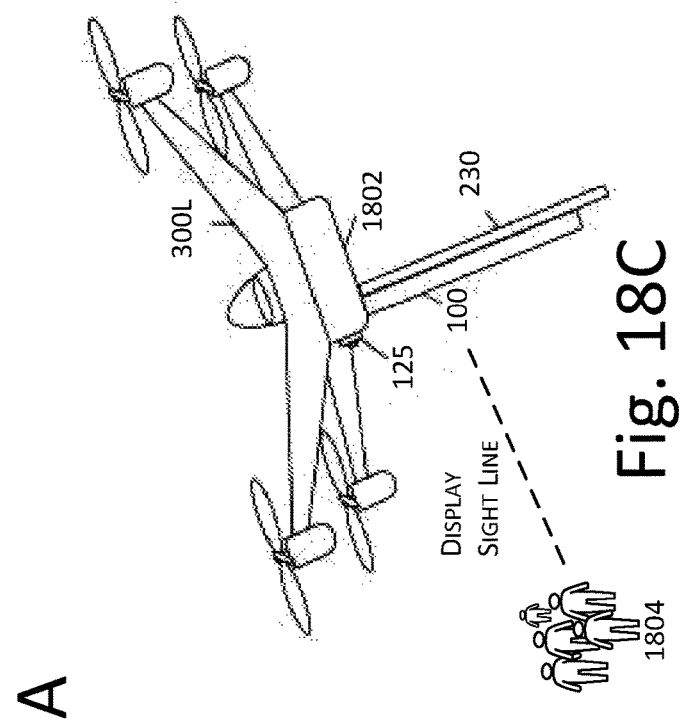
FIG. 18C shows a third perspective view of the example sign of FIG. 18A.
Figure 18B:
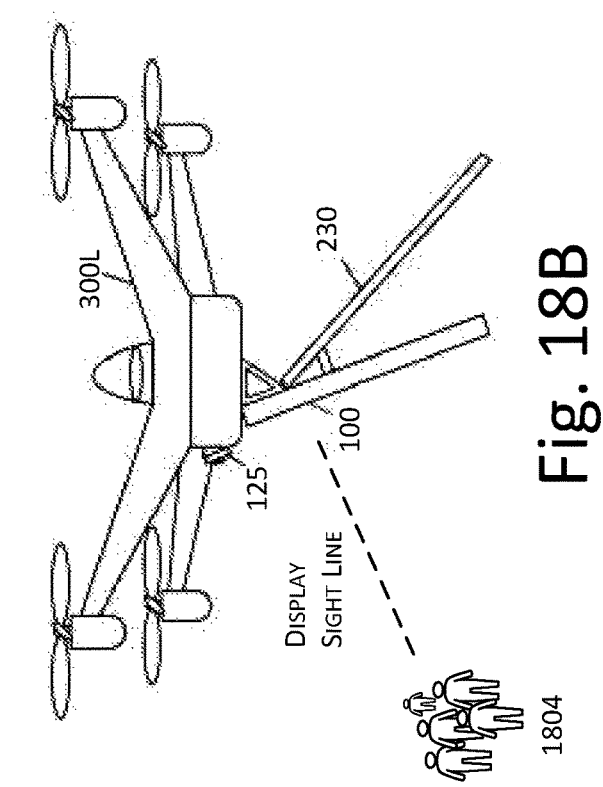
FIG. 18B shows a second perspective view of the example sign of FIG. 18A.

FIGS. 18A, 18B, and 18C illustrate an example display system including a sign 100 coupled to an aerial vehicle 300L. As illustrated, the aerial vehicle 300L comprises the sign 100, one or more sensors 125, a solar panel 230, and a power source 1802. The sign 100 may be configured in a variety of ways to control content output for display (e.g., employing the stabilizing mechanism, the adjustment mechanism, privacy filters, and so on). In some examples, sensor data from the one or more sensors 125 may cause adjustments to a viewing angle of the sign 100 relative to a viewing target 1804. Adjustments to the viewing angle of the sign 100 can be made by controlling the position (in 3D coordinate space) and/or orientation (roll, pitch, and/or yaw), thereby controlling the position and orientation of the sign 100 by virtue of its attachment to the aerial vehicle 300L. Additionally or alternatively, the sign 100 may be coupled to the aerial vehicle 300L by a gimble, pan-tilt mount, or other adjustment mechanism to control the position and/or orientation of the sign 100 relative to the aerial vehicle 300L. While not numbered, the triangular support to which the sign 100 is coupled in FIG. 18B may be representative of such an adjustment mechanism. In the illustrated example, the viewing target 1804 represents a group of pedestrians. However, in some examples, the viewing target 1804 may comprise a single pedestrian, an occupant of a vehicle, or a vehicle itself.

In some examples, the sensor(s) 125 may be used to detect a speed of the aerial vehicle 300L, a motion (e.g., acceleration, vibration, etc.) of the aerial vehicle, a speed of the viewing target 1804, a location of the aerial vehicle, a geographic location of the viewing target 1804, a position of the viewing target 1804 relative to the aerial vehicle, one or more environmental conditions, and so on. In some examples, the viewing angle of the sign 100 may be adjusted (changed from a first position and/or orientation to a second position and/or orientation) relative to the viewing target 1804 based at least in part on the speed of the aerial vehicle 300L, the speed of the viewing target 1804, the location of the viewing target 1804, the position of the viewing target 1804, other sensor data, or a combination thereof.

In general, the sensor(s) 125 (and related sensor data) may be used to reconfigure the sign 100. For instance, the sensor(s) 125 may be used to raise, lower, rotate, tilt, translate, etc. the sign 100 based on a viewing angle determined by the sensor(s) 125. In various examples, the sensor data may be used to change a position of the sign 100, such as by controlling the aerial vehicle to travel along a road side, to reach a greater number of viewers or an individual viewer. In some examples, as described further below, the sensor(s) 125 may comprise cameras to capture faces, gestures, and/or gaze direction of one or more potential viewers, and may reposition the sign 100 based at least in part on the face detection, gestures, and/or gaze direction so that the sign is in or proximate to a potential viewer's line of sight. The sensor data captured by the sensor(s) 125 may be processed by one or more local (e.g., on the vehicle) or remote (e.g., at a remote computing device or cloud processing resource) using one or more known models to perform the face detection, expression interpretation, facial recognition, gaze detection, gesture detection, etc. In some examples, the sensor(s) 125 may additionally or alternatively capture gestures (e.g., facial expression, head nod/shake, hand gesture, etc.) of one or more viewers indicating that the viewer(s) have seen the sign 100. The sensor(s) 125 may additionally or alternatively capture one or more viewer reactions to the sign (e.g., facial expressions, body language, speech, etc.) and/or interaction with the sign (e.g., request to purchase an item advertised on the sign, request to see different content, request for the sign to relocate, etc.). Based on any or all of the foregoing sensor data, the position and/or orientation of the sign 100 may be changed.

In some examples, the aerial vehicle 300L adjusts to environmental conditions (e.g., wind, sunlight, etc.) to maintain a desired viewing angle. For instance, as the aerial vehicle 300L changes position relative to the environment (e.g., in three dimensions), the orientation (e.g., roll, pitch, and/or yaw) of the aerial vehicle 300L and/or an adjustment mechanism coupled to the sign 100 may be controlled to maintain an orientation of the sign constant relative to a viewing target. That is, the orientation of the sign 100 may be controlled such that an axis protruding normal to a surface of the display is maintained substantially aligned with a viewing target as the aerial vehicle 300L translates in the environment. As mentioned, maintaining and/or modifying a viewing angle may, for example, be based on tilting the aerial vehicle 300L relative to the environment (as shown in FIG. 18C) and/or tilting the sign 100 relative to the aerial vehicle 300L (as shown in FIG. 18B). In this way, the sign 100 may be configured to output content at a variety of viewing angles that optimize viewing by an audience.

The aerial vehicle 300L may also comprise the solar panel 230 to provide power to the aerial vehicle 300L and/or the sign 100. In some examples, the solar panel 230 may be coupled to the power source 1802, such as one or more batteries, capacitors, or other power storage device that provide power suitable for the sign 100 to output content and for the aerial vehicle 300L to propel itself in the environment, and so on. In various examples, the solar panel 230 and the power source 1802 may vary in configuration (e.g., size, number of components, power capability, etc.).

By way of example and not limitation, the aerial vehicle 300L may be deployed from a vehicle such as a semi-trailer 300G and return to the semi-trailer 300G for charging (e.g., charging the power source 1802 via solar panel(s), generators, and/or one or more batteries on the semi-trailer 300G). In some examples, the aerial vehicle(s) may be deployed during traffic when vehicle speeds are below a threshold speed (e.g., stopped, below 5 miles per hour, below 10 miles per hour, etc.), and may return to the semi-trailer 300G (or other vehicle) when battery charge levels are low and/or it is determined to no longer be safe to operate the aerial vehicle 300L (e.g., due to environmental conditions that may impact operation of the aerial vehicle 300L, a low charge of the power source 1802, congestion in the environment, unsafe location, and so on). In some examples, the sign 100 may be controlled to output a static image or a blank screen when a viewing target is above a threshold speed and to output video or moving images when the viewing target is at or below the threshold speed. As in the previous examples, the measured speed of the viewing target may correspond to a speed of an individual viewer or an average speed of a group of viewers, for example.

In some examples, the aerial vehicle 300L may receive sensor data wirelessly transmitted from sensor(s) attached to another vehicle (e.g., the tractor trailer mentioned above) or in the environment and use a combination of sensor data obtained by the aerial vehicle 300L and sensor data obtained by the other vehicle to determine a viewing angle, a position of the sign 100, a position of the aerial vehicle 300L, or a combination thereof. In some examples, the combination of sensor data may also or instead be usable for determining whether to relocate a support vehicle (a vehicle with charging capabilities for the aerial vehicle 300L).

Figure 19A:
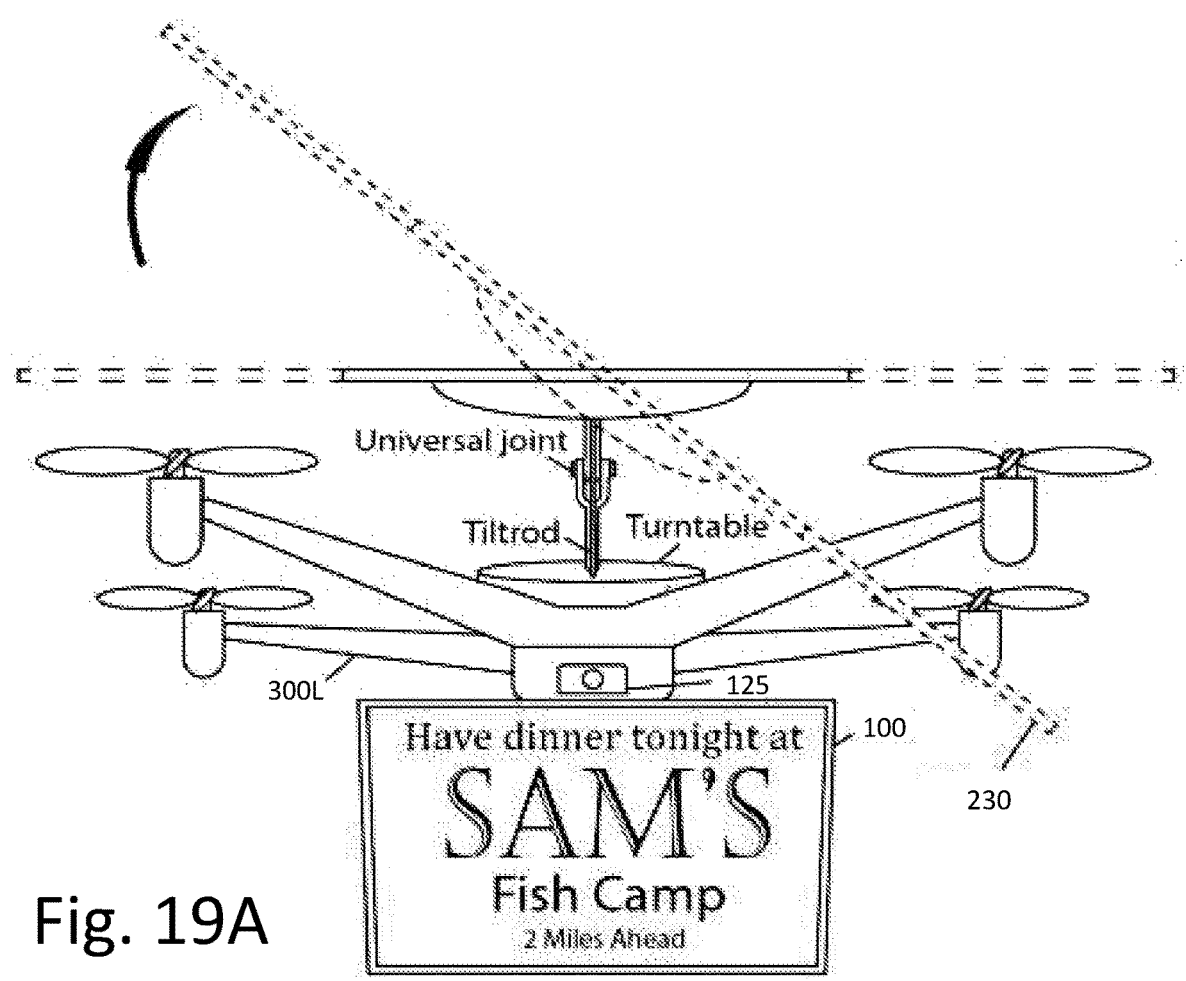
FIG. 19A shows a perspective view of an example sign attached to an aerial vehicle, according to an embodiment of the present disclosure.
Figure 19B:
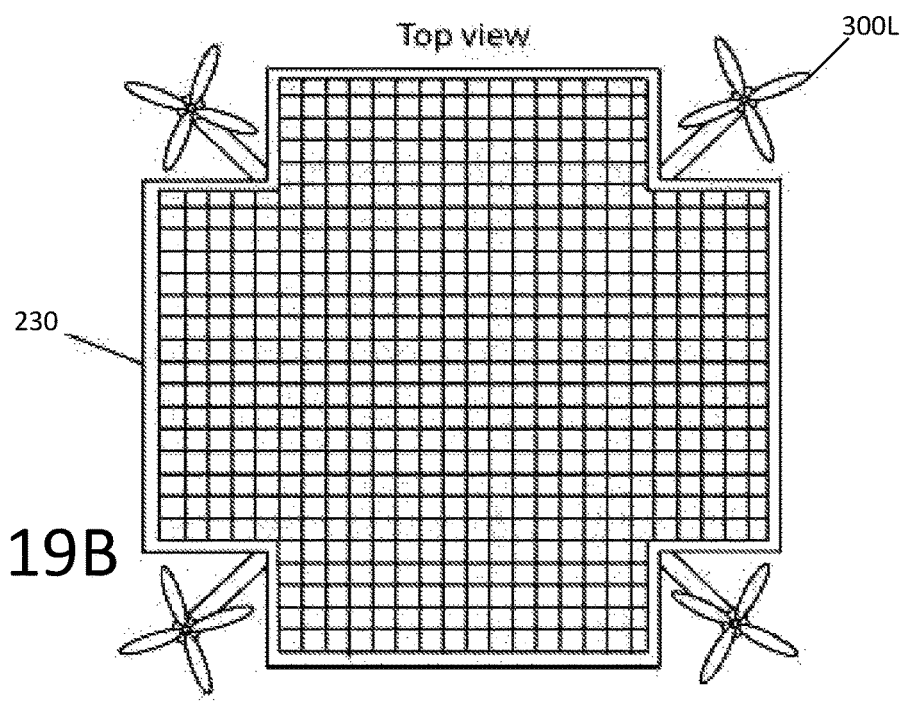
FIG. 19B shows a top view of the example sign of FIG. 19A.

FIGS. 19A and 19B illustrate another example sign 100 coupled to an aerial vehicle 300L. As illustrated, the aerial vehicle 300L includes solar panel(s) 230 configurable to tilt relative to the aerial vehicle 300L, as shown in dashed lines. In some examples, the solar panel 230 may be arranged on the aerial vehicle 300L with an adjustment mechanism suitable for changing the solar panel 230 in any axis in 3D space (e.g., to align the solar panel with the sun, or as ballast to compensate for the weight and position of the display). As illustrated in FIG. 19A, the adjustment mechanism includes a universal joint, a tiltrod, and a turntable, though other adjustment mechanisms are contemplated. In such an example, the adjustment mechanism may be configured to adjust rotation and tilt of the solar panel 230 along an x-axis, a y-axis, and/or a z-axis. In this way, the solar panel 230 may be adjusted in a variety of positions to capture the rays from the sun.

The sign 100 attached to the aerial vehicle 300L may include one or more displays (e.g., displays 130 and/or 130') to present content in multiple directions (e.g. front, behind, and/or adjacent to the aerial vehicle 300L). In some instances, the display comprises a curved screen and/or a flexible screen. In some examples, the sign 100 may use a display that outputs multiple views on a single screen. In this example, the multiple views may be configured to reach different viewers at different positions in the environment.

In some examples, the sign 100 may be used in parking lots (e.g., to a pedestrian or occupants of a stationary vehicle), a toll booth (e.g., presenting content for a lane in lieu of or in addition to tolls), and/or a construction zone (e.g., content is presented while vehicles are stopped, traffic signals relating to the construction site are presented). When used in a construction site, for example, the sign 100 may output content indicative of when traffic will move again, or other traffic warnings. Additionally or alternatively, while traffic is stopped waiting for the construction, the sign 100 may present one or more advertisements or other content. For example, the sign 100 may present an informational notice indicating where the funding for the construction project came from (e.g., from the advertising revenue generated by viewers like them viewing this sign). In one illustrative non-limiting example, the sign 100 may be incorporated into a traffic sign such as a sign used by a flagger, or an automated traffic sign used in lieu of a flagger, thereby presenting content while drivers are waiting during traffic. In various examples, the sign 100 may additionally or alternatively present for display a warning message and/or a countdown to traffic movement.

The sign 100 may employ a variety of detection techniques to sense objects in an environment while providing different levels of privacy for one or more viewers. For example, the sign 100 may employ face detection to detect a face of a viewer while maintaining privacy for the viewer (e.g., not identifying the viewer's face), gaze recognition to whether eyes are directed toward the sign 100 (e.g., can determine that a viewer viewed the sign, while identify of the user can remain private), facial recognition to identify the individual viewing the content on the sign 100 (e.g., based on a public database of faces, based on a database of users/subscribers to a service, etc.). In various examples, the face detection, gaze recognition, and/or facial recognition employed by the sign 100 may be used to determine whether the sign 100 was viewed, whether the sign 100 is viewable by a particular viewer, whether a particular user viewed the sign or particular content displayed by the sign, and/or whether a viewer interacted with the sign 100. For instance, sensor(s) 125 of the sign 100 may determine a location of a target audience (e.g., an individual viewer or multiple viewers) relative to the sign 100, and based on the determined location, determine whether the display is viewable by the target audience. In some examples, after determining that the sign 100 is viewable by the target audience, the sign 100 may output image data (content) for display on the sign 100. In some examples, after determining that the sign 100 is not viewable by the target audience, the sign 100 may relocate and/or determine another viewing angle for outputting the image data (or new image data) for display on the sign 100 to again attempt to display the sign to the target audience. Additionally or alternatively, in response to determining that a viewing target has viewed the content, the sign 100 may be controlled to relocate to present the content to a different viewing target.

In addition to providing different levels of privacy, employing the detection techniques described herein may enable the sign 100 to detect a variety of interactions between the sign 100 and one or more viewers. In some examples, sensor(s) 125 of the sign 100 may detect human gestures, facial expressions, body language, and/or speech to gain context for whether or not to present content for display and/or to determine which content to display. In some examples, the sign 100 may detect an interaction representing a gesture, expression, body language, or speech from the target audience and determine a meaning of the interaction (a thumbs up/thumbs down, a wave, a smile, a frown, a wink, a laugh, a shrug, a slump, a sigh, a voice command or response, etc.). In one such example, the sign 100 may control content for display based on the interaction (e.g., relocating the sign 100 or presenting new content when a thumbs down or other interaction indicative of a dislike for the presented content is detected, presenting specific content when a thumbs up or other interaction indicative of a like for presented content is received at a sensor of the system, etc.). In still further examples, an interaction may be represented by a signal, such as a signal from a mobile device of the target audience. Here, the target audience may interact with the sign 100 (e.g., via a mobile device), and receive content (an offer, a promotion, etc.) responsive to the interaction. In various instances, the sign 100 may detect a wave and interpret the intent of the wave as friendly or unfriendly (e.g., waving the sign away), and control the contents for display based on the interpretation (ceasing output of content/relocating when the wave is unfriendly, presenting new content when the wave is friendly).

In some examples, the sign 100 may apply gaze tracking on a target audience and move the sign 100 and/or a display coupled to the sign to a position aligned with the tracked gaze of the target audience. That is, upon detecting a gaze of a target audience, the sign 100 may adjust an orientation (location, position, speed, and so on) to track the detected gaze and ensure the content continues to reach the target audience as the target audience moves in the environment.

In various examples, advertising revenue may be output on the sign 100 to provide viewers with a benefit to increase tolerance for the sign 100 generally. For instance, revenue related to displaying content by the sign 100 may be communicated to a viewer to show that the sign 100 benefits the viewer by contributing revenue to the environment in which the sign 100 operates (e.g., contributes revenue to a construction project at which the sign 100 is located, revenue for infrastructure projects in the region in which the sign is deployed, revenue for a tourist attraction that the user is visiting, etc.).

In some examples, the sign 100 may comprise a light source to emit a visual and/or audio indicator (either on the display or separate from the display) to attract attention to the sign 100. For instance, the sign 100 may present content for a threshold period of time, may determine that the content has not been viewed (using any of the techniques described herein), and/or may present the visual and/or audio indicator prior to the threshold period of time elapsing. By way of example and not limitation, the sign 100 may output the visual indicator in the form of flashing light emitted from the display, flashing light emitted from a light source coupled to the sign 100, an audible signal such as music, an announcement, or the like.

FIGS. 20A and 20B illustrate an alternative mounting of a sign 100 on a vehicle 300M and a vehicle 300N, respectively, showing that the sign 100 may be movable between an elevated position and a lowered or retracted position. In FIG. 20A, the elevated position of the sign 100 is shown in solid lines, while the retracted position of the sign 100 is shown in dashed lines. In FIG. 20B, the elevated position of the sign 100 is shown in dashed lines, while the retracted position of the sign 100 is shown in solid lines. In some instances, the sign 100 may transition between the elevated position and the retracted position, or any position therebetween, via adjustment mechanisms 2002A and 2002B. An enlarged view of the sign 100 is shown in relation to FIG. 20B and shows sensor 125 as being integrated into the sign 100. In some examples, the sensor 125 may be coupled to the sign 100 in various ways and may, in other examples, be separate from sign 100 but remain in communication with the sign 100. The enlarged view of the sign 100 shows the elevated position slots for securing the sign 100 in the extended and retracted positions, however, any number of slots or other securing mechanisms may be used to securely position the sign in any position between the elevated position and the retracted position.

In some examples, the adjustment mechanisms 2002A and 2002B may contain a spring or other biasing member that allows the sign 100 to pivot downward (e.g., to relieve force applied by air resistance) when a speed of the vehicle 300M and/or 300N exceeds a predetermined threshold. In some examples, the spring may allow the sign 100 to relieve stress that may otherwise damage the sign (e.g., caused by environmental conditions such as wind). In various examples, the adjustment mechanisms 2002A and 2002B may comprise a "break away" device that limits stress on the sign 100 by alleviating an amount of force that comes into contact with the sign 100. In some examples, such the "break away" device may allow the sign 100 to change to a retracted position when the sign encounters a sufficient force (e.g., the sign encountering an overhead structure). Additionally or alternatively, the adjustment mechanisms 2002A and 2002B may comprise a motor or cylinder, as discussed in connection with FIG. 4 to reposition (e.g., raise and lower) the sign 100. Further, the adjustment mechanisms 2002A and 2002B may also or instead comprise hydraulic, pneumatic, jack screw, mechanisms that enable the sign 100 to change orientation relative to the vehicle 300M and/or 300N. For instance, while not shown, the adjustment mechanism 2002A and 2002B may be configured to rotate the sign 100 about a vertical axis (e.g., rotation from displaying content to the front/back of the vehicle 300M and/or 300N as shown in FIGS. 20A and 20B to displaying content to the sides of the vehicle) and/or rotate about a horizontal axis (e.g., tilting the sign up or down to capture a range closer or further from the sign 100). In some examples, the adjustment mechanism 2002A and 2002B may also or instead be configured to translate the sign 100 in any axis in a three-dimensional coordinate system.

FIGS. 20C and 20D illustrate an alternative mounting of a sign 100 on a vehicle 300M showing that the sign 100 may be movable between an elevated position and a lowered or retracted position. In FIG. 20C, the elevated position of the sign 100 is shown in solid lines at a first position, while a second position of the elevated position of the sign 100 is shown in dashed lines. As illustrated, the first position of the sign 100 shown in solid lines may be associated with different viewing angles for outputting content on the sign 100 as compared with viewing angles associated with the second position of the sign 100 in dashed lines. In these examples, the change in tilt between the first position and the second position causes different viewing angles to reach different viewing targets. In some examples, whether in the first position or the second position, the sign 100 may output content at one or more viewing angles using a privacy filter or other structure that limits viewing of the sign 100 to within a predetermined distance or range.

In some instances, the sign 100 may automatically transition between the elevated position and the retracted position via adjustment mechanism 2002C. For instance, the adjustment mechanism 2002C may be configured to rotate the sign 100 about a vertical axis (e.g., rotation from side to front/back of the vehicle 300M) and/or rotation about a horizontal axis (e.g., tilting the sign up or down to capture a range closer or further from the sign 100) based at least in part on data from the sensor(s) 125. In various examples, the adjustment mechanism 2002C may be coupled to and/or include mounting hardware for mounting the sign 100 to the vehicle 300M.

As noted above, FIG. 20D shows the sign 100 in the retracted position. In some examples, content may be prohibited from being output for display while in the sign 100 is in the retracted position (e.g., while the display is in a retracted state). However, in other examples, the sign 100 may output content for display while the sign 100 is in the retracted position. In these examples, the sign 100 may output static image data and/or dynamic image data for display based at least in part on a speed of the sign (e.g., speed of a vehicle or trailer on which the sign is mounted) and/or a speed of one or more vehicles in the environment of the sign 100.

FIGS. 20A, 20B, 20C, and 20D show one or more sensors 125 for sensing objects in an environment of the vehicle 300M and/or 300N. In various examples, objects in the environment may include a viewing target such as a vehicle or a pedestrian. The sensor 125 may be integrated into the sign such that the sensor 125 occupies a portion of the sign 100 without being physically noticeable and without impeding output of content on the sign. Generally, the sensor 125 may, in some examples, generate sensor data that identifies a speed of one or more vehicles, a speed of the sign, a location of the one or more vehicles, and/or a location of a viewing target, just to name a few. The sensor 125 may also or instead receive a signal that indicates an area of the environment in which outputting content for display is prohibited. Although the sensor 125 is shown in FIGS. 20A, 20B, 20C, and 20D some examples may omit the sensor 125 entirely such as when the sign 100 is non-digital (e.g., a sign that outputs static content).

Although FIGS. 20A, 20B, 20C, and 20D show that the sign 100 may be movable between an elevated position and a lowered or retracted position, any position between the elevated position and the retracted position may also be used to present content. For instance, adjusting the sign 100 to a position between the elevated position and the retracted position may enable a variety of viewing angles to reach a viewing target(s) at varying distances from the sign 100.

Various example embodiments are described herein. Modifications and combinations of the example embodiments described herein and/or features thereof are contemplated and are within the scope of this disclosure. As one nonlimiting example, any of the signs and/or displays described herein can be used with any of the mounts, adjustment mechanisms, linkages, arms, or other components. As another nonlimiting example, any of the adjustment mechanisms described herein may comprise an actuator (e.g., one or more motors, hydraulic pumps, pneumatic compressors, etc.) to translate (move up, down, left, right, front, or back) and/or rotate (about longitudinal, lateral, and/or vertical axes) one or more signs. The adjustment mechanism(s) may include one or more gears, linkages, chains, belts, reductions, levers, screws, hoses, tubes, wires, or other mechanisms to transmit energy from the actuator to the sign. In various examples, the adjustment mechanism may comprise pivot 500 and/or pivot 1005. In some examples, the adjustment mechanisms may automatically position the sign 100 in one or a variety of available positions based at least in part on data received from one or more sensors such as sensor 125. As another non-limiting example, while only one sensor is shown in some embodiments, any number of any of the sensors described herein may be used, including multiple sensors of a same type and/or multiple different types of sensors. As yet another non-limiting example, any of the features or components described for a stationary sign can be included in and/or applied to a vehicle-mounted sign and vice versa.

Example Methods

Figure 21:
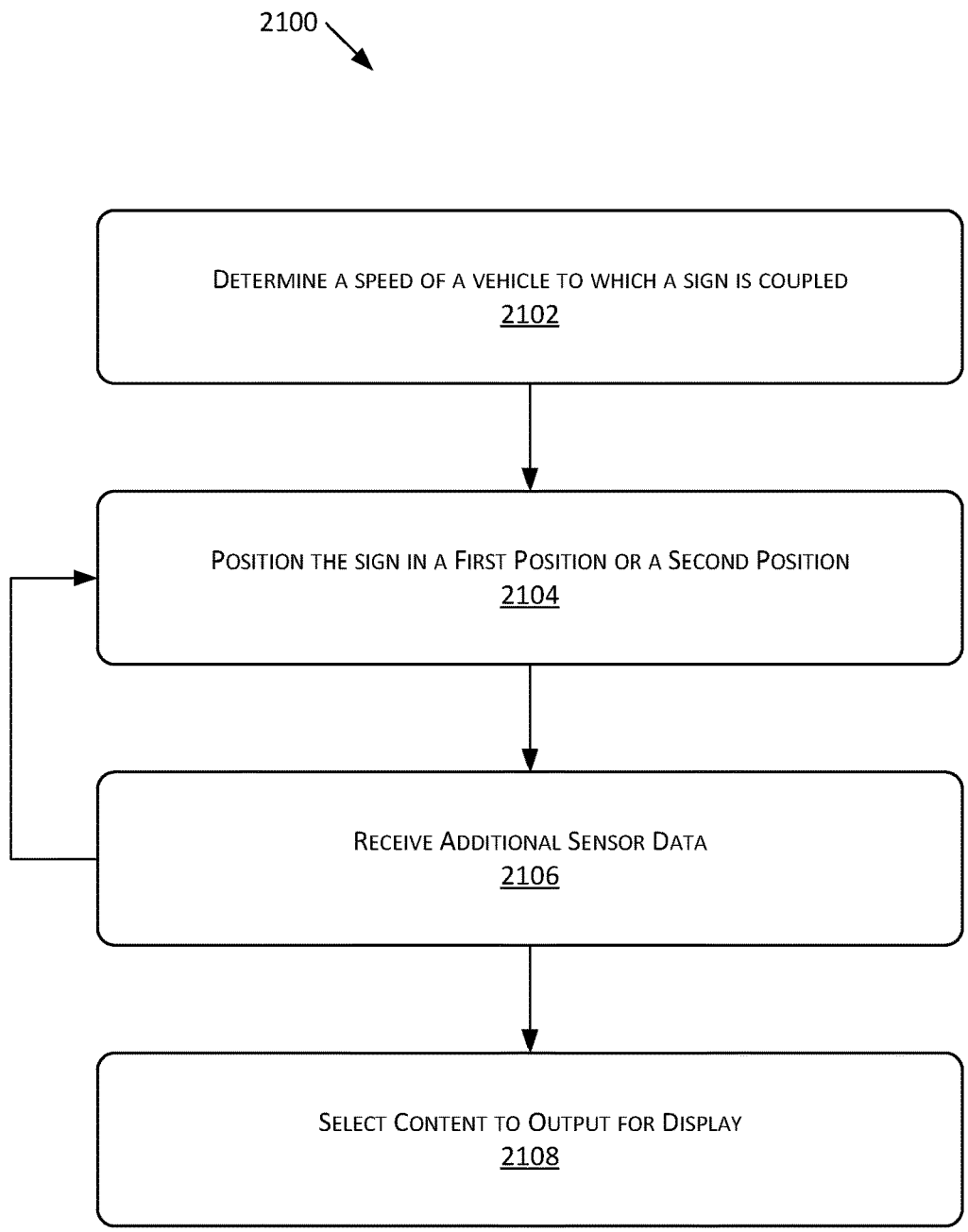
FIG. 21 is a flowchart illustrating example processes usable to implement example techniques described herein.

FIG. 21 is a flowchart illustrating example processes 2100 usable to implement example techniques described herein. In some instances, some or all of processes 2100 can be performed by one or more components in the electronic control system 135' or the system 135. By way of example and not limitation, the sign referred to in process 2100 may be representative of the sign 100 (associated with the examples of FIGS. 1-20E). However, the process 2100 is not limited to being performed by the electronic control system 135' or the system 135.

At operation 2102, the process 2100 can include determining a speed of a vehicle to which a sign is coupled. For instance, the sensor 125 may determine a speed of a vehicle to which the sign 100 is attached using one or more adjustments mechanisms described herein (e.g., actuator, mount, pivot, etc.). In some instances, the speed of the vehicle may be compared to a threshold speed (e.g., a predetermined speed). In some instances, when nearby traffic is moving above a predetermined speed, the sign 100 may display a still or blank image. In some instances, the sign 100 may cease output of an image when traffic is moving above the predetermined speed. Alternatively, when nearby traffic is stopped or moving below a predetermined speed, the sign may display changing information such as videos or a series of changing images. The speed of traffic may be determined for a single vehicle (e.g., a viewing target), an average of multiple vehicles in a viewing angle/range of the sign, a maximum speed of vehicles in the viewing angle/range of the sign, or the like. By operating in this way, the sign may maximize the impact of advertisements while minimizing distraction of nearby drivers.

At operation 2104, the process 2100 can include positioning the sign 100 in a first position or a second position. For instance, using an adjustment mechanism (e.g., adjustment mechanism 1702 and/or 2002), the sign 100 may be positioned in an elevated position, a retracted position, or any position therebetween. In some examples, positioning the sign 100 may include the adjustment mechanism adjusting position (e.g., elevation, lateral, and/or longitudinal position) and/or orientation (e.g., roll, tilt, and/or yaw) of the sign to adjust the sign 100 to a viewing target. Adjusting position and/or orientation of the sign may, for example, be performed automatically in response to detecting a speed of a vehicle to which the sign is mounted. In various examples, positioning the sign 100 may be based at least in part on a comparison of the determined speed of the vehicle and a threshold speed. For example, the sign 100 may be adjusted to a first position (e.g., an elevated position) when the speed of the vehicle is less than the threshold speed and/or be adjusted to a second position (e.g., a retracted position) when the speed of the vehicle is greater than or equal to the threshold speed. Positioning the sign at operation 2104 may include changing the position and/or orientation of the vehicle in the environment (and thereby changing the position and orientation of the sign by virtue of its attachment to the vehicle) and/or by using an adjustment mechanism to change a position and/or orientation of the sign relative to the vehicle to which it is mounted.

At operation 2106, the process 2100 can include receiving additional sensor data. For instance, the sign 1200 may receive sensor data from the sensor(s) 125 as the vehicle travels along a roadway. In some examples, the additional sensor data may include GPS data, map data, or other location data indicating that the vehicle is travelling in an area that the sign is prohibited from displaying content, in which case the sign may be controlled to display no content (e.g., blank or black screen) and/or to position the sign in a stowed or retracted position. In some examples in which the sensor data includes location data, the location data may be used to determine content to be displayed on the sign. For instance, the display system may determine content to display based at least in part on the location (e.g., display an advertisement for sporting apparel when the vehicle is located near a sports arena, display an advertisement for a restaurant or other business near the location of the vehicle, etc.). In still further examples, the additional sensor data may detect a change in speed of the vehicle from a previous time or relative to a speed of other vehicles in an environment of the vehicle. Additionally or alternatively, the sensor 125 may generate additional sensor data that represents a position of a detected viewing target at a position in the environment, a face, a gaze direction, a gesture, facial expression, body language, speech, identifies an identity of a viewing target, etc. Additional sensor data may also, in some examples, be indicative of an environmental condition (e.g., wind, sunlight, horizons, hilly roads, etc.). In some examples, the additional sensor data received at operation 2106 may be fed back to the display system and used to adjust a position and/or orientation of the sign.

At operation 2108, the process 2100 can include selecting content to output for display. Generally, selecting content may comprise adjusting content for output from among available content. In examples when the sign is not an electronic display, selecting content may comprise selecting static content and/or a blank screen for display. In some examples, content may be selected for display on the sign 100 based at least in part on the identity of the viewing target (e.g., specific content targeted to the individual), a speed of the sign (e.g., static or dynamic content based on the speed of the sign), a speed of other vehicles in the environment of the vehicle, a difference between a speed of the sign and a speed of another vehicle, a geographical location of the sign, an environmental condition, and so on. Additionally or alternatively, the sign 100 may select content for a viewing target and adjust the sign 100 to a viewing angle that reaches the viewing target (e.g., using the adjustment mechanism and/or a privacy filter). In some instances, two viewing angles may output the same or different content on a single sign to present the same or different content to two or more viewers.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 2102 and 2104 may be performed without operations 2106 and 2108, operations 2104-2108 may be performed without operation 2102, and/or operations 2102 and 2108 may be performed without operations 2104-2106. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Holographic Sign

Figure 22A:
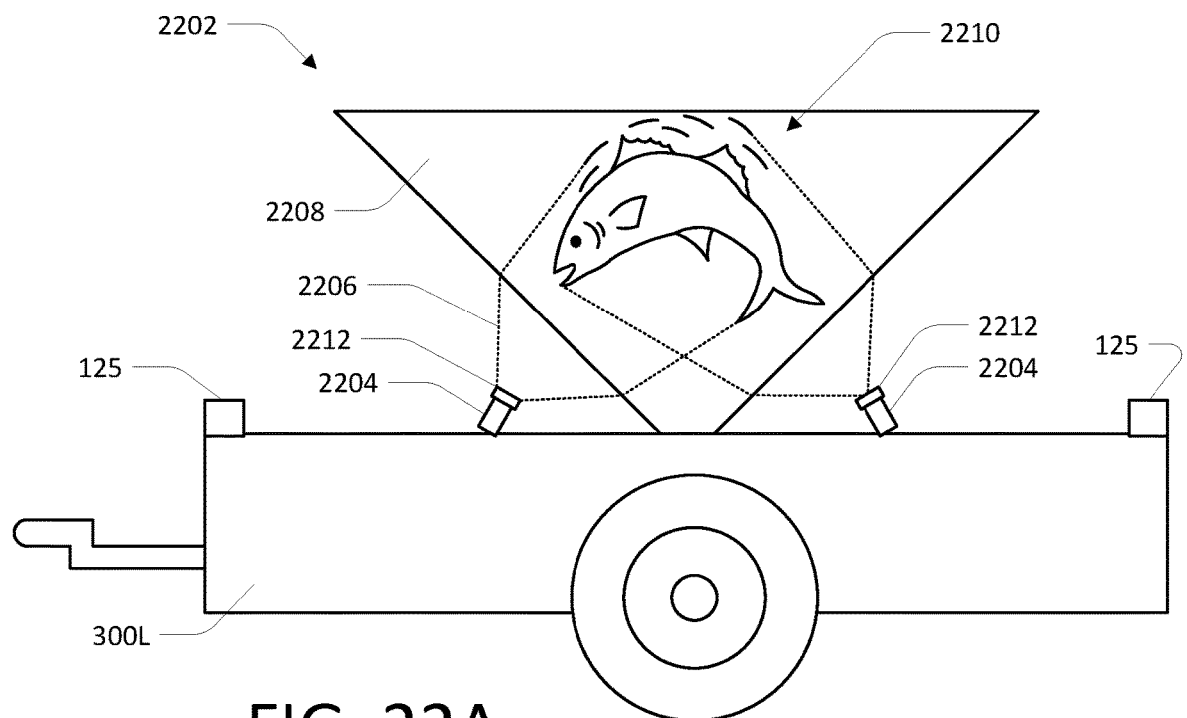
FIG. 22A shows a side view of an example holographic sign mounted to a top of a vehicle, according to an embodiment of the present disclosure.
Figure 22B:
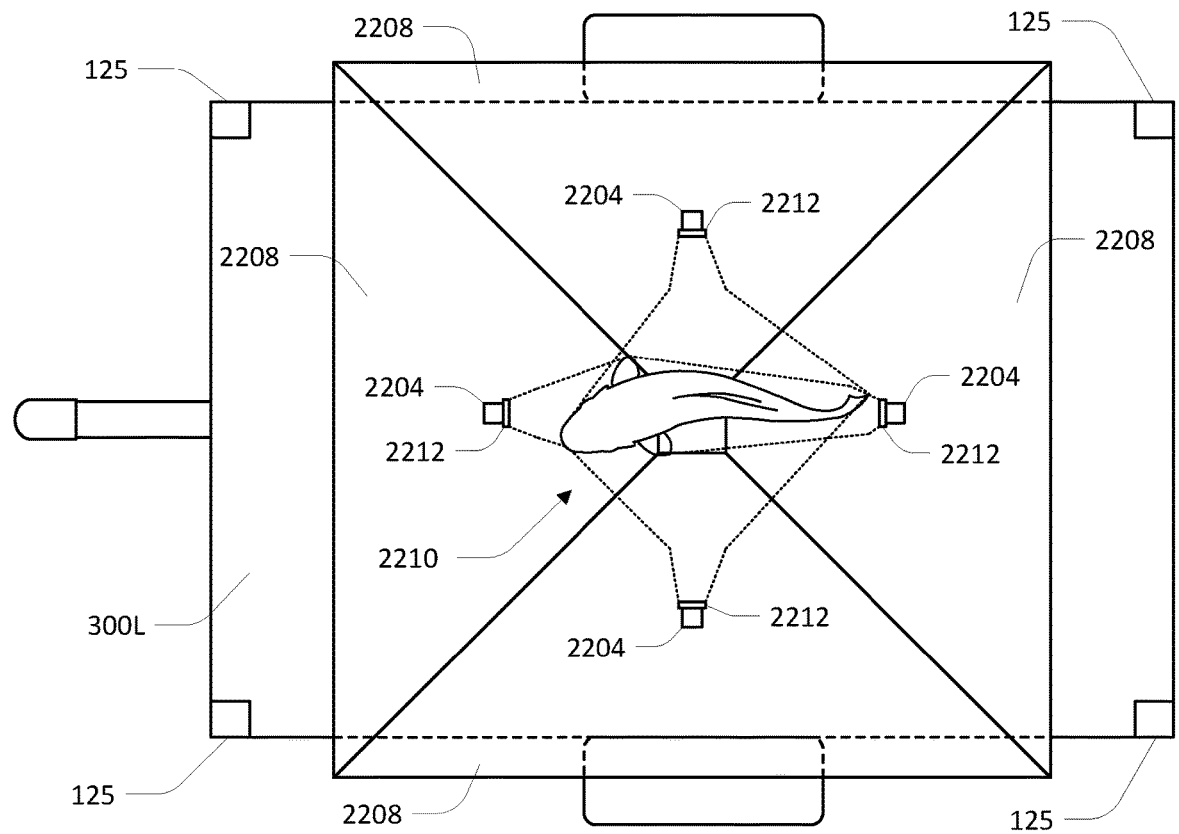
FIG. 22B shows a top view of the example holographic sign of FIG. 22A.

FIGS. 22A and 22B illustrate side and top views of a trailer-mounted display system including a sign comprising a holographic display 2202 mounted to a vehicle trailer 300L. In some instances, one or more sensors 125 may be disposed in or on the trailer 300L and/or the sign and may face towards the front, rear, sides, or at any other angle relative to the vehicle trailer 300L. The holographic display 2202 may include one or more light emitters 2204 to emit light 2206 onto and/or through one or more screens 2208 to generate a hologram 2210. The holographic display 2202 may also include one or more other optical elements 2212 (e.g., lenses, mirrors, beam splitters, optical wave guides, diffractive gratings, polarizers, prisms, etc.) disposed in an optical path between the light emitter(s) 2204 and the screen(s) 2208. While the optical element(s) 2212 are shown as being adjacent the light emitters 2204, the optical elements 2212 may additionally or alternatively be disposed at other locations spaced from the light emitters 2204 to act upon the light 2206 to create an interference pattern to generate the hologram 2210. In some examples, the light 2206 emitted by the one or more light emitters 2204 may be acted upon by the one or more screens 2208 and/or other optical elements 2212 so as to create an interference pattern on the one or more of the screens 2208 and/or in a space between individual ones of the one or more screens 2208 (in the case where multiple screens are present).

By way of example and not limitation, each of the light emitters 2204 may comprise one or more lasers, light sources (e.g., LEDs or incandescent bulbs), projectors, display screens (e.g., LCD displays, LED displays, OLED displays, plasma displays, CRT displays, etc.). In the illustrated example, four separate light emitters 2204 are used. However, in other examples, any number of one or more light emitters 2204 may be used.

The one or more screens 2208 may be substantially transparent or translucent. By way of example and not limitation, the screen(s) 2208 may be made of glass, plastic (e.g., acrylic), or any other transparent or translucent material. One or both surfaces of the screen(s) 2208 may include a coating or surface treatment, such as a reflective coating or treatment, an anti-reflective coating or treatment, a refractive coating or treatment, a diffractive coating or treatment, or the like. In the illustrated example, four separate screens 2208 are used. However, in other examples, any number of one or more screens 2208 may be used. Additionally, the number of screen(s) 2208 used may or may not be the same as the number of light emitter(s) 2204 used.

As shown, the sign may be configured to output content in the form of a three-dimensional hologram 2210 that is viewable from any direction (front, rear, sides, etc.) to face a viewing target. The position and orientation of the hologram 2210 may be adjusted to orient the content of the hologram toward a viewing target at any location around the sign and/or to provide the viewing target with a view of the content from any angle or perspective (e.g., to show the viewing target the top, bottom, front, back, sides, etc. of the content). The position and/or ordination of the hologram may be adjusted by changing a position and/or orientation of one of more of the light emitters 2204, screens 2208, and/or optical elements 2212. Additionally or alternatively, a surface of the trailer and/or a mount to which the sign is mounted (such as any of those described in any of the other examples described herein) may be raised, lowered, translated, and/or rotated to adjust a position and/or orientation of the sign.

Description & Operation—Additional Capabilities of Sign

The signs discussed herein may have real advertising value, including the duration of messages, the use of messages targeted to specific locations and specific demographics. Advertisers whose messages are displayed on the sign may make payment to the managers, licensees, and/or owners of the signs according to these demographics, the duration of display of a message, and so forth. This sign may also provide an opportunity for small business owners and others to present an advertising message to a highly targeted local market at a cost considerably below TV and/or other mass media. For example, a small family or carry out restaurant may utilize the sign to inform motorists that one kilometer ahead they may pick up dinner or make reservations. In some instances, a merchant may make offers for products and/or services that may be purchased by vehicle occupants and others using cell phones, for instance. Such in-vehicle commerce may increase substantially as self-driving vehicles are developed and become more commonplace. Additionally, the effectiveness of such advertising may be measured very quickly.

The nature of the advertising may be used as a demographic on a larger scale. For example, a company with national sales may learn ways to optimize their advertising at new locales by noting the duration and kinds of advertisements placed by local vendors at other similar locales.

Buses and freight-carrying vehicles often include built-in GPS devices that relay their location, which may be utilized by the sign for location-based targeted advertising. Other information about the vehicle, such as hours of continuous operation, number, duration, location of stops, and/or the like may be deduced from this information as well. In the future, it is anticipated that vehicles will contain "black box" transponders of a similar nature, including RFID tags, that relay information about the vehicle and its operator to one or more central locations. This information may be gathered to further customize the operation of signs and/or to gather demographics.

CONCLUSION, RAMIFICATIONS, AND SCOPE

This application, described in part, an improved advertising display system for use in the vicinity of vehicular traffic. Signs used in the system may convey video information, still information, and may be blank. A sensor comprising radar, sonar, lidar, infrared, vibration, pressure, video or other system may sense movement of vehicles in the vicinity of the sign and transmit this information to an electronic system that controls an operation of the sign. In some instances, when nearby traffic is moving above a predetermined speed, the sign may display a still or blank image. In some instances, the sign may cease output of an image when traffic is moving above the predetermined speed. Alternatively, when nearby traffic is stopped or moving below a predetermined speed, the sign may display changing information such as videos or a series of changing images. By operating in this way, the sign may maximize the impact of advertisements while potentially minimizing distraction of nearby drivers. In some instances, the system may gather billing information depending on the location and duration an advertisement is displayed on the sign. Additionally, or alternatively, the system may gather demographic information about drivers and/or occupants of vehicle. This demographic information may be transmitted via an associated data resource. In additional instances, the system may use GPS data to determine a location of the sign and utilize the location to determine and/or select content for display that may have the greatest advertising impact.

In some instances, the system may provide a business method whereby a governmental unit granting display erection rights, and optionally electrical service and traffic control system access, on its property for advertising purposes, shall receive a percentage of the revenue generated by advertising conducted through said display. For example, after a 35% overhead burden is subtracted, remaining revenue may be shared on an equal, or alternate, basis between the government and the advertising media operator. Such public-private partnership is unique, as compared to, for example, franchise fees which cable TV companies pay the local franchising authority for the right to access public rights and offer cable service. Effectively serving as a public-private partnership, the partnership may provide a major revenue stream for municipalities and counties with little or no additional cost to taxpayers. Inasmuch as a sign on government property requires an easement, license, and/or permits of various types and descriptions, it may be advantageous to partner with the government to motivate participation. The system discussed herein may employ a free market concept in that each party contributes something to the whole and neither is parasitic. The system and/or sign may use existing infrastructure and power sources for display support, which would otherwise cost many millions of dollars and take years to erect. However, in some instances, the signs may include solar panels that power their operation.

Additionally, or alternatively, advertisers may potentially bid for a display of content on the sign based at least in part on the location of the sign. For example, certain locations within an environment may be more valuable or have a higher advertising value than compared to others (e.g., densely populated area). Here, advertisers may bid for displaying their associated content within these particular locations.

In some instances, the system may find value in densely populated cities suffering from revenue declines, high crime and lack of adequate police and other services that may benefit greatly from increased revenues generated by the advertisements.

Prior art teaches in a direction opposite the instance disclosure. Conventional displays are instead limited to non-cyclic or changing images and are intended to attract the attention of occupants in moving vehicles. In so doing, conventional signs may inevitably contribute to an increase in roadway accidents, injuries, and/or deaths. The instant disclosure, however, produces a clear and unexpected result in presenting an invention that may avoid driver distraction. Prior art fails this test as it is highly unlikely that any governmental agency would permit such a system, considering that driver distraction is now a significant cause of highway accidents and/or deaths.

It is difficult to conceive of a more urgent, long felt and unsolved need than reducing human deaths and crippling injuries directly attributable to unsafe roadway and bridge conditions. As previously noted, "[b]ad highway design and conditions are a factor in more than half the fatal crashes in the United States, contributing to more deaths than speeding, drunken driving or failure to use seat belts . . . " according to a 2009 study for the Transportation Construction Coalition. "Road-related conditions were a factor in 22,000 fatalities and cost $217.5 billion each year . . . " Over a fifteen-year period perhaps well over 300,000 people have died because of poor road conditions and the lack of roadway funding is clearly the direct cause of these deaths.

Many of today's roadways are a clear and present hazard. Certainly, there is no higher priority than preserving human life. Rarely, if ever, has there been such a clear and direct solution to such a widespread and tragic problem as presented in the instant innovation.

The lack of success of prior art illustrates the failure of others to provide a practical solution and instead would likely contribute to an increase in roadway deaths with distracting signage. The present innovation, through related funding by advertisers, may provide the financial resources to construct and improve public roadways, directly reducing accidents and the resulting deaths, crippling injuries and heartache of survivors and their loved ones. The advertising industry is one of the greatest revenue generators in today's economy. Google, Inc., for example had total revenue of almost $75 Billion in 2015, about 97% of which was derived from advertising activity. The instant invention has the potential to generate unprecedented advertising income that may be applied to roadway and bridge infrastructure providing very strong financial incentives to governmental units in permitting placement and operation of such signage.

Applicant asserts the innovation to be novel and unobvious, exempt from prior art combinations and therefore patentable. It presents a long felt but unresolved need, teaching away from the direction of the prior art and succeeding where others have conventionally failed, dating back many years in this rapidly advancing technological age. It provides a clear and acceptable means for funding roadway construction and improvements.

It is difficult to imagine a more direct cause and effect relationship between poor roadway conditions with the loss of tens of thousands of lives and a provision of funding that would inevitably flow to governments for the widespread construction, repair, and maintenance of our roadways.

As previously noted, "[i]n the 1960s and early 1970s, gas taxes and other fees on drivers covered more than 70 percent of the costs of highway construction and maintenance . . . (today) . . . nearly as much of the cost of building and maintaining highways now comes from general taxes . . . as comes from gasoline taxes or other 'user fees' on drivers. Roads pay for themselves less and less over time. The share of transportation costs covered by gasoline taxes is likely to continue to decline as a result of inflation, more fuel-efficient cars, and slower growth in driving." In effect, this declining provision for road funding is becoming an increasingly greater problem and public resistance to increased taxes reflects little receptivity.

"The American Society of Civil Engineers has concluded that over the next decade, it will cost more than $3.3 trillion to keep up with repairs and replacements to U.S. roads, bridges, airports, power grid and other critical infrastructure, but based on current funding levels, the nation will come up more than $1.4 trillion short. When projected to 2040, the shortfall is expected to top $5 trillion, unless new funds are allocated."

A recent report from the state Senate said 68 percent of California roads are in poor or mediocre condition, the 44th worst record in the nation. It also said the cost for all of the unfunded repairs identified by state and local officials in the coming decade is about $135 billion . . . . If more money isn't found, "these roads will disintegrate to the point where they'll have to be rebuilt, which is very, very expensive," . . . . The state transportation department, Caltrans, estimates every dollar spent on preventive maintenance today averts as much as $10 in repairs later . . . . If motorists do pay more in taxes and fees, they may be disappointed to hear that the money will do little to improve their biggest complaint about roads—traffic. The money under discussion is primarily to keep roads, bridges and related infrastructure like culverts from falling apart, not relieve traffic.

Applicant's innovation presents a clear and acceptable solution to this growing problem, providing roadway funding without direct cost to taxpayers. All equipment and operational costs may be borne by the private partner and operational entity. Funding paid by advertisers may provide unprecedented income for public infrastructure construction and maintenance.

Importantly, Applicant's system provides a highly equitable funding system for roadway infrastructure construction and maintenance in that the users effectively, through exposure to advertising, provide a substantial source of funding. Effectively similar to fuel tax, the more miles driven shall generally result in more exposure to advertising.

Such a medium may also provide valuable services to vehicle occupants with information on local food, lodging, merchandise and recreational facilities, heretofore not readily available. Smaller businesses may be helped by accessing lower cost highly localized advertising.

While the above description contains many specificities, these should not be construed as limitations on the scope, but as exemplifications of some present embodiments. Many other ramifications and variations are possible within the teachings. Additional features may be added, such as a sound system that provides audible information to nearby drivers and pedestrians. The sign may be used to provide roadway information such as notification of accidents or traffic ahead, child protection information, and the like. The sign may be used singly or with other signs and it may range from large to small. It may be used to display three-dimensional anaglyphs. The information may be displayed in monochrome or full color.

Thus, the scope should be determined by the appended claims and their legal equivalents, rather than the examples and particulars given.

Example Clauses

Any of the example clauses in this section may be used with any other of the example clauses and/or any of the other examples or embodiments described herein.

A: A vehicle-mounted system comprising: a sign; a sensor to sense a speed of the vehicle-mounted system; an adjustment mechanism to adjust position of the sign relative to a vehicle to which the sign is coupled; one or more processors communicatively coupled to the sensor and to the adjustment mechanism; and memory communicatively coupled to the one or more processors, the memory storing instructions that, when executed by the one or more processors, cause the vehicle-mounted system to perform operations comprising: determining, based at least in part on data from the sensor, a speed of the vehicle to which the sign is coupled; and positioning, by the adjustment mechanism and based at least in part on the speed of the vehicle, the sign in one of: a first position based at least in part on the speed of the vehicle being less than a threshold speed; or a second position based at least in part on the speed of the vehicle being greater than or equal to the threshold speed.

B: A vehicle-mounted system as paragraph A describes, wherein the first position is a first height relative to the vehicle and the second position is a second height relative to the vehicle, the second height being different than the first height.

C: A vehicle-mounted system as paragraphs A or B describe, the adjustment mechanism further comprising a pivot about which the sign is rotatable from a first orientation to a second orientation while the sign is positioned at the first position.

D: A vehicle-mounted system as paragraphs A-C describe, wherein the sign Comprises an electronic display, the vehicle-mounted system further comprising an additional sensor to detect speed of other vehicles in an environment of the vehicle-mounted system, the operations further comprising: detecting, by the additional sensor, speed of another vehicle in the environment; and outputting, by the electronic display, one of: a first image based at least in part on the speed of the other vehicle being below the threshold speed; a second image based at least in part on the speed of the other vehicle being at or above the threshold speed.

E: A vehicle-mounted system as paragraphs A-D describe, further comprising at least one of shutters, mechanical blinds, a privacy filter, or other view-limiting structure disposed on a face of the sign that limits viewing of the sign to a first range of viewing angles that is less than a range of viewing angles from which the sign is otherwise viewable.

F: A vehicle-mounted system as paragraphs A-E describe, wherein the sign is oriented toward a viewing target located behind the vehicle to which the vehicle-mounted system is coupled.

G: A vehicle-mounted system as paragraphs A-F describe, wherein in at least one of the first position or the second position the sign is disposed above a viewing target and is oriented such that an axis normal to a face of the sign is oriented below the horizon.

H: A vehicle-mounted system as paragraphs A-G describe, further comprising an additional sensor to detect objects in an environment of the vehicle-mounted system, the operations further comprising: detecting, based at least in part on sensor data form the additional sensor, a viewing target to view the sign; and orientating, by the adjustment mechanism, the sign toward the viewing target.

I: A vehicle-mounted system as paragraphs A-H describe, the operations further comprising automatically moving the sign from the one of first position or the second position to the other of the first position or the second position based at least in part on a change in the speed of the vehicle.

J: A vehicle-mounted system as paragraphs A-I describe, further comprising an additional sensor to determine location, the operations further comprising: determining, based on data from the additional sensor, a location of the vehicle-mounted system; wherein the positioning the sign is further based at least in part on the location of the vehicle-mounted system.

K: A vehicle-mounted system as paragraphs A-J describe, further comprising an additional sensor to detect an environmental condition, the operations further comprising: determining whether the environmental condition is detected by the additional sensor; and wherein positioning of the sign is further based at least in part on the presence or absence of the environmental condition.

L: A vehicle-mounted system as paragraphs A-K describe, wherein the sign comprises an electronic display, the vehicle-mounted system further comprising an additional sensor to detect speed of another vehicle in an environment of the vehicle-mounted system, the operations further comprising: detecting, by the additional sensor, speed of another vehicle in the environment; and wherein positioning of the sign is further based at least in part on the speed of the other vehicle.

M: A vehicle-mounted system as paragraphs A-L describe, wherein the first position corresponds to an active state of the sign in which the sign is viewable by a viewer and the second position corresponds to an inactive state of the sign in which the sign is not viewable by the viewer.

N: A vehicle-mounted system as paragraphs A-M describe, further comprising an additional sensor communicatively coupled to the adjustment mechanism, the additional sensor configured to detect motion of the vehicle, the operations further comprising: detecting motion of the vehicle; and adjusting at least one of position or orientation of the sign to at least partially compensate for the motion of the vehicle.

O: A method comprising: determining, based at least in part on data from a sensor, a speed of a vehicle to which a sign is coupled; and positioning, by an adjustment mechanism and based at least in part on the speed of the vehicle, the sign in one of: a first position based at least in part on the speed of the vehicle being less than a threshold speed; or a second position based at least in part on the speed of the vehicle being greater than or equal to the threshold speed.

P: A method as paragraph O describes, wherein the first position is a first height relative to the vehicle and the second position is a second height relative to the vehicle, the second height being different than the first height.

Q: A method as paragraphs O or P describe, further comprising changing an orientation of the sign from a first orientation to a second orientation while the sign is positioned at the first position.

R: A method as paragraphs O-Q describe, wherein the sign comprises an electronic display, further comprising: detecting, by an additional sensor, speed of another vehicle in an environment of the vehicle; and outputting, by the electronic display, one of: a first image based at least in part on the speed of the other vehicle being below the threshold speed; a second image based at least in part on the speed of the other vehicle being at or above the threshold speed.

S: A method as paragraphs O-R describe, further comprising adjusting a viewing angle over which the sign is viewable by a viewing target.

T: A method as paragraphs O-S describe, further comprising: detecting, based at least in part on sensor data form an additional sensor, a viewing target to view the sign; and orientating the sign toward the viewing target.

U: A vehicle-mounted system comprising: a sign including a display viewable from a range of viewing angles; a sensor to measure a position of a viewing target relative to the sign; one or more processors communicatively coupled to the sign and to the sensor; and memory communicatively coupled to the one or more processors, the memory storing instructions that, when executed by the one or more processors, cause the vehicle-mounted system to perform operations comprising: receiving sensor data from the sensor indicative of a position of the viewing target relative to the sign; adjusting a viewing angle over which the display is viewable by the viewing target based at least in part on the received sensor data indicating the position of the viewing target relative to the sign; and outputting image data for display on the sign at the viewing angle.

V: A vehicle-mounted system as paragraph U describes, wherein the operations further comprise adjusting at least one of the image data or the viewing angle based at least in part on an absolute speed of the viewing target.

W: A vehicle-mounted system as paragraphs U or V describe, wherein adjusting the image data comprises: adjusting the image data to static image data based at least in part on a determination that the viewing target is moving relative to the sign; or adjusting the image data to dynamic image data based at least in part on a determination that the viewing target is not moving relative to the sign.

X: A vehicle-mounted system as paragraphs U-W describe, wherein the operations further comprise determining a difference between a speed of the sign and a speed of the viewing target and adjusting at least one of the image data or the viewing angle based at least in part on the determined difference.

Y: A vehicle-mounted system as paragraphs U-X describe, wherein the operations further comprise adjusting at least one of the image data or the viewing angle based at least in part on an absolute speed of the sign.

Z: A vehicle-mounted system as paragraphs U-Y describe, wherein the operations further comprise relocating the sign from a first position to a second position based at least in part on the sensor data.

AA: A vehicle-mounted system as paragraphs U-Z describe, wherein the viewing target is a vehicle and wherein the operations further comprise determining whether one or more occupants are inside the vehicle and wherein adjusting the viewing angle is further based at least in part on the occupancy determination.

AB: A vehicle-mounted system as paragraphs U-AA describe, further comprising an adjustment mechanism coupling the sign to a vehicle or trailer, and wherein the adjustment mechanism is configured to adjust an orientation of the sign relative to the vehicle or the trailer according to the adjusted viewing angle.

AC: A vehicle-mounted system as paragraphs U-AB describe, further comprising a light sensor, wherein the operations further comprise: determining, via the light sensor, a brightness of an environment in which the display resides; and at least one of: increasing a brightness of the display based at least in part on the brightness; or decreasing a brightness of the display based at least in part on the brightness.

AD: A vehicle-mounted system as paragraphs U-AC describe, further comprising a camera, wherein the operations further comprise: receiving, from the camera, image data representing one or more occupants or pedestrians associated with the viewing target; and determining information about the one or more occupants, wherein the image data is based at least in part on the information about of the one or more occupants.

AE: A vehicle-mounted system as paragraphs U-AD describe, further comprising an adjustment mechanism rotatably coupling the sign to a vehicle, wherein adjusting the viewing angle over which the display is viewable comprises rotating the display relative to the vehicle about at least one of a vertical axis or a horizontal axis.

AF: A vehicle-mounted system as paragraphs U-AE describe, further comprising an adjustment mechanism rotatably coupling the sign to a vehicle, wherein adjusting the viewing angle over which the display is viewable comprises translating the sign at least one of vertically or horizontally.

AG: A vehicle-mounted system as paragraphs U-AF describe, wherein adjusting the viewing angle comprises increasing the viewing angle or decreasing the viewing angle.

AH: A vehicle-mounted system as paragraphs U-AG describe, wherein the operations further comprise moving the vehicle-mounted system based at least in part on a location of the viewing target.

AI: A vehicle-mounted system comprising a sign including a display viewable from a range of viewing angles; a sensor to sense objects in an environment of the vehicle-mounted system; and one or more processors communicatively coupled to the sign and to the sensor; and memory communicatively coupled to the one or more processors, the memory storing instructions that, when executed by the one or more processors, cause the vehicle-mounted system to perform operations comprising: determining a location of a target audience relative to the vehicle-mounted system; determining, based at least in part on the location of the target audience and the range of viewing angles, whether the display is viewable by the target audience; and outputting, based at least in part on whether the display is viewable by the target audience, image data for display on the sign.

AJ: A vehicle-mounted system as paragraph AI describes, wherein the vehicle-mounted system is mounted to an aerial-based vehicle or a ground-based vehicle.

AK: A vehicle-mounted system as paragraphs AI or AJ describe, the operations further comprising relocating the vehicle-mounted system from a first position to a second position based at least in part on a speed of the sign and a location of the target audience.

AL: A vehicle-mounted system as paragraphs AI-AK describe, further comprising a solar power source configured to provide power to the vehicle-mounted system.

AM: A vehicle-mounted system comprising: a sign including a display viewable from a range of viewing angles; a sensor to sense objects in an environment of the vehicle-mounted system; and one or more processors communicatively coupled to the sign and to the sensor; and memory communicatively coupled to the one or more processors, the memory storing instructions that, when executed by the one or more processors, cause the vehicle-mounted system to perform operations comprising: obtaining sensor data from the sensor indicative of a first position of the sign relative to a target audience; detecting that the target audience viewed the sign or that a threshold period of time elapsed with the sign in the first position; and controlling the sign to move from the first position to a second position different from the first position.

AN: A vehicle-mounted system as paragraph AM describes, wherein controlling the sign is based at least in part on the target audience viewing the sign or the threshold period of time elapsing.

AO: A vehicle-mounted system as paragraphs AM or AN describe, wherein controlling the sign to move from the first position to the second position is performed after the threshold period of time elapsed, and wherein the second position is viewable by the target audience.

AP: A vehicle-mounted system as paragraphs AM-AO describe, the operations further comprising applying gaze tracking on the target audience and moving the sign to a position aligned with the tracked gaze of the target audience.

AQ: A vehicle-mounted system as paragraphs AM-AP describe, the operations further comprising: displaying a visual indicator to attract attention to the sign prior to the threshold period of time elapsing.

AR: A vehicle-mounted system as paragraphs AM-AQ describe, wherein the visual indicator includes flashing light emitted from the display or a light source coupled to the sign.

AS: A vehicle-mounted system comprising: a sign including a display viewable from a range of viewing angles; a sensor to sense objects in an environment of the vehicle-mounted system; and one or more processors communicatively coupled to the sign and to the sensor; and memory communicatively coupled to the one or more processors, the memory storing instructions that, when executed by the one or more processors, cause the vehicle-mounted system to perform operations comprising: determining, based at least in part on receiving data from the sensor, a first viewing angle at which to display an image on the sign relative to a target audience; displaying first image data on the sign at the first viewing angle relative to the target audience; receiving a signal from the target audience; determining, based at least in part on the signal, that the target audience viewed the sign; and at least one of: displaying second image data on the sign at the first viewing angle relative to the target audience; or moving at least a portion of the sign to display the first image data to a second target audience.

AT: A vehicle-mounted system as paragraph AS describes, wherein the signal comprises a gesture from the target audience.

AU: A vehicle-mounted system as paragraphs AS or AT describe, wherein the signal comprises a signal from a mobile device of the target audience.

AV: A vehicle-mounted system as paragraphs AS-AU describe, the operations further comprising recognizing, using a facial recognition technique, an identify of the target audience.

AW: A vehicle-mounted system as paragraphs AS-AV describe, wherein the display comprises a curved screen or multiple screens.

AX: A vehicle-mounted system comprising: a sign including a display viewable from a range of viewing angles; a sensor to sense objects in an environment of the vehicle-mounted system; and one or more processors communicatively coupled to the sign and to the sensor; and memory communicatively coupled to the one or more processors, the memory storing instructions that, when executed by the one or more processors, cause the vehicle-mounted system to perform operations comprising: positioning a sign for viewing by a first target at a first location based at least in part on receiving data from the sensor; receiving a signal indicative of interaction between the first target and the sign based at least in part on the sensor detecting a signal from the first target; and re-positioning the sign for viewing by a second target at a second location based at least in part on the received signal indicative of interaction between the first target and the sign.

AY: A vehicle-mounted system as paragraph AX describes, wherein the signal is received from a mobile device associated with the first target.

AZ: A vehicle-mounted system as paragraphs AX or AY describe, wherein the signal received from the device associated with the first target indicates that an offer sent from the sign to the mobile device was received.

BA: A vehicle-mounted system as paragraphs AX-AZ describe, wherein the signal comprises a gesture from the first target and relative to the sign indicating a context for whether or not to continue to present the display to the first target.

BB: A vehicle-mounted system as paragraphs AX-BA describe, wherein the gesture comprises motion by a human relative to the sign.

BC: A vehicle-mounted system as paragraphs AX-BB describe, wherein the gesture causes the sign to: present specific image data; send information to a device of the first target; or relocate to a new target.

BD: A vehicle-mounted system as paragraphs AX-BC describe, the operations further comprising causing the display to generate second image data for display at the sign based at least in part on the received signal indicative of interaction between the first target and the sign.

BE: A vehicle-mounted system comprising: a motion sensor; a sign including a display viewable from a range of viewing angles; and memory communicatively connected to the sign, the memory storing instructions that, when executed by one or more processors, cause the one or more processors to perform operations comprising: determining, based at least in part on receiving data from the motion sensor, the range of viewing angles relative to the display; outputting for display on the sign at a first viewing angle in the range of viewing angles, first image data; and outputting for display on the sign at a second viewing angle in the range of viewing angles, second image data different from the first image data, wherein outputting the first image data or outputting the second image data is based at least in part on detecting a threshold number of vehicles within the range of viewing angles relative to the display.

BF: A vehicle-mounted system as paragraph BE describes, wherein the first image data is output for display and the second image data is output for display while the sign is at a first location.

BG: A vehicle-mounted system as paragraphs BE or BF describe, the operations further comprising selecting the first viewing angle and the second viewing angle from the range of viewing angles based at least in part on an optimization ranking associated with each viewing angle.

BH: A vehicle-mounted system as paragraphs BE-BG describe, wherein the first image data corresponds to at least one of: a dynamic image; a changing image; or video data; and the second image data corresponds to at least one of: a static image; a blank image; or at least two sequential images.

BI: A vehicle-mounted system as paragraphs BE-BH describe, wherein at least one of the first image data or the second image data is based at least in part on a location of the display.

BJ: A system comprising: one or more processors; a display configured to display first content and second content that is different than the first content; a viewing angle limiting component disposed in, on, or in front of the display to limit a range of angles within which the display is viewable to a limited range of angles; and one or more non-transitory computer-readable media storing computer-executable instructions that, when executed on the one or more processors, cause the one or more processors to perform acts comprising: determining a speed of one or more vehicles; and at least one of: based at least in part on the speed of the one or more vehicles being less than a threshold speed, displaying the first content on the display; or based at least in part on the speed of the one or more vehicles being greater than or equal to the threshold speed, displaying the second content on the display.

BK: A vehicle-mounted system comprising: a sign; a sensor to sense location of the sign in an environment; one or more processors; and memory communicatively coupled to the one or more processors, the memory storing instructions that, when executed by the one or more processors, cause the vehicle-mounted system to perform operations comprising: receiving, from the sensor, location data; determining, based at least in part on the location data from the sensor, a location of the sign in the environment; and changing, based at least in part on the location of the sign, at least one of a position of the sign or an orientation of the sign.

BL: The vehicle-mounted system as paragraph BK describes, the operations further comprising determining content to display on the sign based at least in part on the location of the sign.

BM: The vehicle-mounted system as paragraphs BK and BL describe, wherein the content comprises one or more of a dynamic image, a changing image, video data, a static image, a blank image, or at least two sequential images.

BN: The vehicle-mounted system as paragraphs BK-BM describe, wherein the changing comprises changing the position of the sign from: a first position associated with a first location in the environment, to a second position associated with a second location in the environment, the second position being different than the first position and the second location being different than the first location, and changing the position of the sign comprises causing the sign to move between the first position and the second position.

BO: The vehicle-mounted system as paragraphs BK-BN describe, wherein the changing comprises changing the orientation of the sign from: a first orientation associated with a first location in the environment, to a second orientation associated with a second location in the environment, the second orientation being different than the first orientation and the second location being different than the first location, and changing the orientation of the sign comprises causing the sign to move from the first orientation to the second orientation.

BP: The vehicle-mounted system as paragraphs BK-BO describe, wherein the changing comprises changing an elevation of the sign relative to the vehicle.

BQ: The vehicle-mounted system as paragraphs BK-BP describe, further comprising an additional sensor to detect objects along a path of the vehicle-mounted system, the operations further comprising: detecting an object at least partially overhanging the path of the vehicle-mounted system; and determining a clearance associated with an object, wherein changing the at least one of the position of the sign or the orientation of the sign is further based at least in part on the clearance associated with the object.

BR: The vehicle-mounted system as paragraphs BK-BQ describe, further comprising an additional sensor to detect a location of viewing targets in the environment, the operations further comprising: determining a location of a viewing target relative to the sign, wherein changing the at least one of the position of the sign or the orientation of the sign is further based at least in part on the location of the viewing target relative to the sign.

BS: The vehicle-mounted system as paragraphs BK-BR describe, the operations further comprising determining a time of day, and wherein changing the at least one of the position of the sign or the orientation of the sign is further based at least in part on the time of day.

BT: The vehicle-mounted system as paragraphs BK-BS describe, the operations further comprising adjusting a viewing angle to limit viewing of the sign based at least in part on the location of the sign.

BU: The vehicle-mounted system as paragraphs BK-BT describe, further comprising an adjustment mechanism coupling the sign to a vehicle or a trailer, and wherein the adjustment mechanism is configured to change the at least one of the position of the sign or the orientation of the sign relative to the vehicle or the trailer.

BV: The vehicle-mounted system as paragraphs BK-BU describe, wherein the vehicle-mounted system is mounted to an aerial-based vehicle or a ground-based vehicle.

BW: The vehicle-mounted system as paragraphs BK-BV describe, wherein the sign comprises a holographic display.

BX: The vehicle-mounted system as paragraphs BK-BW describe, wherein the holographic display comprises: one or more translucent screens; and one or more light emitters positioned to emit light incident on the one or more translucent screens to generate a hologram.

BY: The vehicle-mounted system as paragraphs BK-BX describe, further comprising at least one of a shutter, a mechanical blind, a privacy filter, or other component coupled to the sign that limits viewing of the sign to within a first range of viewing angles that is less than a range of viewing angles from which the sign is otherwise viewable.

BZ: A method comprising: determining, based at least in part on data from a sensor, a location of a sign in an environment; and changing, based at least in part on the location of the sign, at least one of a position of the sign or an orientation of the sign.

CA: The method as paragraph BZ describes, wherein the position of the sign comprises a height of the sign relative to a vehicle to which the sign couples.

CB: The method as paragraphs BZ and CA describe, further comprising determining content to display on the sign based at least in part on the location of the sign.

CC: The method as paragraphs BZ-CB describe, further comprising adjusting, based at least in part on the location of the sign, a viewing angle over which the sign is viewable to a viewing target.

CD: The method as paragraphs BZ-CC describe, wherein the sign comprises a holographic display and the changing the at least one of a position of the sign or an orientation of the sign comprises moving at least one of a translucent screen or a light emitter of the holographic display.

What is claimed is:

1. A vehicle-mounted system comprising:
   a sign;
   a sensor to sense location of the sign in an environment;
   one or more processors; and
   memory communicatively coupled to the one or more processors, the memory storing instructions that, when executed by the one or more processors, cause the vehicle-mounted system to perform operations comprising:
   receiving, from the sensor, location data;
   determining, based at least in part on the location data from the sensor, a location of the sign in the environment;
   determining, based at least in part on the location of the sign, one or more conditions associated with the location of the sign in the environment; and
   changing, based at least in part on the one or more conditions and while the sign is physically moving within the environment, at least one of a position of the sign or an orientation of the sign.

2. The vehicle-mounted system of claim 1, the operations further comprising determining content to display on the sign based at least in part on the location of the sign.

3. The vehicle-mounted system of claim 2, wherein the content comprises one or more of a dynamic image, a changing image, video data, a static image, a blank image, or at least two sequential images.

4. The vehicle-mounted system of claim 1, wherein the changing comprises changing the position of the sign from:
   a first position associated with a first location in the environment, to a second position associated with a second location in the environment, the second position being different than the first position and the second location being different than the first location, and
   changing the position of the sign comprises causing the sign to move between the first position and the second position.

5. The vehicle-mounted system of claim 1, wherein the changing comprises changing the orientation of the sign from:
   a first orientation associated with a first location in the environment, to a second orientation associated with a second location in the environment, the second orientation being different than the first orientation and the second location being different than the first location, and
   changing the orientation of the sign comprises causing the sign to move from the first orientation to the second orientation.

6. The vehicle-mounted system of claim 1, wherein the changing comprises changing an elevation of the sign relative to the vehicle.

7. The vehicle-mounted system of claim 1, further comprising an additional sensor to detect objects along a path of the vehicle-mounted system, the operations further comprising:
   detecting an object at least partially overhanging the path of the vehicle-mounted system; and
   determining a clearance associated with an object,
   wherein changing the at least one of the position of the sign or the orientation of the sign is further based at least in part on the clearance associated with the object.

8. The vehicle-mounted system of claim 1, further comprising an additional sensor to detect a location of viewing targets in the environment, the operations further comprising:
   determining a location of a viewing target relative to the sign,
   wherein changing the at least one of the position of the sign or the orientation of the sign is further based at least in part on the location of the viewing target relative to the sign.

9. The vehicle-mounted system of claim 1, the operations further comprising determining a time of day, and wherein changing the at least one of the position of the sign or the orientation of the sign is further based at least in part on the time of day.

10. The vehicle-mounted system of claim 1, the operations further comprising adjusting a viewing angle to limit viewing of the sign based at least in part on the location of the sign.

11. The vehicle-mounted system of claim 1, further comprising an adjustment mechanism coupling the sign to a vehicle or a trailer, and wherein the adjustment mechanism is configured to change the at least one of the position of the sign or the orientation of the sign relative to the vehicle or the trailer.

12. The vehicle-mounted system of claim 1, wherein the vehicle-mounted system is mounted to an aerial-based vehicle or a ground-based vehicle.

13. The vehicle-mounted system of claim 1, wherein the sign comprises a holographic display, and the holographic display comprises:

one or more translucent screens; and one or more light emitters positioned to emit light incident on the one or more translucent screens to generate a hologram.

14. The vehicle-mounted system of claim 1, further comprising at least one of a shutter, a mechanical blind, a privacy filter, or other component coupled to the sign that limits viewing of the sign to within a first range of viewing angles that is less than a range of viewing angles from which the sign is otherwise viewable.

15. A method comprising:

determining, based at least in part on data from a sensor, a first location of a sign in an environment;

transporting the sign from the first location to a second location in the environment; and changing, based at least in part on the first location of the sign, at least one of a position of the sign or an orientation of the sign while the sign is physically moving within the environment from the first location to the second location.

16. The method of claim 15, wherein the position of the sign comprises a height of the sign relative to a vehicle to which the sign couples.

17. The method of claim 15, further comprising determining content to display on the sign based at least in part on the first location of the sign.

18. The method of claim 15, further comprising adjusting, based at least in part on the first location of the sign, a viewing angle over which the sign is viewable to a viewing target.

19. The method of claim 15, wherein the sign comprises a holographic display and the changing the at least one of a position of the sign or an orientation of the sign comprises moving at least one of a translucent screen or a light emitter of the holographic display.

20. The vehicle-mounted system of claim 1, wherein the one or more conditions comprise at least one of:

a number of viewers within the environment;
restrictions against displaying content via the sign;
geographical features within the environment; or
a field of view of the sign.

* * * * *